(12) United States Patent
Prahlad et al.

(10) Patent No.: US 8,861,171 B2
(45) Date of Patent: *Oct. 14, 2014

(54) ELECTROADHESIVE HANDLING AND MANIPULATION

(71) Applicant: SRI International, Menlo Park, CA (US)

(72) Inventors: Harsha Prahlad, Cupertino, CA (US); Ronald E. Pelrine, Longmont, CO (US); Brian K. McCoy, Sunnyvale, CA (US)

(73) Assignee: SRI International, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/886,048

(22) Filed: May 2, 2013

(65) Prior Publication Data

US 2013/0242455 A1    Sep. 19, 2013

Related U.S. Application Data

(63) Continuation-in-part of application No. 13/668,099, filed on Nov. 2, 2012, now Pat. No. 8,564,926, which is a continuation of application No. 12/762,260, filed on Apr. 16, 2010, now Pat. No. 8,325,458.

(60) Provisional application No. 61/303,216, filed on Feb. 10, 2010, provisional application No. 61/641,728, filed on May 2, 2012, provisional application No. 61/739,212, filed on Dec. 19, 2012.

(51) Int. Cl.
*H01T 23/00* (2006.01)
*H02N 13/00* (2006.01)
*B25J 15/00* (2006.01)

(52) U.S. Cl.
CPC ............... *H02N 13/00* (2013.01); *B25J 15/00* (2013.01); *B25J 15/0009* (2013.01); *B25J 15/0085* (2013.01)
USPC ........................................... 361/234

(58) Field of Classification Search
USPC ........................................... 361/234
See application file for complete search history.

(56) References Cited

U.S. PATENT DOCUMENTS 6,922,324 B1   7/2005  Horwitz
7,551,419 B2   6/2009  Pelrine et al.
(Continued)

FOREIGN PATENT DOCUMENTS

JP        06126661      10/1994
JP       2003285289      7/2003

OTHER PUBLICATIONS

PCT International Search Report and Written Opinion, PCT International Application No. PCT/US2013/039331, dated Nov. 29, 2013.

*Primary Examiner* — Stephen W Jackson
(74) *Attorney, Agent, or Firm* — McDonnell Boehnen Hulbert & Berghoff LLP

(57) ABSTRACT

An electroadhesive gripping system includes a shear gripper. The shear gripper can include an electroadhesive surface associated with one or more electrodes and a load-bearing structure coupled to the electroadhesive surface. A power supply can be configured to apply voltage to the one or more electrodes associated with the electroadhesive surface. A controller can be configured to cause a voltage to be applied, via the power supply, to the one or more electrodes associated with the electroadhesive surface to thereby cause the first shear gripper to adhere to an item situated proximate the electroadhesive surface. The controller can be configured to cause a shear force to be applied to the adhered item, via the load-bearing structure, that is sufficient to move the adhered item.

21 Claims, 38 Drawing Sheets

(56) References Cited

U.S. PATENT DOCUMENTS 8,325,458 B2 * 12/2012 Prahlad et al. ................ 361/234
8,564,926 B2 * 10/2013 Prahlad et al. ................ 361/234
2008/0089002 A1 4/2008 Pelrine et al.
2011/0193362 A1 8/2011 Prahlad et al.

* cited by examiner

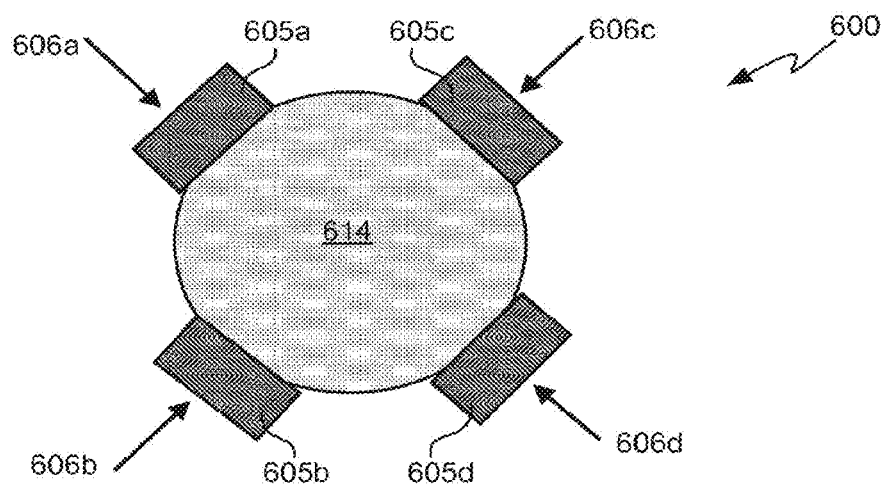
FIG. 6A *(prior art)*
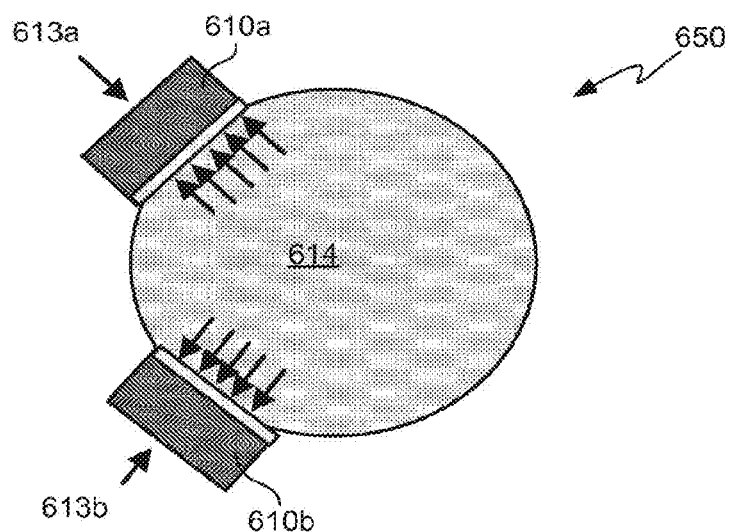
FIG. 6B

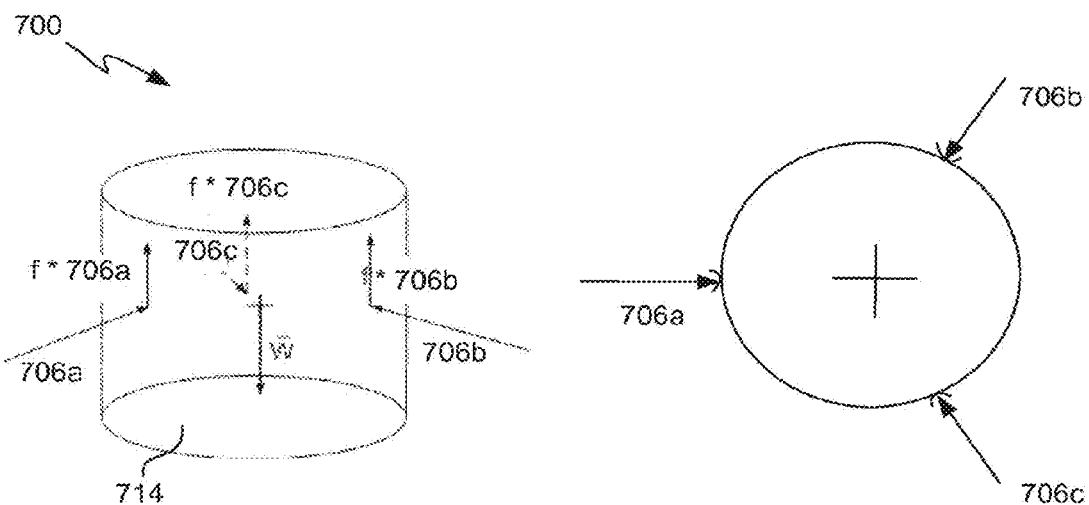
FIG. 7A  FIG. 7B
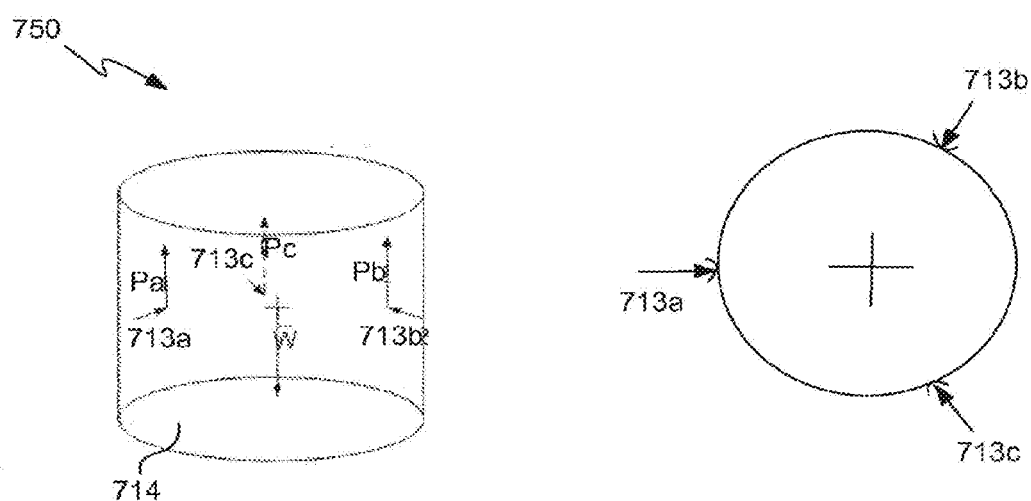
FIG. 7C  FIG. 7D

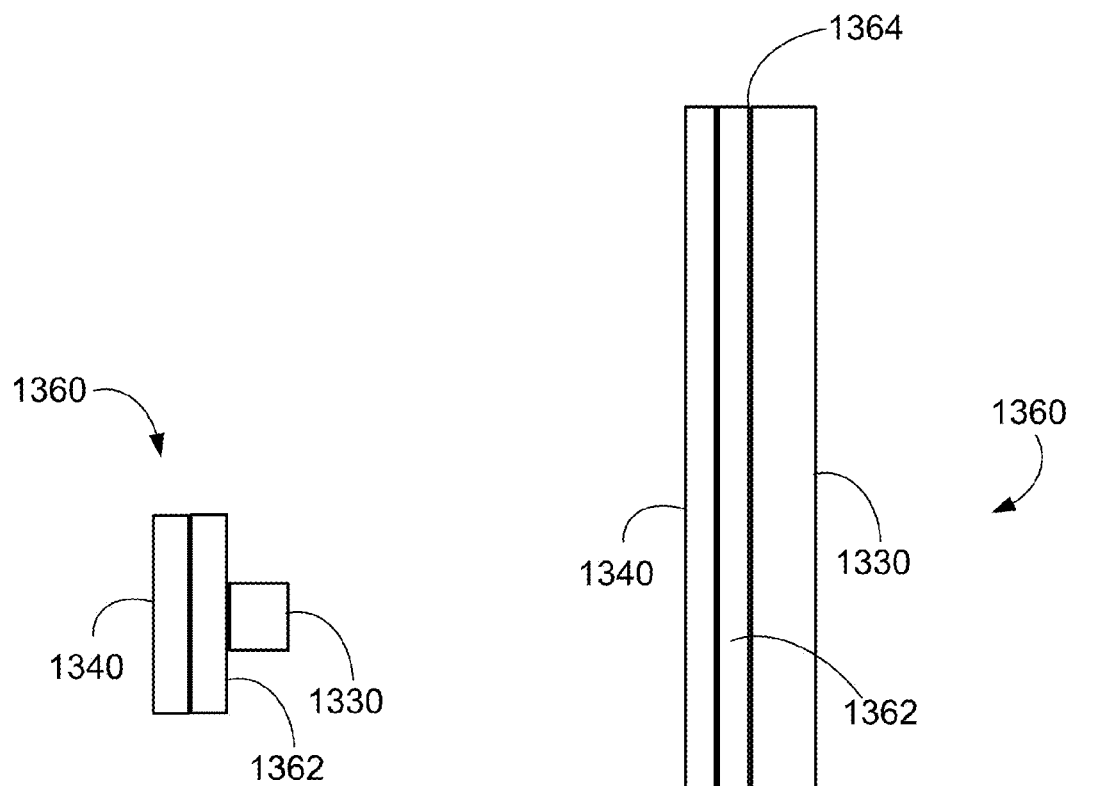
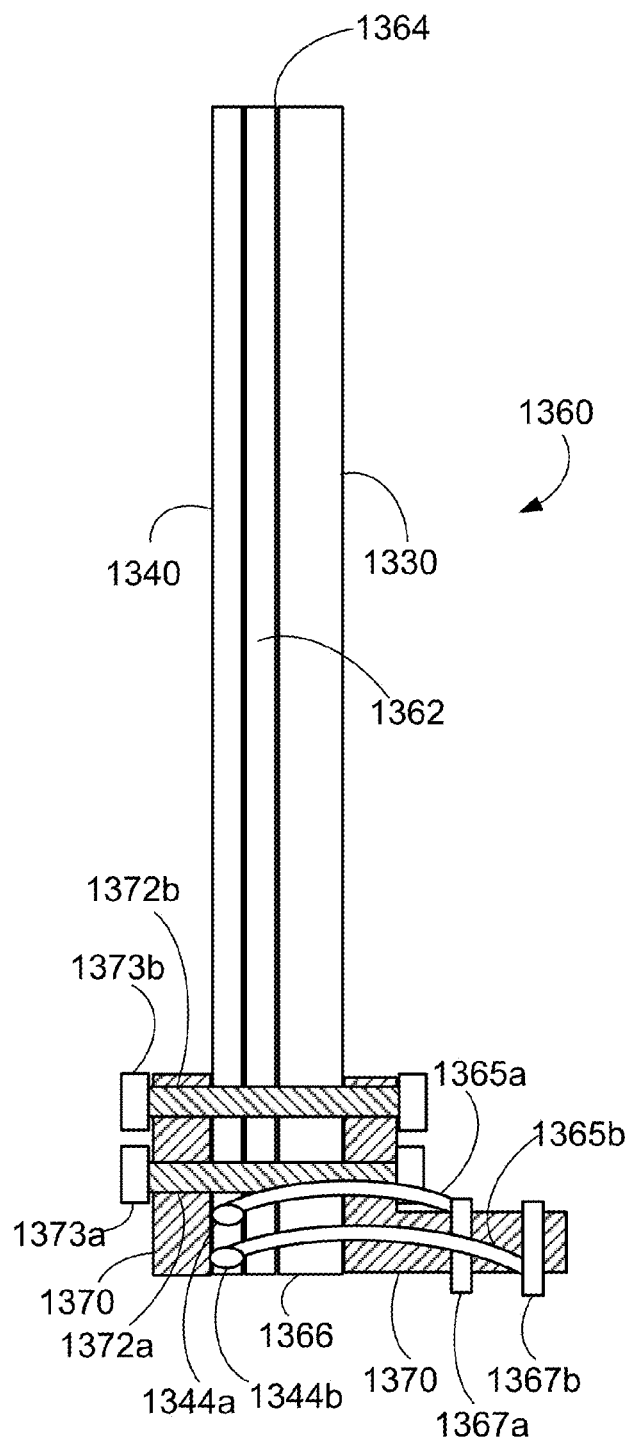
FIG. 13C
FIG. 13D

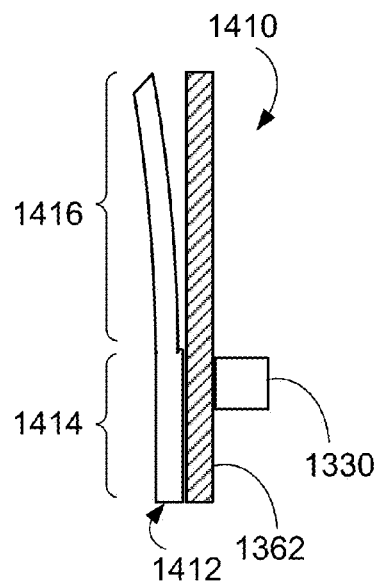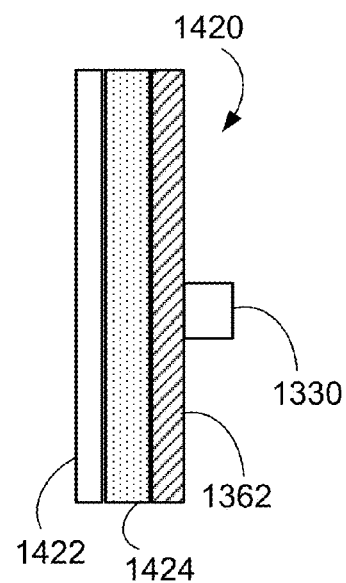
FIG. 14A  FIG. 14B
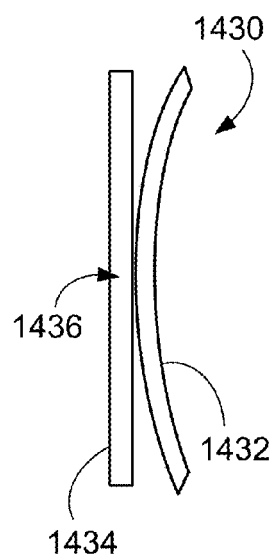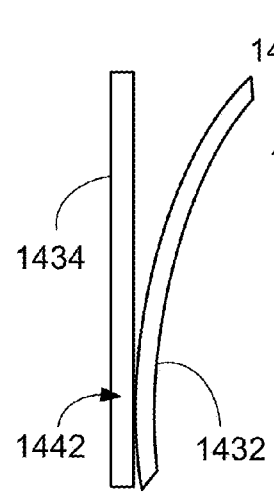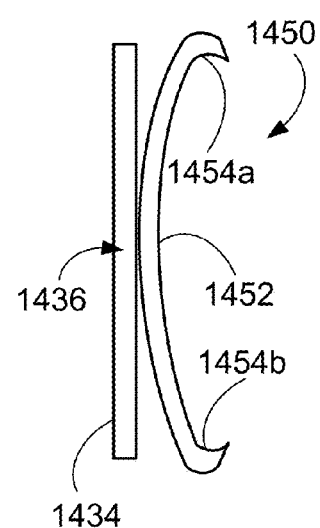
FIG. 14C  FIG. 14D  FIG. 14E

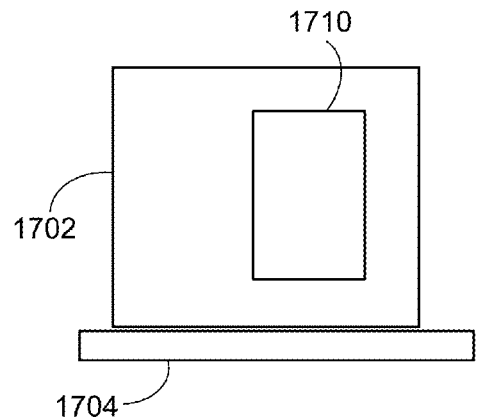
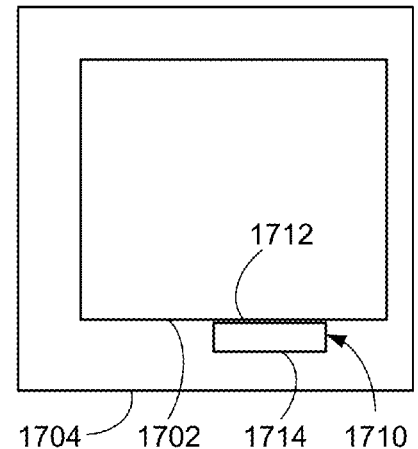
FIG. 17A
FIG. 17B
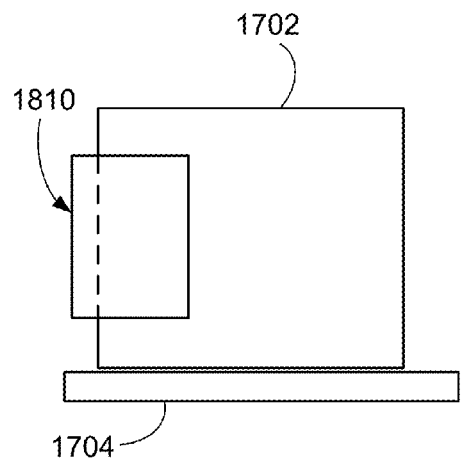
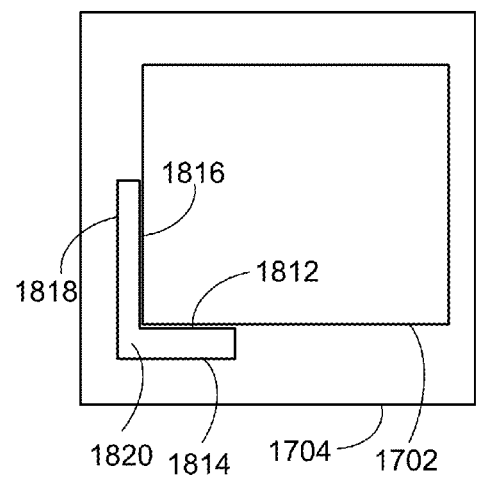
FIG. 18A
FIG. 18B

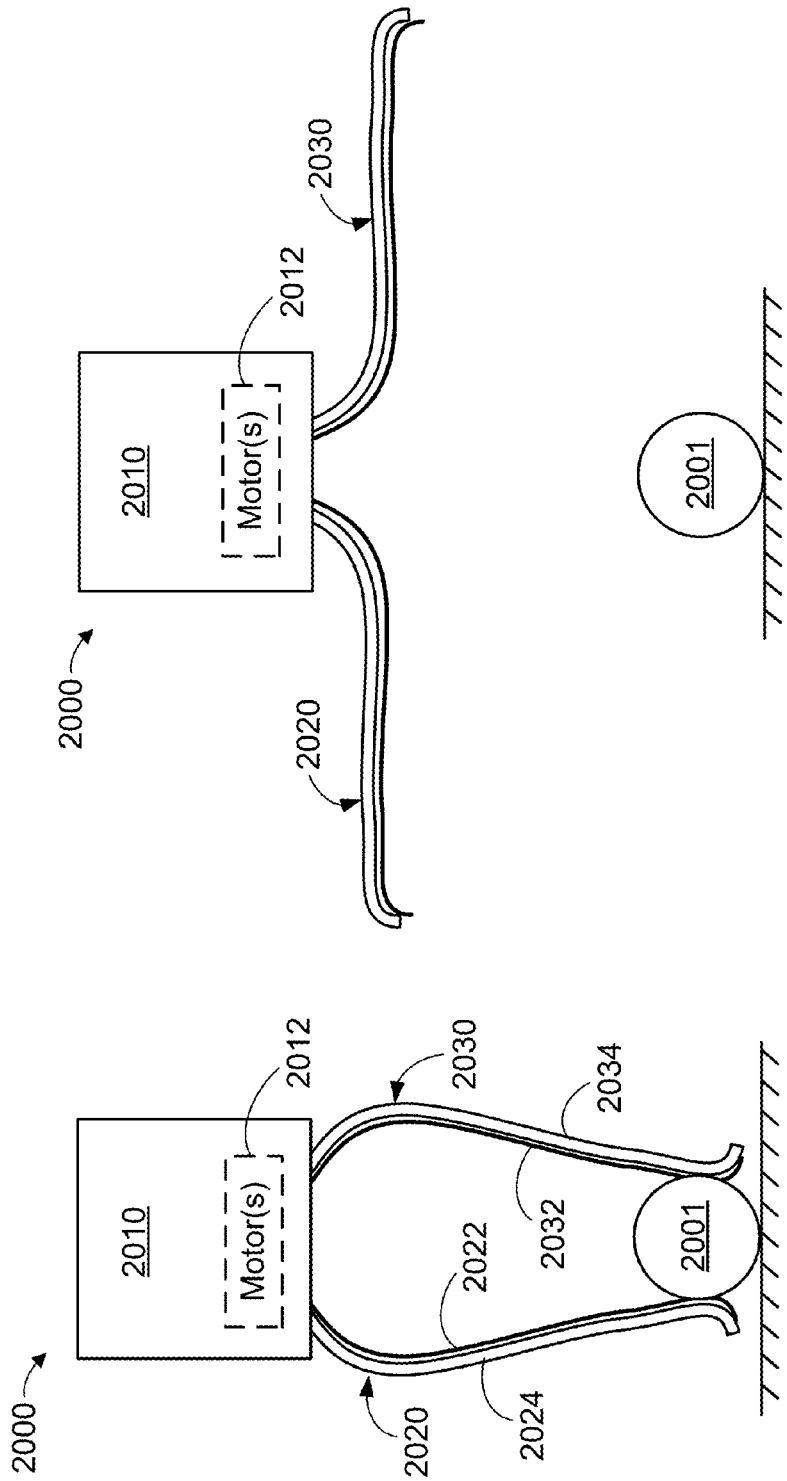

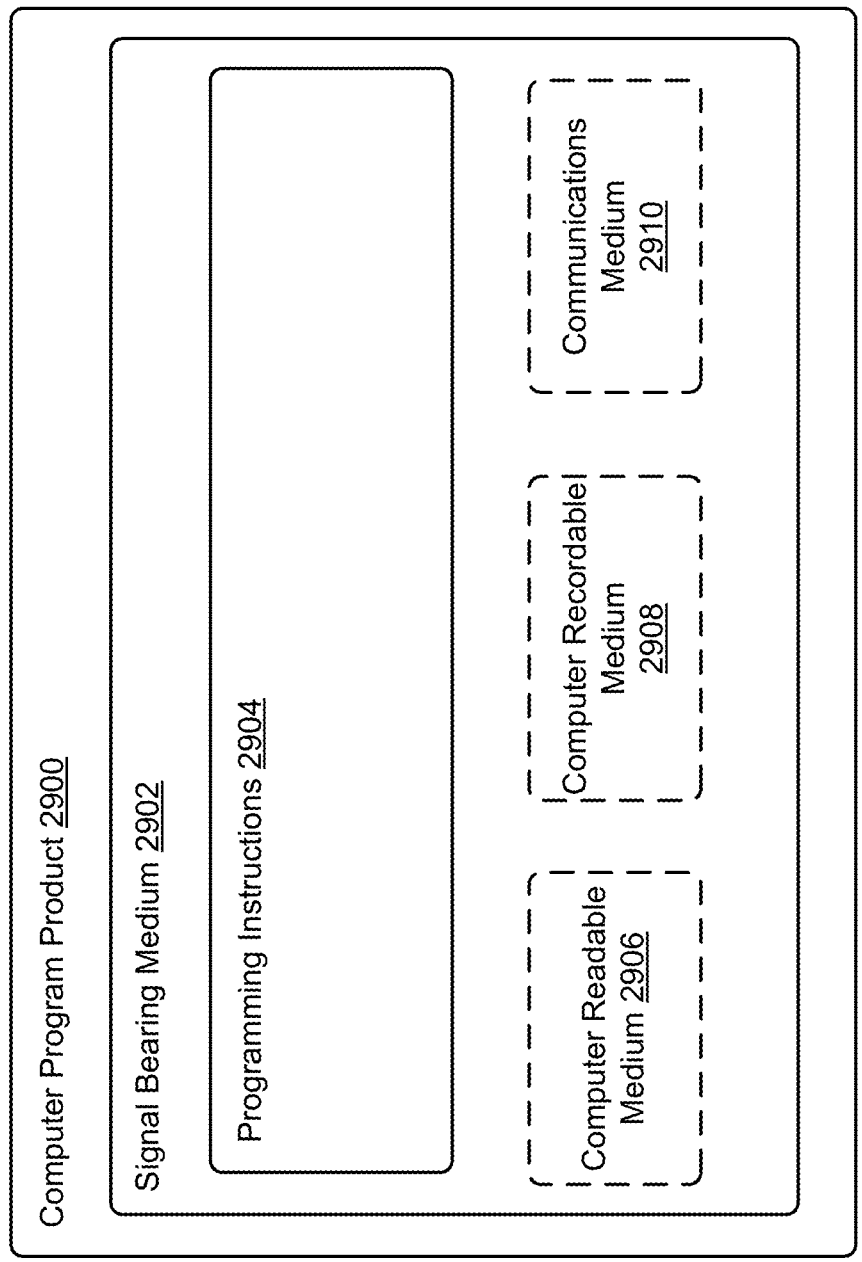

ELECTROADHESIVE HANDLING AND MANIPULATION

CROSS-REFERENCE TO RELATED APPLICATIONS

This application is a continuation-in-part of U.S. patent application Ser. No. 13/668,099, filed Nov. 2, 2012, which is a continuation of U.S. patent application Ser. No. 12/762,260, filed Apr. 16, 2010, now issued as U.S. Pat. No. 8,325,458, and which claims priority to U.S. Provisional Patent Application No. 61/303,216, filed Feb. 10, 2010; this application also claims priority to U.S. Provisional Patent Application No. 61/641,728, filed May 2, 2012, and to U.S. Provisional Patent Application No. 61/739,212, filed Dec. 19, 2012, all of which are incorporated herein by reference in their entireties and for all purposes.

BACKGROUND

Unless otherwise indicated herein, the materials described in this section are not prior art to the claims in this application and are not admitted to be prior art by inclusion in this section.

The mass production of products has led to many innovations over the years. Substantial developments have been made in the industrial handling of various materials and items, particularly in the area of robotics. For example, various types of robotics and other automated systems are now used in order to "pick and place" items during many manufacturing and other materials handling processes. Such robotics and other systems can include robot arms that, for example, grip, lift and/or place an item as part of a designated process. Of course, other manipulations and materials handling techniques can also be accomplished by way of such robotics or other automated systems. Despite many advances over the years in this field, there are limitations as to what can be handled in such a manner.

Conventional robotic grippers typically use either suction or a combination of large normal forces and fine control with mechanical actuation in order to grip objects. Such techniques have several drawbacks. For example, the use of suction tends to require smooth, clean, dry and generally flat surfaces, which limits the types and conditions of objects that can be gripped. Suction also tends to require a lot of power for the pumps and is prone to leaks at any location on a vacuum or low pressure seal, with a resulting loss of suction being potentially catastrophic. The use of mechanical actuation often requires large normal or "crushing" forces against an object, and also tends to limit the ability to robotically grip fragile or delicate objects. Producing large forces also increases the cost of mechanical actuation. Mechanical pumps and conventional mechanical actuation with large crushing forces also often require substantial weight, which is a major disadvantage for some applications, such as the end of a robot arm where added mass must be supported. Furthermore, even when used with sturdy objects, robotic arms, mechanical claws and the like can still leave damaging marks on the surface of the object itself.

Alternative techniques for handling items and materials also have drawbacks. For example, chemical adhesives can leave residues and tend to attract dust and other debris that reduce effectiveness. Chemical adhesives can also require a significant amount of added force to undo or overcome a grip or attachment to an object once such a chemical adhesive grip or attachment is applied, since the gripping interaction and force is typically not reversible in such instances.

Although many systems and techniques for handling materials in an automated fashion have generally worked well in the past, there is always a desired to provide alternative and improved ways of handling items. In particular, what is desirable are new automated systems and techniques that permit the picking and placing or other handling of objects that are large, irregular shaped, dusty and/or fragile, and preferably with little to no use of suction, chemical adhesives or significant mechanical normal forces against the objects.

SUMMARY

Some examples relate to electroadhesive surfaces and devices. Such an electroadhesive surface can include electrodes that are configured to induce an electrostatic attraction with nearby objects when an appropriate voltage or current is applied to the electrodes. In some cases the electrode polarization can induce a corresponding polarization in a nearby object to effect adhesion of the object to the electroadhesive surface. Systems for operating such an electroadhesive surface can include an electroadhesive shear gripper, one or more power supplies and a controller. The power supply can be configured to apply voltage or current to the one or more electrodes in the electroadhesive shear gripper to polarize electrodes in an electroadhesive gripping surface of the shear gripper. The polarized gripping surface of the shear gripper can then be adhered to an exterior surface of an item to be manipulated. The shear gripper can then be used to exert a force at least partially parallel to the exterior surface of the item being manipulated (and the gripping surface, which is adhered to such exterior surface). As used herein, a shear force includes a force between two surfaces that is directed, at least in part, parallel to a plane in which two surfaces meet or otherwise interact. Thus, in some embodiments, an electroadhesive shear gripper is a device that electroadhesively adheres to an item and exerts a force on the item at least partially parallel to the surface of the item that is adhered to. The shear gripper can include a load-bearing structure coupled to the electroadhesive gripping surface to distribute and/or convey the resulting shear forces on the electroadhesive gripping surface to load-receiving and/or load-exerting elements.

Some embodiments of the present disclosure provide a system. The system can include a first shear gripper, a power supply, and a controller. The first shear gripper can include an electroadhesive surface associated with one or more electrodes and a load-bearing structure coupled to the electroadhesive surface. The power supply can be configured to electrically connect to the one or more electrodes associated with the electroadhesive surface. The controller can be configured to (i) cause a voltage to be applied, via the power supply, to the one or more electrodes associated with the electroadhesive surface to thereby cause the first shear gripper to adhere to an item situated proximate the electroadhesive surface and (ii) cause a shear force to be applied to the adhered item, via the load-bearing structure, wherein the shear force is sufficient to move the adhered item.

Some embodiments of the present disclosure provide a system. The system can include an item gripper, a power supply, a control arm, and a controller. The item gripper can include a plurality of flexible electroadhesive surfaces each associated with one or more electrodes. The power supply can be configured to electrically connect to the one or more electrodes associated with each of the plurality of flexible electroadhesive surfaces. The control arm can be configured to manipulate the item gripper. The controller can be configured to (i) cause the control arm to position the item gripper such that at least some of the plurality of flexible electroadhesive surfaces drape around a region including an individual object, (ii) cause a voltage to be applied, via the power supply, to the one or more electrodes associated with the plurality of flexible electroadhesive surfaces to thereby cause the at least some of the plurality of flexible electroadhesive surfaces to adhere to the individual object.

Some embodiments of the present disclosure provide a method. The method can include applying a voltage to one or more electrodes associated with an electroadhesive surface of a first shear gripper to thereby cause the electroadhesive surface to adhere to an item proximate the first shear gripper. The method can include applying a shear force to the adhered item, via a load-bearing structure coupled to the electroadhesive surface, wherein the shear force is sufficient to move the adhered item. The method can include reducing the voltage applied to the one or more electrodes such that the item is released from the first shear gripper.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 6A illustrates in top plan view an example spherical or cylindrical foreign object being gripped by traditional mechanically gripping actuators.

FIG. 6B illustrates in top plan view the foreign object of FIG. 6A being gripped by electroadhesive gripping surfaces.

FIG. 7A illustrates in side perspective view an example force diagram for a foreign object being gripped by traditional mechanically gripping actuators.

FIG. 7B illustrates in top plan view the example force diagram for the foreign object of FIG. 7A.

FIG. 7C illustrates in side perspective view an example force diagram for a foreign object being gripped by electroadhesive gripping surfaces FIG. 7D illustrates in top plan view the example force diagram for the foreign object of FIG. 7C.

FIG. 13C illustrates an end view of an example vertical electroadhesive blade.

FIG. 13D illustrates a top view of the example vertical electroadhesive blade shown in FIG. 13C.

FIG. 14A illustrates a compliant electroadhesive surface with a lengthwise flap that is able to wrap (conform) around an item being manipulated.

FIG. 14B illustrates a compliant electroadhesive surface that includes a deformable spacer to allow the electroadhesive surface to conform to the surface of items being manipulated.

FIG. 14C illustrates a support rod coupled to the back side of a vertical electroadhesive blade to distribute pushing and pulling shear forces on an item being manipulated by the electroadhesive surface.

FIG. 14D illustrates a support structure formed of an insulating material that is curved to resist compressive forces and bending deformation.

FIG. 14E illustrates another support structure formed of an insulating material that is curved to resist compressive forces and bending deformation.

FIG. 17A illustrates a front view of another example vertical electroadhesive gripper configured to urge an item in a direction transverse to the plane of its electroadhesive gripping surface.

FIG. 17B illustrates a top view of the box on the shelf shown in FIG. 17A, and showing the gripper adhered to the front of the box.

FIG. 18A illustrates a front view of another vertical electroadhesive gripper configured to connect to a side corner of an item.

FIG. 18B illustrates a top view of the box on the shelf shown in FIG. 18A, and showing the gripper adhered to the side corner box.

FIG. 20A is a simplified block diagram of an example electroadhesive system including a driven backbone system for positioning the flexible electroadhesive grippers.

FIG. 20B illustrates the example electroadhesive system of FIG. 20A while the individual grippers are set to an open position.

FIG. 29 depicts a computer-readable medium configured according to an example embodiment.

DETAILED DESCRIPTION

Figure 1A:
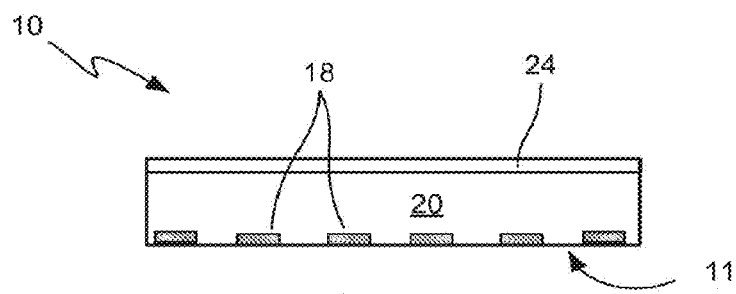
FIG. 1A is a side cross-section of an example electroadhesive end effector.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Some embodiments of the present disclosure find application in item handling. For example, boxes, cases, packages, or other items may be manipulated by a gripper with an electroadhesive surface oriented along one or more sidewalls of the item. The gripper can then be urged in a direction substantially parallel to the plane of the sidewall the electroadhesive surface is attached to, to thereby pull or push the item via the shear force exerted by the electroadhesive surface. A load-bearing structure may be coupled to the electroadhesive surface to bear the strain created by such pushing/pulling. In some embodiments grippers with electroadhesive surfaces are configured to be oriented vertically (e.g., perpendicular to a ground surface) so as to electroadhesively attach to sidewalls of items being manipulated.

In addition, some embodiments of the present disclosure provide flexible electroadhesive grippers useful for adhering to individual items. Such flexible, conformable electroadhesive grippers can be applied in a broad range of automated handling contexts.

Some embodiments of the present disclosure provide for systems that combine vertical grippers to manipulate cases on/off of warehouse shelving with individual item grippers to load/unload individual items from such cases. An integrated system may allow mobile robots operating in warehouse environments to programmatically retrieve individual items from cases loaded on shelves, such as may be done to fulfill orders in warehouse retail environments, for example.

Examples discussed herein also include systems and methods of operation for sorting items secured within containers by electroadhesion. Reducing (or turning off) the electroadhesion causes the items to drop out of the containers. Some systems disclosed herein may provide for identifying or characterizing items loaded in electroadhesively secured containers. Based on the identification and/or characterization, a delivery area associated with the identifying information can be determined. The containers can then be moved with respect to a set of delivery areas and the items can be selectively released from the electroadhesively secured containers so as to drop into the item-specific delivery areas determined for each item. For example, electroadhesion can be reduced (or even turned off) for particular containers as they pass over particular delivery areas to allow the contents within to drop out and land within the delivery area. The system can thus be used to sort a set of packages or other items into a series of delivery areas based on identifying information associated with each item. Such systems may find application in handling and sorting luggage, parcels, mail, and other items.

II. Example Electroadhesive Systems

As the term is used herein, 'electroadhesion' refers to the mechanical coupling of two objects using electrostatic forces. Electroadhesion as described herein uses electrical control of these electrostatic forces to permit temporary and detachable attachment between two objects. This electrostatic adhesion holds two surfaces of these objects together or increases the effective traction or friction between two surfaces due to electrostatic forces created by an applied electric field. In addition to holding two flat, smooth and generally conductive surfaces together, disclosed herein are electroadhesion devices and techniques that do not limit the material properties or surface roughness of the objects subject to electroadhesive forces and handling. In some cases, an electroadhesive surface may be a compliant surface to facilitate electroadhesive attraction independent of surface roughness. For example, the electroadhesive surface may have sufficient flexibility for the surface to follow local non-uniformities and/or imperfections of an exterior surface of an adhered object. For example, the electroadhesive surface can at least partially conform to microscopic, mesoscopic, and/or macroscopic surface features. When an appropriate voltage is applied to such a compliant electroadhesive surface, the electroadhesive surface is attracted to the exterior surface of the adhered object, and the attraction causes the electroadhesive surface to at least partially conform to the exterior surface by flexing locally such that the electroadhesive surface moves toward the exterior surface.

Turning first to FIG. 1A, an example electroadhesive end effector is illustrated in elevated cross-sectional view. Electroadhesive end effector 10 includes one or more electrodes 18 located at or near an "electroadhesive gripping surface" 11 thereof, as well as an insulating material 20 between electrodes and a backing 24 or other supporting structural component. For purposes of illustration, electroadhesive end effector 10 is shown as having six electrodes in three pairs, although it will be readily appreciated that more or fewer electrodes can be used in a given electroadhesive end effector. Where only a single electrode is used in a given electroadhesive end effector, a complimentary electroadhesive end effector having at least one electrode of the opposite polarity is preferably used therewith. With respect to size, electroadhesive end effector 10 is substantially scale invariant. That is, electroadhesive end effector sizes may range from less than 1 square centimeter to greater than several meters in surface area. Even larger and smaller surface areas are also possible, and may be sized to the needs of a given application.

Figure 1B:
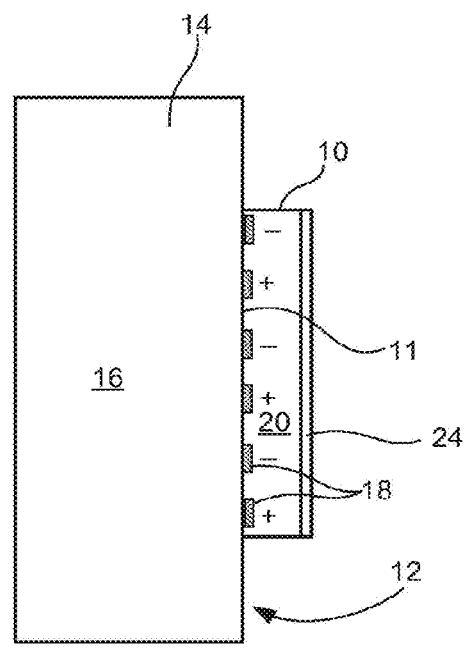
FIG. 1B illustrates in side cross-sectional view the example electroadhesive end effector of FIG. 1A adhered to a foreign object.

FIG. 1B depicts in elevated cross-sectional view of the example electroadhesive end effector 10 of FIG. 1A adhered to a foreign object 14. Foreign object 14 includes surface 12 and inner material 16. Electroadhesive gripping surface 11 of electroadhesive end effector 10 is placed against or nearby surface 12 of foreign object 14. An electrostatic adhesion voltage is then applied via electrodes 18 using external control electronics (not shown) in electrical communication with the electrodes 18. As shown in FIG. 1B, the electrostatic adhesion voltage uses alternating positive and negative charges on neighboring electrodes 18. As a result of the voltage difference between electrodes 18, one or more electroadhesive forces are generated, which electroadhesive forces act to hold the electroadhesive end effector 10 and foreign object 14 against each other. Due to the nature of the forces being applied, it will be readily appreciated that actual contact between electroadhesive end effector 10 and foreign object 14 is not necessary. Rather sufficient proximity to allow the electric field based electroadhesive interaction to take place is all that is necessary. For example, a piece of paper, thin film, or other material or substrate may be placed between electroadhesive end effector 10 and foreign object 14. Furthermore, although the term "contact" is used herein to denote the interaction between an electroadhesive end effector and a foreign object, it will be understood that actual direct surface to surface contact is not always required, such that one or more thin objects such as an insulator, can be disposed between an end effector or electroadhesive gripping surface and the foreign object. In some embodiments such an insulator between the gripping surface and foreign object can be a part of the end effector, while in others it can be a separate item or device.

Additionally or alternatively, there may be a gap between the electroadhesive gripping surface and the object being gripped and this gap can be decreased upon activation of the electroadhesive force. For example, the electroadhesive force can cause the electroadhesive gripping surface to move closer to the exterior surface of the object being gripped so as to close the gap. Moreover, the electroadhesive attraction can cause the gripping surface to move toward the exterior surface of the object being gripped at multiple points across the surface area of the gripping surface. For example, the compliant gripping surface to conform to the exterior surface microscopically, mesoscopically, and/or macroscopically. Such local gap-closing by the gripping surface can thereby cause the gripping surface to (at least partially) conform to the exterior surface of the object. Electroadhesive gripping surfaces with sufficient flexibility to conform to local non-uniformities, surface imperfections and other micro-variations and/or macro-variations in exterior surfaces of objects being adhered to are referred to herein as compliant gripping surfaces. However, it is understood that any of the gripping surfaces described herein may exhibit such compliance whether specifically referred to as compliant gripping surfaces or not.

Figure 1C:
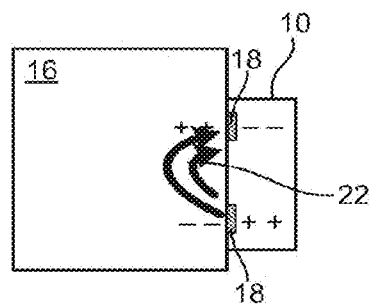
FIG. 1C illustrates in side cross-sectional close-up view an electric field formed in the foreign object of FIG. 1B as result of the voltage difference between electrodes in the adhered example electroadhesive end effector.

FIG. 1C illustrates in elevated cross-sectional close-up view an electric field formed in the foreign object of FIG. 1B as a result of the voltage difference between electrodes in the adhered example electroadhesive end effector 10. While the electroadhesive end effector 10 is placed against foreign object 14 and an electrostatic adhesion voltage is applied, an electric field 22 forms in the inner material 16 of the foreign object 14. The electric field 22 locally polarizes inner material 16 or induces direct charges on material 16 locally opposite to the charge on the electrodes of the end effector 118 and thus causes electrostatic adhesion between the electrodes 18 (and end effector 10) and the induced charges on the foreign object 16. The induced charges may be the result of a dielectric polarization or from weakly conductive materials and electrostatic induction of charge. In the event that the inner material 16 is a strong conductor, such as copper for example, the induced charges may completely cancel the electric field 22. In this case the internal electric field 22 is zero, but the induced charges nonetheless still form and provide electrostatic force to the electroadhesive end effector.

Thus, the electrostatic adhesion voltage provides an overall electrostatic force, between the electroadhesive end effector 10 and inner material 16 beneath surface 12 of foreign object 14, which electrostatic force maintains the current position of the electroadhesive end effector relative to the surface of the foreign object. The overall electrostatic force may be sufficient to overcome the gravitational pull on the foreign object 14, such that the electroadhesive end effector 10 may be used to hold the foreign object aloft. In various embodiments, a plurality of electroadhesive end effectors may be placed against foreign object 14, such that additional electrostatic forces against the object can be provided. The combination of electrostatic forces may be sufficient to lift, move, pick and place, or otherwise handle the foreign object. Electroadhesive end effector 10 may also be attached to other structures and hold these additional structures aloft, or it may be used on sloped or slippery surfaces to increase normal friction forces.

Removal of the electrostatic adhesion voltages from electrodes 18 ceases the electrostatic adhesion force between electroadhesive end effector 10 and the surface 12 of foreign object 14. Thus, when there is no electrostatic adhesion voltage between electrodes 18, electroadhesive end effector 10 can move more readily relative to surface 12. This condition allows the electroadhesive end effector 10 to move before and after an electrostatic adhesion voltage is applied. Well controlled electrical activation and de-activation enables fast adhesion and detachment, such as response times less than about 50 milliseconds, for example, while consuming relatively small amounts of power.

Electroadhesive end effector 10 includes electrodes 18 on an outside surface 11 of an insulating material 20. This embodiment is well suited for controlled attachment to insulating and weakly conductive inner materials 14 of various foreign objects 16. Other electroadhesive end effector 10 relationships between electrodes 18 and insulating materials 20 are also contemplated and suitable for use with a broader range of materials, including conductive materials. For example, a thin electrically insulating material (not shown) can be located on the surfaces of the electrodes. As will be readily appreciated, a shorter distance between surfaces 11 and 12 as well as the material properties of such an electrically insulating material results in a stronger electroadhesive attraction between the objects due to the distance dependence of the field-based induced electroadhesive forces. Accordingly, a deformable surface 11 adapted to at least partially conform to the surface 12 of the foreign object 14 can be used.

As the term is used herein, an electrostatic adhesion voltage refers to a voltage that produces a suitable electrostatic force to couple electroadhesive end effector 10 to a foreign object 14. The minimum voltage needed for electroadhesive end effector 10 will vary with a number of factors, such as: the size of electroadhesive end effector 10, the material conductivity and spacing of electrodes 18, the insulating material 20, the foreign object material 16, the presence of any disturbances to electroadhesion such as dust, other particulates or moisture, the weight of any objects being supported by the electroadhesive force, compliance of the electroadhesive device, the dielectric and resistivity properties of the foreign object, and/or the relevant gaps between electrodes and foreign object surface. In one embodiment, the electrostatic adhesion voltage includes a differential voltage between the electrodes 18 that is between about 500 volts and about 10 kilovolts. Even lower voltages may be used in micro applications. In one embodiment, the differential voltage is between about 2 kilovolts and about 5 kilovolts. Voltage for one electrode can be zero. Alternating positive and negative charges may also be applied to adjacent electrodes 18. The voltage on a single electrode may be varied in time, and in particular may be alternated between positive and negative charge so as to not develop substantial long-term charging of the foreign object. The resultant clamping forces will vary with the specifics of a particular electroadhesive end effector 10, the material it adheres to, any particulate disturbances, surface roughness, and so forth. In general, electroadhesion as described herein provides a wide range of clamping pressures, generally defined as the attractive force applied by the electroadhesive end effector divided by the area thereof in contact with the foreign object.

The actual electroadhesion forces and pressure will vary with design and a number of factors. In one embodiment, electroadhesive end effector 10 provides electroadhesive attraction pressures between about 0.7 kPa (about 0.1 psi) and about 70 kPa (about 10 psi), although other amounts and ranges are certainly possible. The amount of force needed for a particular application may be readily achieved by varying the area of the contacting surfaces, varying the applied voltage, and/or varying the distance between the electrodes and foreign object surface, although other relevant factors may also be manipulated as desired.

Because an electrostatic adhesion force is the primary force used to hold, move or otherwise manipulate a foreign object, rather than a traditional mechanical or "crushing" force, the electroadhesive end effector 10 can be used in a broader set of applications. For example, electroadhesive end effector 10 is well suited for use with rough surfaces, or surfaces with macroscopic curvature or complex shape. In one embodiment, surface 12 includes roughness greater than about 100 microns. In a specific embodiment, surface 12 includes roughness greater than about 3 millimeters. In addition, electroadhesive end effector 10 can be used on objects that are dusty or dirty, as well as objects that are fragile. Objects of varying sizes and shapes can also be handled by one or more electroadhesive end effectors, as set forth in greater detail below. Various additional details and embodiments regarding electroadhesion and applications thereof can be found at, for example, commonly owned U.S. Pat. Nos. 7,551,419 and 7,554,787, which are incorporated by reference herein in their entirety and for all purposes.

2b) Electroadhesive Gripping Surfaces

Although electroadhesive end effector 10 having electroadhesive gripping surface 11 of FIG. 1A is shown as having six electrodes 18, it will be understood that a given electroadhesive end effector or gripping surface can have just a single electrode. Furthermore, it will be readily appreciated that a given electroadhesive end effector can have a plurality of different electroadhesive gripping surfaces, with each separate electroadhesive gripping surface having at least one electrode and being adapted to be placed against or in close proximity to the foreign object to be gripped. Although the terms electroadhesive end effector, electroadhesive gripping unit and electroadhesive gripping surface are all used herein to designate electroadhesive components of interest, it will be understood that these various terms can be used interchangeably in various contexts. In particular, while a given "end effector" might comprise numerous distinct "gripping surfaces," these different gripping surfaces might also be considered separate end effectors themselves. Embodiments with multiple different gripping surfaces may be considered as one single end effector or may also be considered as numerous different end effectors acting in concert.

Figure 2A:
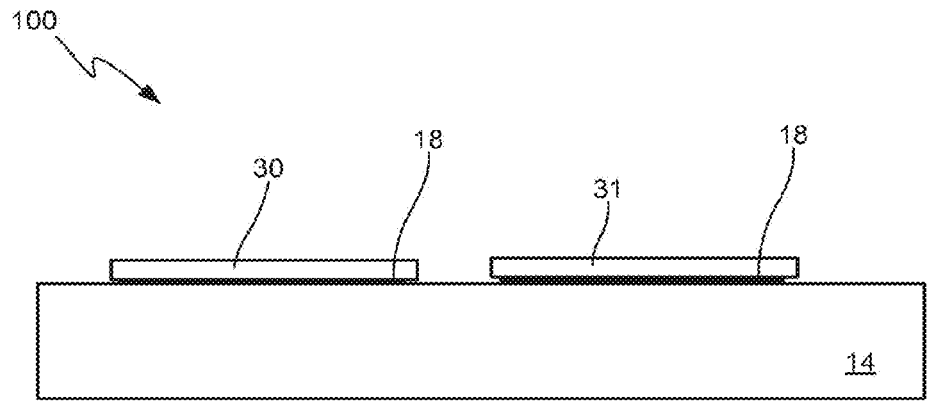
FIG. 2A illustrates in side cross-sectional view an example pair of electroadhesive gripping surfaces or end effectors having single electrodes thereon.
Figure 2B:
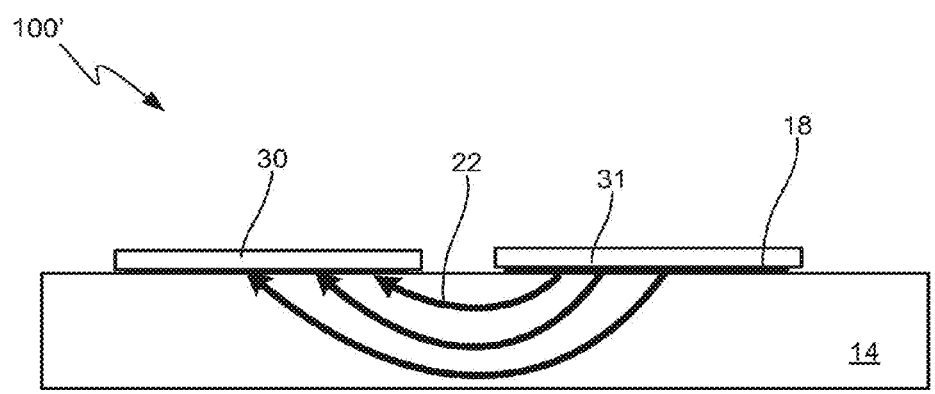
FIG. 2B illustrates in side cross-sectional view the example pair of electroadhesive gripping surfaces or end effectors of FIG. 2A with voltage applied thereto.

Referring to FIGS. 2A and 2B, an example pair of electroadhesive end effectors or gripping surfaces having single electrodes thereon is shown in side cross-sectional view. FIG. 2A depicts electroadhesive gripping system 100 having electroadhesive end effectors or gripping surfaces 30, 31 that are in contact with the surface of a foreign object 16, while FIG. 2B depicts activated electroadhesive gripping system 100' with the end effectors or gripping surfaces having voltage applied thereto. Electroadhesive gripping system 100 includes two electroadhesive end effectors or gripping surfaces 30, 31 that directly contact the foreign object 16. Each electroadhesive end effector or gripping surface 30, 31 has a single electrode 18 coupled thereto. In such cases, the electroadhesive gripping system can be designed to use the foreign object as an insulation material. When voltage is applied, an electric field 22 forms within foreign object 14, and an electrostatic force between the electroadhesive end effectors or gripping surfaces 30, 31 and the foreign object is created. Various embodiments that include numerous of these single electrode electroadhesive end effectors can be used, as will be readily appreciated.

Figure 3A:
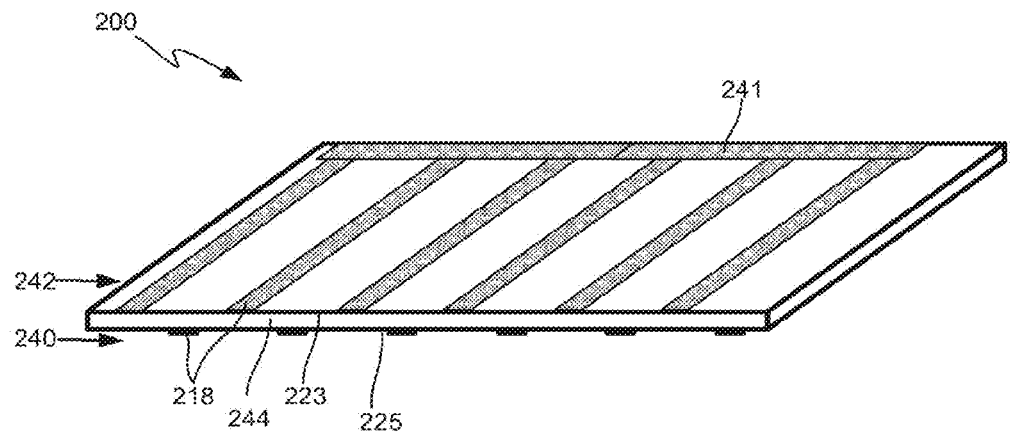
FIG. 3A illustrates in top perspective view an example electroadhesive gripping surface in the form of a sheet with electrodes patterned on top and bottom surfaces thereof.
Figure 3B:
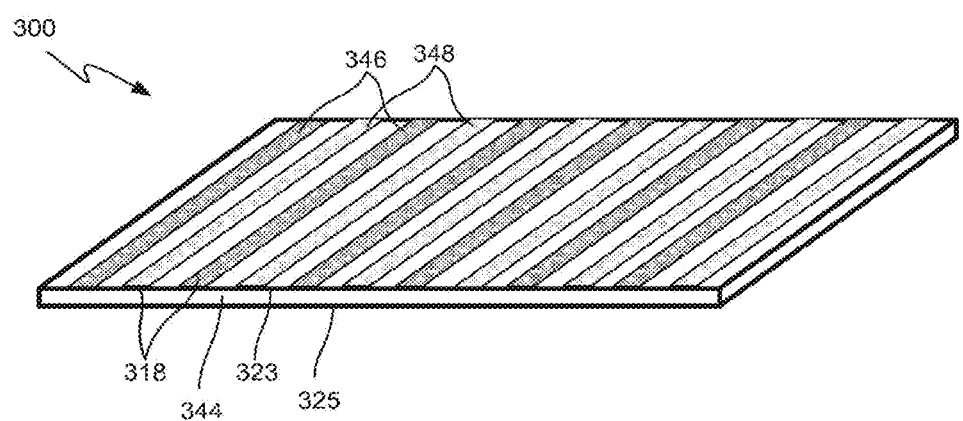
FIG. 3B illustrates in top perspective view another example electroadhesive gripping surface in the form of a sheet with electrodes patterned on a single surface thereof.

In some embodiments, an electroadhesive gripping surface can take the form of a flat panel or sheet having a plurality of electrodes thereon. In other embodiments, the gripping surface can take a fixed shape that is matched to the geometry of the foreign object most commonly lifted or handled. For example, a curved geometry can be used to match the geometry of a cylindrical paint can or soda can. The electrodes may be enhanced by various means, such as by being patterned on an adhesive device surface to improve electroadhesive performance, or by making them using soft or flexible materials to increase compliance and thus conformance to irregular surfaces on foreign objects. Turning next to FIGS. 3A and 3B, two examples of electroadhesive gripping surfaces in the form of flat panels or sheets with electrodes patterned on surfaces thereof are shown in top perspective view. FIG. 3A shows electroadhesive gripping surface 200 in the form of a sheet or flat panel with electrodes 218 patterned on top and bottom surfaces thereof. Top and bottom electrodes sets 240 and 242 are interdigitated on opposite sides of an insulating layer 244. In some cases, insulating layer 244 can be formed of a stiff or rigid material. In some cases, the electrodes as well as the insulating layer 244 may be compliant and composed of a polymer, such as an acrylic elastomer, to increase compliance. In one preferred embodiment the modulus of the polymer is below about 100 MPa and in another preferred embodiment it is more specifically below about 1 MPa. Various known types of compliant electrodes are suitable for use with the devices and techniques described herein, and examples are described in commonly owned U.S. Pat. No. 7,034,432, which is incorporated by reference herein in its entirety and for all purposes.

Electrode set 242 is disposed on a top surface 223 of insulating layer 244, and includes an array of linear patterned electrodes 218. A common electrode 241 electrically couples electrodes 218 in set 242 and permits electrical communication with all the electrodes 218 in set 242 using a single input lead to common electrode 241. Electrode set 240 is disposed on a bottom surface 225 of insulating layer 244, and includes a second array of linear patterned electrodes 218 that is laterally displaced from electrodes 218 on the top surface. Bottom electrode set 240 may also include a common electrode (not shown). Electrodes can be patterned on opposite sides of an insulating layer 244 to increase the ability of the electroadhesive end effector 200 to withstand higher voltage differences without being limited by breakdown in the air gap between the electrodes, as will be readily appreciated.

Alternatively, electrodes may also be patterned on the same surface of the insulating layer, such as that which is shown in FIG. 3B. As shown, electroadhesive gripping surface 300 comprises a sheet or flat panel with electrodes 318 patterned only on one surface thereof. Electroadhesive gripping surface 300 can be substantially similar to electroadhesive gripping surface 200 of FIG. 3A, except that electrodes sets 346 and 348 are interdigitated on the same surface 323 of a compliant insulating layer 344. No electrodes are located on the bottom surface 325 of insulating layer 344. This particular embodiment decreases the distance between the positive electrodes 318 in set 346 and negative electrodes 318 in set 348, and allows the placement of both sets of electrodes on the same surface of electroadhesive gripping surface 300. Functionally, this eliminates the spacing between the electrodes sets 346 and 348 due to insulating layer 344, as in embodiment 200. It also eliminates the gap between one set of electrodes (previously on bottom surface 125) and the foreign object surface when the top surface 323 adheres to the foreign object surface. In some cases, the electrode surface 323 may be further coated with an insulating material (not shown) so that the electrodes 346 and 348 are completely sandwiched (e.g., encapsulated) between insulating materials. Although either embodiment 200 or 300 can be used, these changes in the latter embodiment 300 provide relatively greater electroadhesive forces between electroadhesive gripping surface 300 and the subject foreign object to be handled due to the closer proximity of both sets of electrodes 346, 348 to the foreign object surface.

In some embodiments, an electroadhesive end effector or gripping surface may comprise a sheet or veil type grasper that is substantially flexible in nature. In such embodiments, either no backing structure or a substantially flexible backing structure can be used, such that all or a portion of the veil type end effector or gripping surface can substantially flex or otherwise conform to a foreign object or objects, as may be desired for a given application. Creating electroadhesive end effectors that facilitate such conforming or compliance to a foreign object can be achieved, for example, by forming the electroadhesive layer or gripping surface out of thin materials, by using foam or elastic materials, by butting out flaps or extensions from a primary electroadhesive sheet, or by applying the sheet only to a few selected underlying locations, rather than to an entire rigid backing, among other possibilities.

Although the foregoing exemplary embodiments for electroadhesive gripping surfaces in the form of flat panels or sheets depict bars or stripes for electrodes, it will be understood that any suitable pattern for electrodes could also be used for such a sheet-type electroadhesive gripping surface. For example, a sheet-type electroadhesive gripping surface could have electrodes in the form of discrete squares or circles that are distributed about the sheet and polarized in an appropriate manner, such as in an evenly spaced "polka-dot" style pattern. Other examples such as two sets of electrodes patterned as offset spirals, can also be used. As one particular example, where a thin and flexible material is used for the insulating layer, such as a polymer, and where electrodes are distributed thereabout in the form of discrete discs, a resulting flexible and compliant electroadhesive gripping surface "blanket" would be able to conform to the irregular surfaces of a relatively large object while providing numerous different and discrete electroadhesive forces thereto during voltage application.

2c) Penetration Depth Tuning

Fine control of the amount of voltage to the electrodes in a given single or set of electroadhesive end effectors can significantly affect the handling of foreign objects thereby. Varying the voltage to the electrodes results in varying the applied electrostatic or electroadhesive force between an electroadhesive end effector and an object to be handled. Such variances in the overall electroadhesive force applied to a foreign object can result in certain beneficial results, such as only a portion of the object being lifted, held or moved. A simple example of varying the amount of voltage to electroadhesive end effector electrodes to affect a result can involve flat panel or sheet-type end effectors used to pick up a stack of paper. Variances in the electroadhesive force can also be used to controllably slide objects relative to the end effector. Such controlled sliding is especially useful when repositioning objects within a grip such as repositioning a pen within a grip, or rotating a cuboid shaped object inside a robotic hand.

Figure 4A:
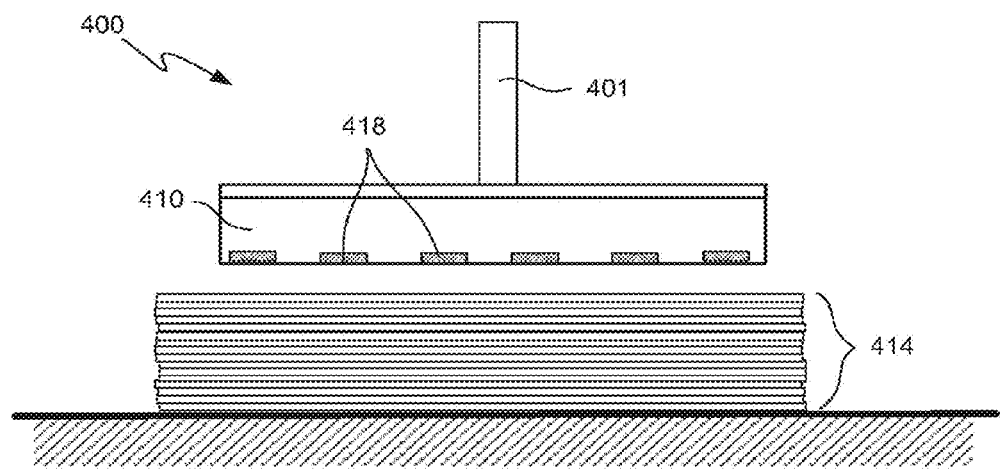
FIG. 4A illustrates in side elevated view an example flat electroadhesive end effector adapted to utilize a variable voltage.
Figure 4B:
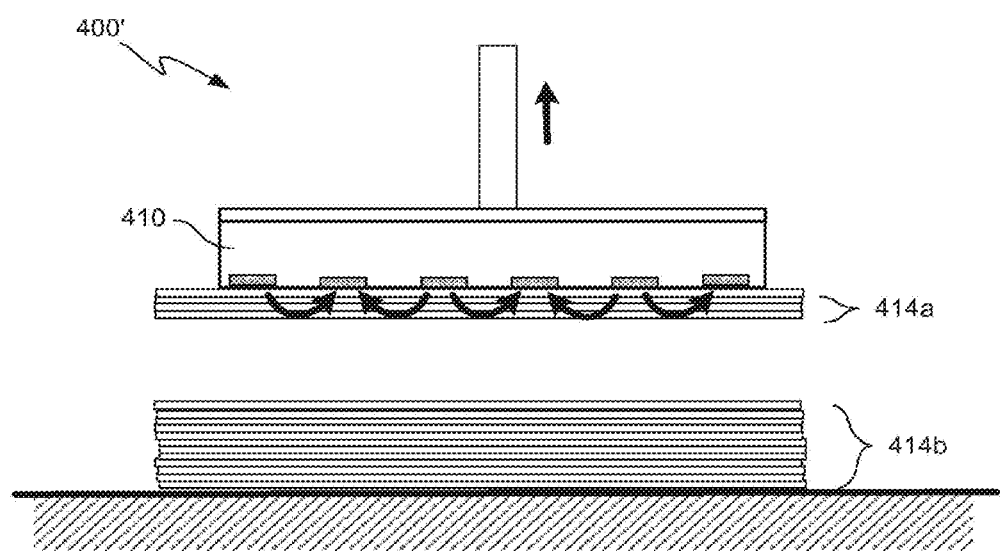
FIG. 4B illustrates in side elevated view the example electroadhesive end effector of FIG. 4A having a tuned applied voltage and picking up only a portion of a foreign object.

Continuing with FIGS. 4A and 4B, an example flat electroadhesive end effector adapted to utilize a variable voltage is illustrated in side elevated view. Electroadhesive gripping system 400 includes a flat electroadhesive end effector 410 having a plurality of electrodes 418 disposed on at least one gripping surface thereof, as well as a handle 401, bar or other tool that enables the manipulation of the end effector by a user or machine. Electroadhesive end effector 410 can include, for example, one of the flat panel or sheet-type electroadhesive gripping surfaces 200, 300 described above, although other variations for an end effector are also certainly possible. A stack of paper 414 represents the object to be handled by electroadhesive gripping system 400.

From its position in FIG. 4A, electroadhesive end effector 410 is lowered onto the stack of paper 414 and voltage is applied to the end effector. Once the appropriate level of voltage is applied and maintained, the electroadhesive end effector 410 is then lifted, as shown in modified electroadhesive gripping system 400 in FIG. 4B. Stack of paper 414 is then separated into two parts, lifted portion 414a and remaining portion 414b. As shown, lifted stack of paper 414a includes exactly four sheets of paper, while the remaining sheets are not lifted. The number of sheets that are lifted is dependent upon the "penetration depth" of the electroadhesive force, which is related to a number of factors.

Again, such factors can include applied voltage, the amount of surface area contacted, electroadhesive end effector size, electrode material conductivity and spacing, insulating material composition, foreign object material composition, gap distance between electrodes and the foreign object, and the presence of dust, moisture or other disturbances to electroadhesion, among others. Of all such factors though, the amount of applied voltage is one that is particularly controllable. As such, the amount of voltage that is applied to electrodes 418 can be varied or precisely "tuned" such that a desired exact number of sheets of paper are lifted.

In the example of FIGS. 4A and 4B, when no voltage is applied to the electrodes 418, then electroadhesive end effector 410 does not pick up or manipulate any of the paper stack 414. When a low voltage (V1) is applied to the electroadhesive end effector 410, then exactly one sheet of paper can be reliably picked up or moved around from the stack of paper 414. When a slightly higher voltage (V2) is applied, then exactly two sheets of paper can be similarly manipulated. When an even higher voltage is applied (V3), even more sheets can be picked up, such as the four sheets 414a shown in FIG. 4B. Further variations in the applied voltage can then be used to pick up different amounts of paper sheets.

Potential enhancements can include using such electroadhesion along with an active circuit that tunes the voltage, while simultaneously measuring capacitance to determine the actual number of sheets of paper that are coupled to the electroadhesive end effector. Rise time for the voltage can also be monitored as an indirect measure of capacitance, and the voltage can be tuned accordingly. Other measures to measure or quantify number of sheets lifted, such as mechanical thickness of the stack that is picked up, can also be used in a feedback loop to control the electroadhesive voltage.

Potential uses can include the handling of paper in printers, copiers, facsimile machines and the like, and even in industrial paper handling equipment, such as ATM machines or other machines handling bills or notes. Other applications can include handling sheets of laminates, such as for countertops, for example. One of skill in the art will readily appreciate the extrapolation of this concept to other more complex foreign objects, such that under one voltage an entire foreign object can be lifted, moved or otherwise manipulated, while under another lower voltage only a part or component of that foreign object is similarly moved or manipulated. Lowering the voltage in one part of a given electroadhesive gripping surface or end effector while maintaining higher voltage in another part also allows pivoting or repositioning the object within the grasp without requiring very fine control of the mechanical position and forces applied to the object.

2d) Peeling Resistance

One drawback to the use of electroadhesion, such as that which is set forth in the foregoing examples, is the tendency for a peeling or falling away effect at the edges of the contact surface areas where an electroadhesive end effector or gripping surface and foreign object or substrate meet. In some cases, the gripping surface can utilize a property of lower electroadhesive peel forces, especially during the release of an object after relocating or reorienting it to a new position to enhance the speed of release or to ensure complete detachment of the object. In many other cases, however, the lower peeling force is an important design consideration for optimal performance of the end effector or gripping surface. This can be particularly true for instances where objects extend and have significant weight beyond the edges of the electroadhesive end effector or gripping surface, such as in the foregoing paper lifting example of FIGS. 4A and 4B. Various modifications and techniques can be used to counteract or diminish such peeling effects.

Figure 5A:
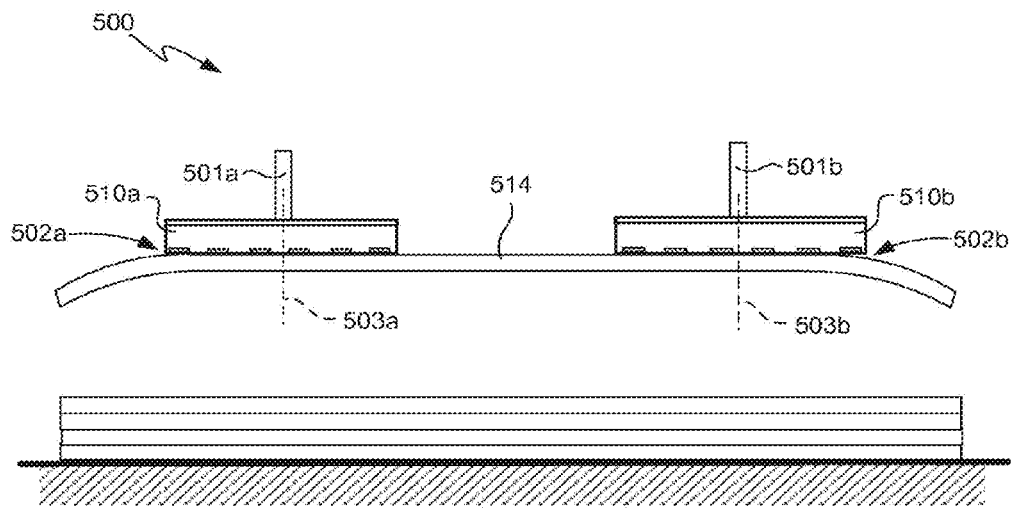
FIG. 5A illustrates in side elevated view an example electroadhesive gripping system having two electroadhesive gripping surfaces suitable for lifting thin and flexible foreign objects.

Turning now to FIG. 5A, an exemplary electroadhesive gripping system having two electroadhesive gripping surfaces suitable for lifting flexible foreign objects is shown in side elevated view. Electroadhesive gripping system 500 includes two electroadhesive end effectors or gripping surfaces 510a, 510b arranged at a distance with respect to each other, and each having its own separate handle 501a, 501b or other device to facilitate lifting or handling. This arrangement generally means that the different "a" and "b" items belong to different electroadhesive end effectors, as will be readily appreciated. Such an arrangement can enable the system 500 to lift or handle relatively large objects or materials, such as large sheets of paper, fabric, prepreg or the like. For purposes of illustration, system 500 can be arranged to lift and move a sheet of prepreg material 514 from a stack of such materials. The weight of such a material, particular at its outer edges, can cause a peeling effect.

Under regular use, both electroadhesive end effectors (or gripping surfaces) 510a and 510b are lowered to contact the surface of sheet 514. That is, a first electroadhesive end effector 501a contacts a first surface region of sheet or other foreign object 514 such that a first line 503a normal to a first surface of contact between the first electroadhesive end effector 501a and the sheet 514 is created. Similarly, a second electroadhesive end effector 501b contacts a second separate surface region of sheet 514 such that a second line 503b normal to a second surface of contact between the second electroadhesive end effector 501b and the sheet 514 is created. Under regular use, such as where the stack of sheets produces a relatively flat upper surface, this results in a placement of electroadhesive end effectors such that the first normal line 503a and the second normal line 503b are substantially parallel in nature, as shown in FIG. 5A. Alternatively, it can be considered that the first and second surfaces of contact lie substantially within the same plane.

As noted, one possible undesirable result from such an arrangement is that sheet 514 can tend to peel away from the edges of the end effectors. For example, while there is little to no peeling or gap 502a at the outer edge of electroadhesive end effector 510a, the other electroadhesive end effector 510b may experience some peeling at its outer edge, such as that seen at gap 502b. Of course, some instances may involve peeling at both edges, other instance may involve peeling at the inner edges of each end effector as well, while still others may involve no peeling at all. In any event, such peeling is undesirable, since the resulting reduction in force at the precise location where the surfaces of both objects diverge may lead to the precipitation of even further peeling. In some instances, the entire foreign object may be peeled away from the electroadhesive end effector once peeling starts.

Figure 5B:
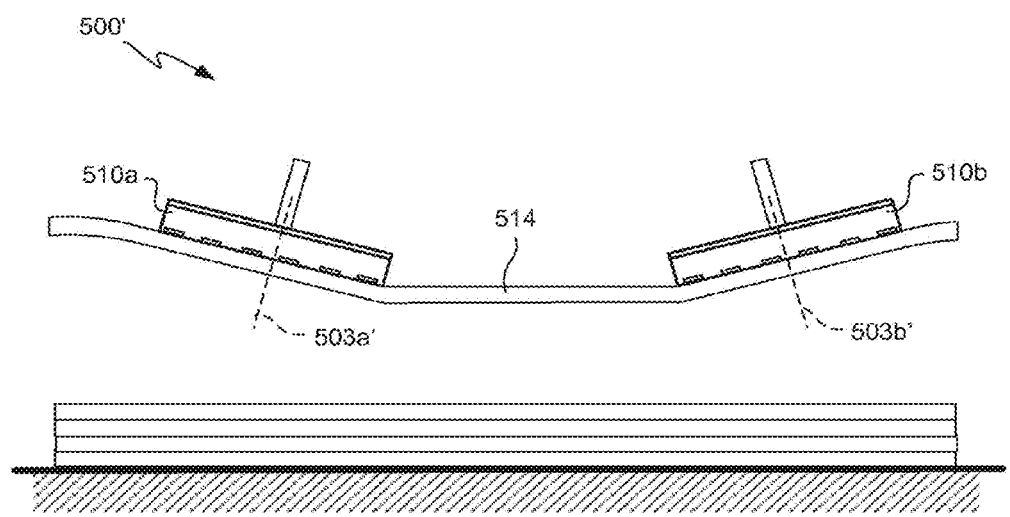
FIG. 5B illustrates in side elevated view the example electroadhesive gripping system of FIG. 5A having its two electroadhesive gripping surfaces rotated at an angle to minimize peeling.

One technique for dealing with peeling is to rotate the electroadhesive end effectors or gripping surfaces. FIG. 5B illustrates in side elevated view the example electroadhesive gripping system of FIG. 5A having its two electroadhesive end effectors or gripping surfaces rotated at an angle so as to minimize peeling. In modified electroadhesive gripping system 500', both electroadhesive end effectors 510a, 510b have been rotated outward somewhat, such that the normal lines 503a', 503b' are no longer parallel to each other. Alternatively, it can be considered that the first and second surfaces of contact do not lie substantially within the same plane. Although the amount of rotation on each end effector is definitely noticeable as shown, it is also contemplated that such an amount of rotation can be lessened without losing the benefits of such an arrangement. By rotating the electroadhesive end effectors such that their respective normal lines are no longer parallel (or surfaces of contact do not lie within the same plane), the relatively flexible material of sheet 514 can be pulled taut or otherwise have any slack therein reduced. This in turn reduces the tendency of the material to peel away from the edges of the electroadhesive end effectors, particularly at the inside edges.

Another technique that can be used to combat peeling is to vary the voltages to different electrodes, in the event that each electroadhesive end effector has a plurality of electrodes. Under such an arrangement, more voltage can be delivered to the outer electrodes near the outer edge of an electroadhesive end effector (i.e., near gaps 502a and 502b), than is delivered to other electrodes. This arrangement can be particularly beneficial where a finely tuned voltage is being used to pick up an exact number of sheets, but peeling of the sheets away from the outer edges of the end effectors is to be eliminated or minimized.

Yet another technique is to vary the distance or tension between the gripping surfaces, such that a mechanical force is applied to keep the sheet 514 taut and minimize droop or peeling forces. Other techniques to mitigate peeling forces include the addition of geometrical features to the electroadhesive gripping surface of one or more end effectors 502a and 502b. Such geometrical features may include cutting flaps out of the electroadhesive gripping surface, or the addition of fibers or hair-like structures to the electroadhesive gripping surface.

2e) Gripping

Although the foregoing examples have been limited to foreign objects having flat surfaces, particularly thin sheets and the like, a wide variety of different foreign objects can be gripped and handled through the use of such electroadhesive end effectors. In particular, the strategic use of multiple electroadhesive end effectors can overcome many of the drawbacks associated with traditional mechanical pick and place processes, such as for robotics or other manufacturing applications.

Moving to FIG. 6A, an exemplary spherical or cylindrical foreign object being gripped by traditional mechanically gripping actuators is illustrated in top plan view. Mechanical gripping system 600 includes four mechanical gripping actuators or components 605a, 605b, 605c, 605d placed at various different surface locations of foreign object 614. Because mechanical "crushing" forces are used to grip and handle the foreign object 614, it is typical for the various actuators 605 to be located on opposite sides of the object from each other. In order for the object 614 to be gripped and handled, each actuator exerts a significant mechanical crushing or squeezing force, 606a, 606b, 606c, 606d on the object. These mechanical forces 606 are preferably sufficient to overcome the weight of the object, and each mechanical force component needs an opposing force component on an opposing side of the object in order to adequately grip the object.

This traditional mechanical gripping process can be disturbed or discouraged by numerous factors, including a dirty or wet object, surface irregularities, a fragile or delicate object, or an inability to locate adequately the mechanical actuators on opposing sides of the object to effectively balance the forces, among others.

FIG. 6B illustrates in top plan view the foreign object of FIG. 6A being gripped by two electroadhesive gripping surfaces. Electroadhesive gripping system 650 includes just two actuators in the form of electroadhesive gripping surfaces 610a, 610b, which can be placed at a variety of locations about the surface of foreign object 614. In significant contrast to mechanical gripping system 600, the electroadhesive gripping surfaces 610a, 610b do not need to oppose each other in magnitude or be on opposite sides of the object 614. This is primarily because electroadhesive forces are used rather than mechanical crushing forces to grip the object. As such, the force exerted by one electroadhesive gripping surface on the foreign object does not need to be countered by an opposing force on the opposite side of the object. As shown, electroadhesive gripping surfaces can be placed at a 90 degree angle with respect to each other about the surface of object 614, for example. A wide variety of relative locations and placements can also be used, as will be readily appreciated. Such freedom in actuator placement is a substantial advantage over traditional mechanical systems.

Another significant difference between mechanical gripping system 600 and electroadhesive gripping system 650 is that less overall force is needed to grip and handle the foreign object 614 in an electroadhesive system. While mechanical crushing or pinching forces need to oppose each other, such as force 606a opposite force 606d and force 606b opposite force 606c in the mechanical gripping system 600, no such opposing mechanical force components are needed for electroadhesive forces 613a and 613b in the electroadhesive gripping system 650.

Referring to FIGS. 7A-7D, various force diagrams with respect to an example cylindrical foreign object demonstrate the differences in applied forces between a traditional mechanical gripping system and the electroadhesive gripping system disclosed herein. Starting with FIG. 7A, an example force diagram for a foreign object being gripped by traditional mechanically gripping actuators is shown in side perspective view. Mechanical gripping system 700 must overcome or offset the weight W of foreign object 714 in order to handle the object. For purposes of illustration, three incumbent mechanical forces 706a, 706b, 706c representing forces from three mechanically gripping actuators are shown. It will be readily appreciated that more mechanical actuators could be used, or alternatively, that exactly two diametrically opposing mechanical actuators could be used.

Each of incumbent mechanical forces 706a, 706b, 706c imparts an upward frictional force against their respective surface areas of foreign object 714, which upward frictional forces are naturally a fraction of the directly imparted crushing forces. These frictional forces are dependent upon a coefficient of friction "f," and are represented as f*706(x). For the weight of the object 714 to be overcome by mechanical gripping system 700, the sum of (f*706a)+(f*706b)+(f*706c) must be greater than W. Of course, the coefficient of friction f can vary widely depending upon the textures and conditions of the contacting surfaces. Where an object is relatively slippery, this coefficient f is small, which then results in the need for even greater incumbent forces to overcome the object weight. This results in mechanical forces 706a, 706b, 706c that can be relatively large.

FIG. 7B illustrates in top plan view the exemplary force diagram for the foreign object of FIG. 7A. Again, the sum of all incumbent mechanical forces 706a, 706b, 706c in the x and y directions against foreign object 714 must be zero for the object to be mechanically gripped, which is why these forces are primarily "crushing" forces. As shown, force 706a lies completely in the x direction, such that the sum of x direction components of forces 706b and 706c must offset force 706a. Because force 706a has no y direction component in the figure as shown, the y direction components for forces 706b and 706c must offset each other. Other arrangements with more or fewer mechanical actuators in varying directions may be used, although the final result should require a zero sum of incumbent mechanical forces in the x and y directions. Because such a zero sum force is needed, the positioning of mechanical actuators can be particularly critical. Even a slight offset or misplacement of one mechanical gripping actuator or "finger" can result in a non-zero sum force between actuators, such that the part or object is dropped or otherwise mishandled.

In contrast, FIG. 7C illustrates an example force diagram for a foreign object being gripped by electroadhesive gripping surfaces, in side perspective view. Similar to the mechanical gripping system above, electroadhesive gripping system 750 must overcome or offset the weight W of foreign object 714 in order to handle the object. Unlike the mechanical gripping system, however, this electroadhesive gripping system 750 does not rely on mechanical crushing or pinching forces, such that precise positioning or offsetting of actuators is not necessary. Rather, system 750 uses a plurality of electroadhesive forces 713a, 713b, 713c to grip and handle foreign object 714 using electroadhesive gripping surfaces.

Each of electroadhesive forces 713a, 713b, 713c results in an upward anti-slip force Px (obtained by multiplying friction coefficient f with the electroadhesive normal forces) against their respective surface areas of foreign object 714. For the weight of the object 714 to be overcome by electroadhesive gripping system 750, the sum of Pa+Pb+Pc must be greater than W. Of course, the amount of pressure force exerted upward on foreign object 714 is related to numerous factors, including the magnitude of electroadhesive force in particular. It is worth noting, however, that the amount of electroadhesive forces needed to support the weight W of foreign object 714 is substantially less than the amount of mechanical pinching force to support the same object and weight.

FIG. 7D illustrates in top plan view the exemplary force diagram for the foreign object of FIG. 7C. To the extent that any nominal mechanical crushing force is used by the applied electroadhesive end effectors or gripping surfaces, such relatively small mechanical forces must arrive at a zero sum in the x and y directions, similar to that which is set forth above for mechanical gripping system 700. It is worth noting, however, that in many cases, the electroadhesive forces are sufficient to hold the entire weight of the object with no mechanical crushing forces, which supports the object weight in the z-direction, but removes the need for force balancing in x and y directions.

Numerous drawbacks and issues experienced in conventional mechanical gripping systems, such as system 700, are overcome or minimized when using an electroadhesive gripping system, such as system 750. For example, a conventional mechanical gripping system typically requires intensive sensing and control in order to grip objects reliably without damaging them. Such mechanical gripping systems also tend to require relatively large actuators that are sized for the highest expected gripping forces. These large actuators need to be both precise and powerful in order to be able to handle delicate objects without slipping or damaging the objects. These requirements tend to result in larger actuators, which in turn results in heavy grippers, which then results in higher weights in upstream actuators, all of which impacts the overall weight and energy usage of the entire robot or system.

In contrast, an electroadhesive gripping system does not require a "closed chain placement" or offsetting of actuators, end effectors or gripping surfaces, such that precise positioning to offset for pinching forces is not required. Intensive sensing and control for such precise positioning is thus not needed. Because the anti-slip forces needed to support the weight of handled objects comes from electroadhesive forces rather than pinching forces, actuators or electroadhesive gripping surfaces can be sized for position control with respect to expected tasks. The relaxed size, actuation and position control requirements for such an electroadhesive gripping system can result in a tenfold savings in weight and energy consumption while still providing more reliable gripping and handling of the same foreign objects.

For purposes of comparison, a commercial off the shelf humanoid mechanical gripper weighing about 2 kg can have a typical gripping or pinching force of about 5-10 N and corresponding torques of about 0.5-1 Nm. The energy required to lift the mechanical actuators 1 meter is about 20 J. In contrast, equal adhesion forces can be delivered by electroadhesive end effectors having electroadhesive pads or gripping surfaces with effective areas of about 2 cm by 5 cm. The electroadhesive pads and associated power supply for such a device could weigh as little as 30 g. Since the overall end effectors need only be designed for position control, the overall weight of the electroadhesive end effectors can be under 200 g. Thus, the energy required to lift these components by the same height is 1/10 the energy required for a conventional mechanical gripping system. Of course, the energy gain from weight savings for downstream actuators and components would be even greater.

III. Example Applications

Figure 8:
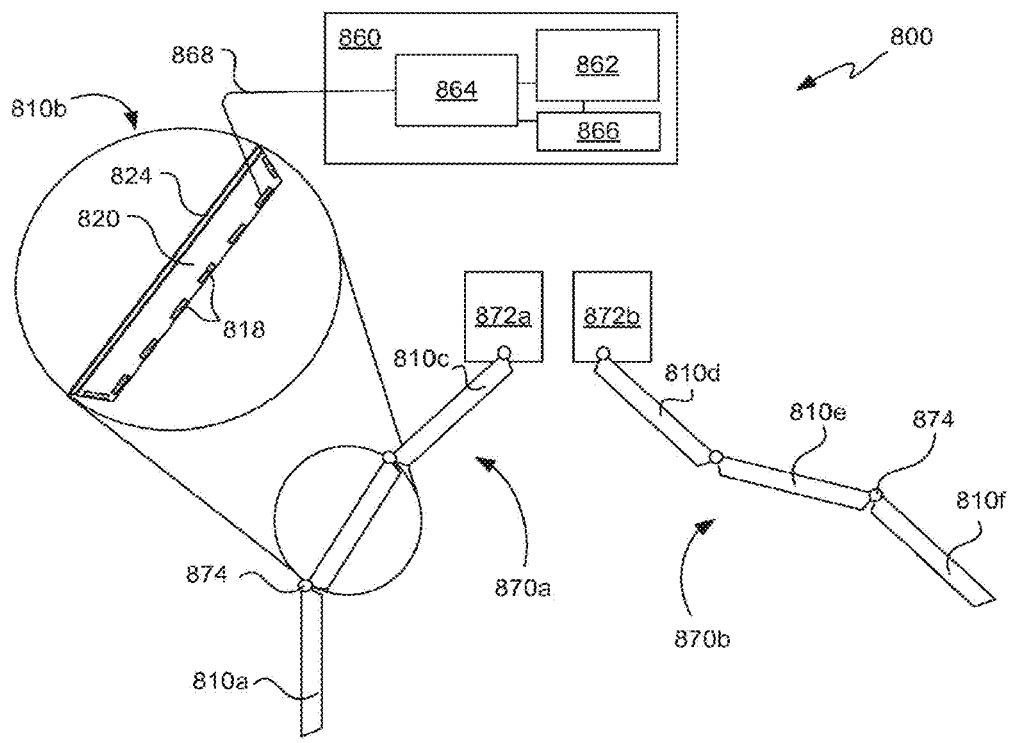
FIG. 8 illustrates in side elevated view an example electroadhesive gripping system having multiple fingers, each having a plurality of electroadhesive gripping surfaces thereupon, along with an exemplary set of control circuitry.

The ability to freely move and position gripping actuators in the form of electroadhesive end effectors with respect to a handled foreign object opens up many new possibilities and designs for object handling. Turning next to FIG. 8, an example electroadhesive gripping system having multiple electroadhesive gripping surface lined fingers and associated control circuitry is shown in side elevated view. Electroadhesive gripping system 800 includes a first finger 870*a* and a second finger 870*b*, with each finger having a plurality of segments that are configured to move with respect to each other. While first finger 870*a* includes segments 810*a*, 810*b* and 810*c*, second finger 870*b* includes segments 810*d*, 810*e* and 810*f*. Although only two fingers 870*a*, 870*b* have been shown for purposes of illustration, it will be understood that any number of additional fingers may also be used. Each finger 870*a*, 870*b* can extend from a base robot or machine component, such as base components 872*a* and 872*b* respectively. It will be appreciated that a wide variety of well-known robotic and machine applications can apply to such base components 872*a*, 872*b* and the robotic or machine components behind them, and such details involving these components and upstream thereof are not of special focus here.

A finger segment 810*x* can have one or more electroadhesive gripping surfaces situated thereon. For purposes of illustration, however, just one electroadhesive gripping surface has been included with each finger segment. In fact, a magnified view of finger segment 810*b* is provided, wherein it is clear that a single electroadhesive gripping surface is included therein. Similar to the original embodiment 10 from FIG. 1A, finger segment 810*b* includes a structural backing 824 and an insulating material 820 around a plurality of electrodes 818 located at a front gripping surface thereof. In this embodiment, as in each of the above embodiments, each electroadhesive end effector can rely on electrical control and input.

At the very least, a minimum amount of circuitry is needed to provide electrostatic adhesion voltages to an electroadhesive gripping surface, such as, for example, a control and conditioning circuitry 860 suitable for providing an appropriate electrostatic adhesion voltage to electrodes 818 of electroadhesive gripping surface 810*b*. Such voltages can be provided, for example, by a conductive connector 868 between the control and conditioning circuitry and a common or connecting back electrode (not shown) on the electroadhesive gripping surface 810*b*. Control circuitry 862 can be configured to determine when a suitable electrostatic adhesion voltage is applied to electrodes 818. Control circuitry 862 may include a processor or controller that provides on/off signals that determine when electrostatic adhesion voltages are applied, and what magnitudes. Control circuitry 862 may also determine the times and timing associated with a charge and discharge cycle on the electroadhesive end effector 810*b*.

Conditioning circuitry 864 may include any circuitry configured to perform one or more of the following tasks: voltage step-up, which is used when applying a voltage to the electrodes 818, conversion between AC and DC power, voltage smoothing, and recovery of stored electrostatic energy. Conditioning circuitry 864 may be designed to receive power from a low-voltage battery 866, for example, or another suitable power source. For example, in robotics applications, conditioning circuitry 864 may receive a voltage from a conventional battery, such as those less than 40 volts, and increase the voltage to an electrostatic adhesion voltage above 1 kilovolt. The low voltage power source such as the battery may be replaced by another electrical source such as a set of small photovoltaic panels similar to the ones used in many handheld calculators. In one embodiment, conditioning circuitry 864 includes a transformer configured to provide voltage step-up to electrostatic adhesion voltages described herein. More complex charge control circuits may be developed, as will be readily appreciated, and are not limited to the shown design. Also, some of the circuit functions may be integrated. For instance, one integrated circuit may perform the functions of both the step-up circuitry 864 and the charge control circuitry 862. A separate set of circuitry can be included for each electroadhesive end effector, or a common set of circuitry could be used to control multiple or all electroadhesive end effectors, as may be desired.

Electroadhesive gripping surfaces 810*x* can be coupled to each other and/or a base robot or other machine mechanically by hinges 874 or other suitable coupling devices. In some embodiments, a flexible support backing or skin (not shown) can be used to couple the various electroadhesive gripping surfaces, either in addition to or in place of hinges 874. Such a flexible support backing coupler can be, for example, a polymer such as an acrylic elastomer or foam. Such a polymer can be a compliant electroactive polymer adapted to aid in the positioning of the gripping surfaces or end effectors, with examples again being described in commonly owned U.S. Pat. No. 7,034,432, as referenced above and incorporated herein. Other actuating devices, such as a cable actuator, suitable for positioning and/or supporting the various electroadhesive gripping surfaces are discussed further below.

The use of multiple continuous fingers 870*a*, 870*b*, each having a plurality of electroadhesive gripping surfaces 810*x* that can be moved with respect to each other, takes advantage of the noted ability to freely move and position gripping actuators in the form of electroadhesive gripping surfaces with respect to a handled foreign object. Although only two fingers having three segments each are shown for purposes of illustration, it will be understood that further fingers and/or more segments per finger can be used, as well as additional modes of freedom for each segment with respect to any neighboring segments. In short, any and all suitable robotic embodiments that enable the placement of electroadhesive end effectors or gripping surfaces anywhere about any surface of a foreign object to be handled are contemplated. Various specific examples of three segment two finger arrangements will now be provided, although such examples are not intended to be limiting.

Figure 9A:
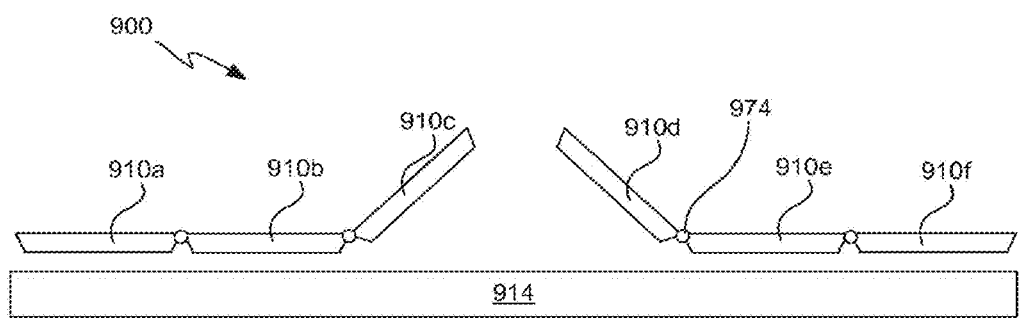
FIG. 9A illustrates in side elevated view the example electroadhesive gripping system of FIG. 8 as applied to a foreign object having a large flat surface.

Continuing to FIG. 9A, one example arrangement of the two fingers of the electroadhesive gripping system of FIG. 8 as applied to a foreign object having a large flat surface is shown in side elevated view. Electroadhesive gripping system 900 includes numerous components, such as those set forth in FIG. 8, although only the finger segments are shown here for purposes of simplicity. Each of finger segments or electroadhesive gripping surfaces 910a, 910b, 910c, 910d, 910e, 910f, as well as the various hinges or connectors 974 can be identical or substantially similar to the respective electroadhesive gripping surfaces 810x from foregoing gripping system 800. In this particular configuration, a plurality of electroadhesive gripping surfaces 910a, 910b, 910e, 910f from both fingers have been placed up against flat foreign object 914. In some embodiments, gripping surfaces 910c, 910d do not have enough freedom of movement with respect to any applicable base robotic components to which they are coupled, while in other embodiments (not shown), these gripping surfaces can also be placed up against foreign object 914. Once all appropriate electroadhesive gripping surfaces 910x have been placed up against foreign object 914, then voltage can be applied and the foreign object can be lifted or otherwise handled thereby. Alternatively, voltage can be applied early and maintained while the various gripping surfaces remain in contact with the foreign object.

Figure 9B:
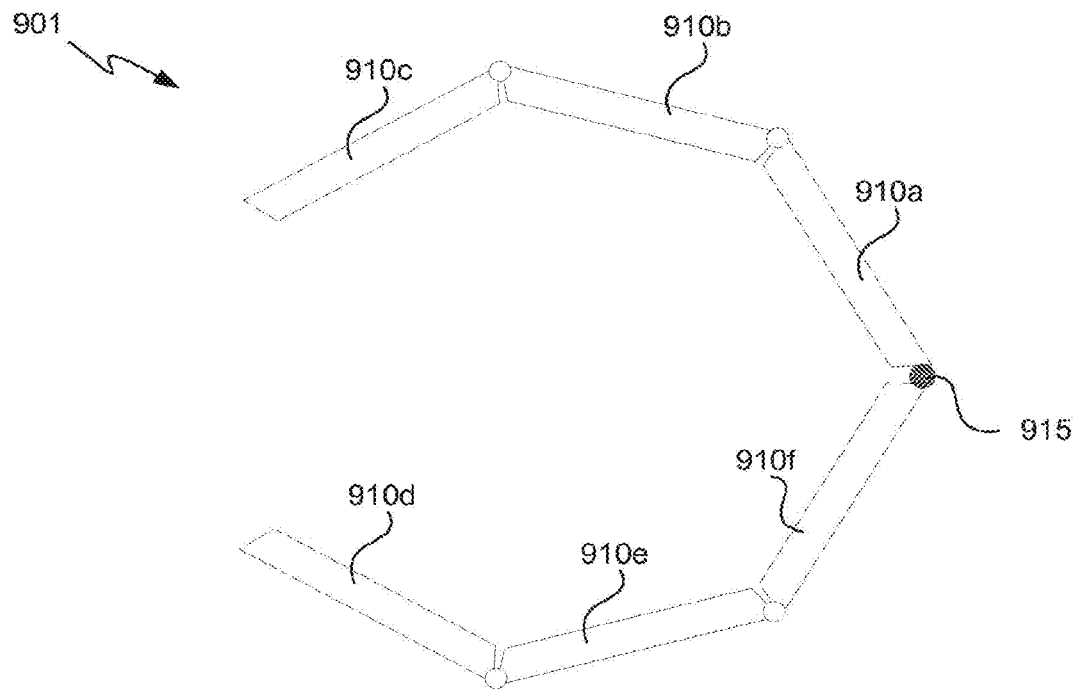
FIG. 9B illustrates in side elevated view the example electroadhesive gripping system of FIG. 8 as applied to a foreign object comprising a small pin.

Another configuration example is shown in FIG. 9B, which illustrates the same electroadhesive gripping system as applied to a foreign object comprising a small pin 915. Electroadhesive gripping system configuration 901 includes the same two fingers having three segments or electroadhesive gripping surfaces each. In particular, electroadhesive gripping surfaces 910c and 910d are coupled to base robotic components (not shown), while electroadhesive gripping surfaces 910a and 910f represent the last end effectors at the tips of both fingers. As shown, the fingers and gripping surfaces have been arranged such that pin 915 can be suitably gripped. Such a gripping can be accomplished by using one or more of the smaller side surfaces of one or more electroadhesive gripping surfaces, as shown.

Figure 9C:
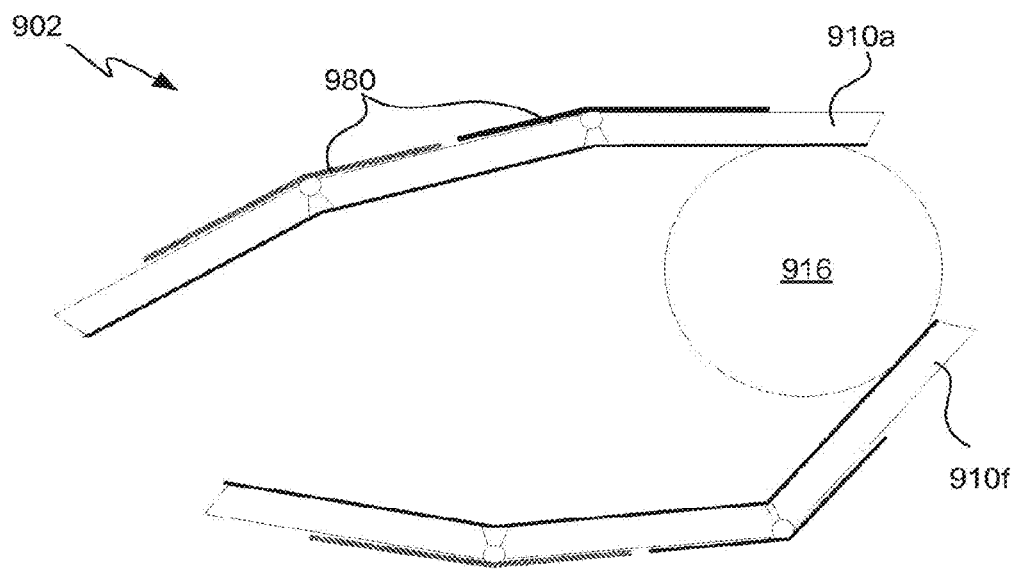
FIG. 9C illustrates in top plan view the example electroadhesive gripping system of FIG. 8 as applied to a foreign object comprising a medium sized ball.

Still another configuration example is shown in FIG. 9C, which illustrates the same electroadhesive gripping system in top plan view applied to a foreign object comprising a medium sized ball 916. Electroadhesive gripping system configuration 902 again includes the same two fingers having three segments or electroadhesive gripping surfaces each, with electroadhesive gripping surfaces 910a and 910f again representing the last end effectors at the tips of both fingers. As shown, the fingers and gripping surfaces have been arranged such that ball 916 can be suitably gripped. Such a gripping can be accomplished by using just the fingertip electroadhesive gripping surfaces 910a and 910f, as shown, again due to the relative small size of the object. It will be understood that more or all of the electroadhesive gripping surfaces could be applied in the event that a larger foreign object is to be handled, or if the additional simplicity of a lower powered "all on or all off" system is desired.

Electroadhesive gripping system 902 also introduces multiple actuating components 980 that are configured to position the various electroadhesive gripping surfaces 910x with respect to each other. Such actuating components can include, for example, a cable driven by an actuator, an electromagnetic motor, a stepper motor, a hydraulic system, a pneumatic system, a shape memory alloy, and an electroactive polymer, among other possibilities. As shown in FIG. 9C, a thin layer across the back of adjacent electroadhesive gripping surfaces can be an electroactive polymer that is adapted to flex and thereby move or position the gripping surfaces when a suitable voltage is applied thereto.

As can be seen in at least electroadhesive gripping system configuration 902, the normal lines to the surface of foreign object 916 created by the surfaces of contact between the electroadhesive gripping surfaces 910a, 910f are clearly not substantially parallel with respect to each other. In fact, the same contact surfaces made by the gripping actuator components (i.e., gripping surfaces) against ball 916 simply could not be used by a traditional mechanically pinching gripping system. This flexibility in actuator or electroadhesive gripping surface placement is beneficial not only in terms of convenience, but again also because of the weight and cost savings considerations noted above.

An alternative actuating component arrangement can include the use of interlocking meta-materials. Such meta-materials can similarly be located across the backs or other suitable locations of each electroadhesive gripping surface, and can be used alone or in conjunction with one or more additional actuating components to help position the various gripping surfaces before the electroadhesion voltages are applied thereto. In the case of the meta-materials, an initial flexible uncharged state allows for the relatively free movement of adjacent components, while a subsequent charged or stiffened state substantially prevents or restricts relative movement of the same adjacent components. Further details regarding such meta-materials and various applications thereof can be found at, for example, commonly owned U.S. Pat. Nos. 7,598,691 and 7,598,692, which are incorporated by reference herein in their entirety and for all purposes.

In various embodiments, which can include any of the foregoing examples or embodiments, the electrostatic adhesion voltage does not vary in time and may be turned on or off. In various other embodiments, the electrostatic adhesion voltage may be time-varying on each electrode, and may even reverse polarity at regular time-intervals to facilitate rapid attachment and detachment of the foreign object from any desired electroadhesive gripping surface(s) and/or end effector(s). In some embodiments, the electrostatic adhesion voltage might not be switched off sharply to release the foreign object, but rather polarity can be reversed for a fixed amount of time in order to ensure a rapid release of the object. In still further embodiments, the electrostatic adhesion voltage can have polarity reversed with a decreasing magnitude over time in order to facilitate rapid release of the object.

Figure 10:
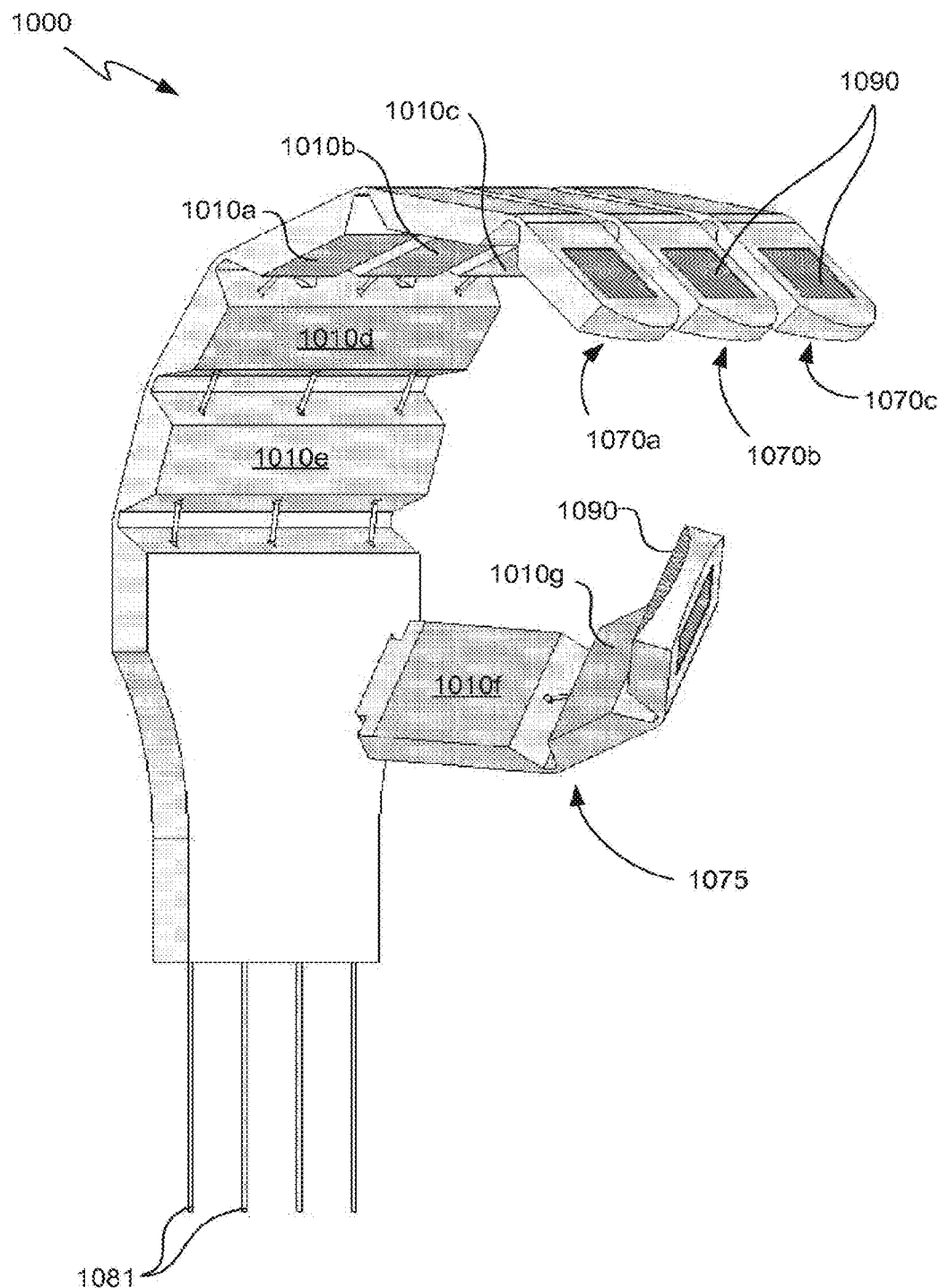
FIG. 10 illustrates in front perspective view an example robotic hand having numerous fingers, electroadhesive gripping surfaces and cable actuators.

In various embodiments, the applied electroadhesive voltage or gripping force can be reduced or varied on one or more of the electroadhesive gripping surfaces to allow for greater flexibility in manipulating or controlling the foreign object. For instance, a reduction in voltage or force at one or more select gripping surface(s) can result in the foreign object slipping or being repositioned within the electroadhesive gripping system. Such a variable electroadhesive force can be used to modulate friction between a gripping surface and the object, so as to reposition objects by controllably sliding objects within or about the gripping surface. A suitable increased electroadhesive gripping force can then be reapplied after such a controlled slip or repositioning. As a specific non-limiting example, one or all of the electroadhesive gripping surfaces on segments 910a and 910f in FIG. 9C can have the voltage provided thereto reduced such that the gripped foreign object 916 slips a certain amount. After a desired amount of slippage, a sufficient voltage can be reapplied to strengthen the electroadhesive grip again. Such controlled variances in voltage and resulting electroadhesive force can be particularly effective when multiple fingers or end effectors with numerous electroadhesive gripping surfaces are used, such as in the case of the robotic hand embodiment of FIG. 10 below.

Still further applications can involve even more complex and integrated systems involving more fingers and more electroadhesive gripping surfaces. Moving next to FIG. 10 an exemplary robotic hand having numerous fingers, electroadhesive gripping surfaces and actuators is shown in front perspective view. Electroadhesive gripping robotic hand 1000 can include numerous hand-like components, such as a palm region, three fingers 1071a, 1070b, 1070c and an opposable thumb 1075. Each of these items can include multiple electroadhesive gripping surfaces 1010x, which are preferably movable and configurable with respect to each other. For example, electroadhesive gripping surfaces 1010a, 1010b and 1010c are located on the fingers of robotic hand 1000, electroadhesive gripping surfaces 1010d and 1010e are located on the palm region of the hand, and electroadhesive gripping surfaces 1010f and 1010g are located on the opposable thumb 1075. Further electroadhesive gripping surfaces are also present on the hand 1000, and even more can be included if desired, although a complete listing is not provided here for purposes of simplicity.

The three fingers 1070a, 1070b, 1070c and palm region 1010d, 1010e can be controlled in part through the use of multiple cables 1081, which can be driven by actuators. These cables driven by actuators, or any other suitable actuating components for that matter, do not necessarily need to be able to carry heavy loads, as their primary purpose is to position the various electroadhesive gripping surfaces about the surfaces of a handled foreign object. In various embodiments, the cable actuators 1081 can be used to independently control each finger 1070x separately, such that the fingers can extend in different directions and lengths, as may be desired. Various further details regarding cable actuators in robotic applications will be readily understood by those skilled in the art, and are not of special focus here.

Figure 11A:
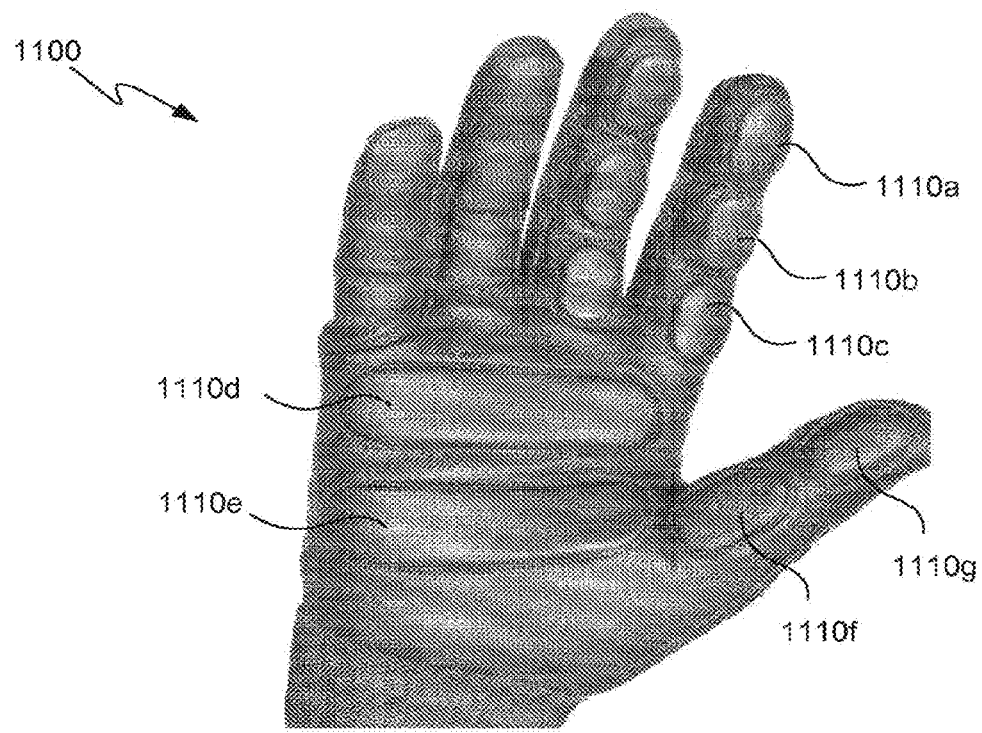
FIG. 11A illustrates in side perspective view an example application of a wearable glove having multiple electroadhesive gripping surfaces located along the outer surfaces.

In addition to the various fingers, electroadhesive gripping surfaces and actuating components, a plurality of sensors 1090 or other feedback components can also be included on electroadhesive gripping robotic hand 1000. Such sensors 1090 or feedback items can be used to detect when a foreign object is suitably gripped, when a gripped object is slipping or moving, and/or how much of a foreign object is gripped (e.g., number of sheets of paper), among other potentially detected items, such as contact or slip. This information can be used to manually or automatically correct or adjust voltage, positioning, motion and/or other aspects of the hand, fingers or thumb, as may be appropriate. In applications where such sensing elements are located directly behind the electroadhesive gripping surfaces and can be affected by the electroadhesive gripping voltages, a separate conductive shielding layer can be incorporate to minimize these interactions. This shielding layer can be located either on the outer surface of the sensor layer or integrated into the appropriate surface (such as on the surface opposite to the one that is in contact with the foreign object to be gripped or manipulated). Still further applications can involve the use of electroadhesive gripping surfaces to assist users with gripping tough object, or in the event of user arthritis or hand tremors, for example. FIG. 11A illustrates in side perspective view an exemplary application of a wearable glove having multiple electroadhesive gripping surfaces located along its outer surfaces according to one embodiment of the present disclosure. Wearable glove 1100 includes a number of electroadhesive gripping surfaces, such as gripping surfaces 1110a, 1110b, and 1110c on the index finger, gripping surfaces 1110d and 1110e located across a palm region, and gripping surfaces 1110e and 1110f located on the thumb. A suitably strong insulator can be used between the electroadhesive gripping surfaces and the inner region where the hand of a user is inserted, so as to provide safety to the user. A suitable application of voltage across various electroadhesive gripping surfaces 1110x can then aid the wearer in gripping an object.

Figure 11B:
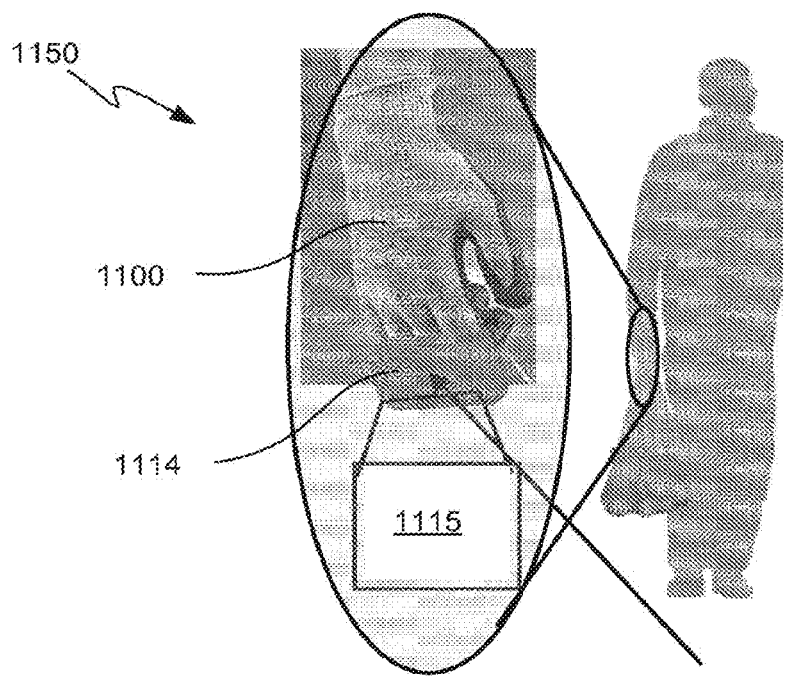
FIG. 11B illustrates in block diagram format an example application of the wearable glove of FIG. 11A being used to aid in the gripping of a bag strap to carry an associated bag.

An example application of such a wearable glove is to reduce the mechanical force that needs to be exerted by the person's fingers to securely grip an object. Another exemplary application is shown in FIG. 11B, which illustrates in block diagram format the wearable glove of FIG. 11A being used to aid in the gripping of a bag strap to carry an associated bag. As shown in exemplary arrangement 1150, the hand of a user is inserted into wearable glove 1100, after which the fingers of the hand and glove combination are placed underneath a strap or handle for attached foreign object 1114. Weighted bag 1115 can then be strapped to or otherwise supported by foreign object 1114. Once the fingers of the hand and glove combination are placed through the appropriate strap or handle, a button or other actuator can be pressed to activate the voltage to the various electroadhesive gripping surfaces on the surface of the glove 1100. This can effectively render the glove as stiff, such that no further gripping force is needed by the user upon actually lifting the object 1114 and bag 1115.

IV. Example Operation

Figure 12:
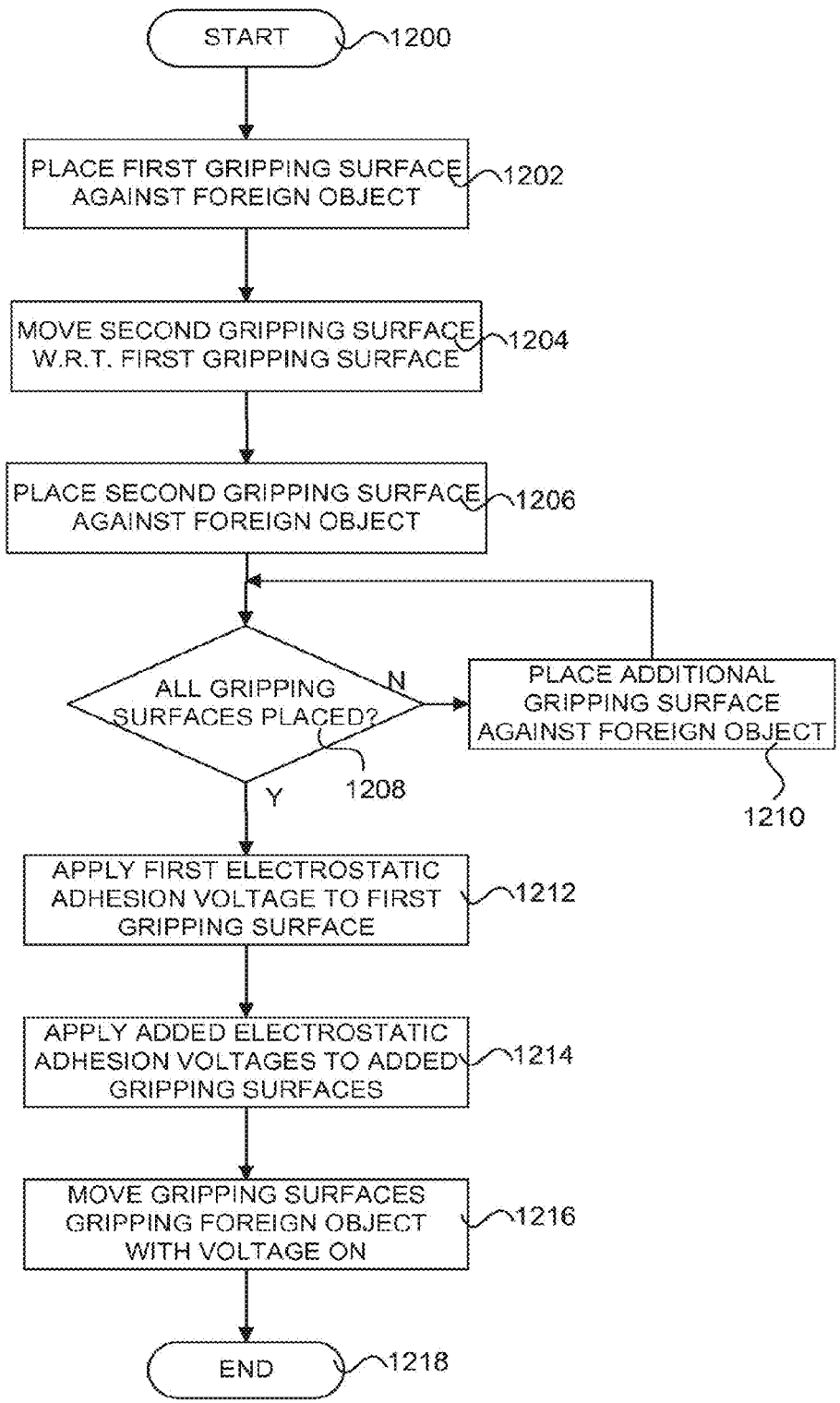
FIG. 12 provides a flowchart of an example method of gripping an object using electroadhesive force.

Although an immense variety of applications and methods of lifting, moving or otherwise handling an object using the electroadhesive end effectors, gripping surfaces and other arrangements as described herein can be imagined, a basic method of moving an object is provided here as an example. Turning lastly to FIG. 12, a flowchart of an example method of moving an object using electroadhesive force according to one embodiment of the present disclosure is provided. It will be readily appreciated that not every method step set forth in this flowchart is always necessary, and that further steps not set forth herein may also be included. Furthermore, the exact order of steps may be altered as desired for various applications.

Beginning with a start step 1200, a first electroadhesive gripping surface is placed against a first surface region of a foreign object at process step 1202. Again, such a placement results in a first line normal to a first surface of contact between the first electroadhesive gripping surface and the foreign object surface. At subsequent process step 1204, a second electroadhesive gripping surface is moved with respect to the first electroadhesive gripping surface. Such movement could also take place prior to the first gripping surface being placed against the foreign object, if desired. At the following process step 1206, the second electroadhesive gripping surface is then placed against the foreign object.

Again, such a placement results in a second line normal to a second surface of contact between the second electroadhesive gripping surface and the foreign object surface. In one embodiment, these first and second normal lines are not substantially parallel with respect to each other. This can be considered as the first and second surfaces of contact not lying within the same plane. It will be readily appreciated that some embodiments may arise where the normal lines are parallel, but the first and second surfaces still do not lie within the same plane, and such embodiments are contemplated for use in the present disclosure.

After process step 1206, a decision step 1208 inquires as to whether all electroadhesive gripping surfaces have been placed against the foreign object. If not, then an additional electroadhesive gripping surface is placed against the foreign object at process step 1210, after which decision step 1208 is repeated. If all electroadhesive gripping surfaces that are to be used have been placed, however, then the method continues to process step 1212, where a first electrostatic adhesion voltage is applied to the first electroadhesive gripping surface. At process step 1214, further electrostatic adhesion voltage(s) are applied to the second and any other additional electroadhesive gripping surfaces. In one embodiment, such voltages can be applied in order at different times, and in another embodiment, such voltages can be applied simultaneously (i.e., steps 1212 and 1214 are performed in parallel). In still further embodiments, such voltages can be applied prior to the gripping surfaces being placed up against the foreign object.

Once all of the appropriate voltages are applied, such that the foreign object is suitably clamped or coupled to the electroadhesive gripping surfaces and is thereby "gripped," then the gripping surfaces gripping the foreign object are moved while the voltages are on at process step 1216. Of course, such movement of the activated electroadhesive gripping surfaces results in the movement or handling of the foreign object as well. The method then finishes at and end step 1218. Further steps not depicted can include, for example, reducing or turning off the electroadhesive voltage to the electroadhesive gripping surfaces, and removing the electroadhesive end effectors or gripping surfaces from the foreign object. Still further steps can include reducing or varying the applied electroadhesive voltage or gripping force, such that the foreign object can be allowed to slip or be repositioned within the electroadhesive gripping system. A suitable increased electroadhesive gripping force can then be reapplied after such a controlled slip or repositioning, as desired.

V. Electroadhesive Shear Gripper

Some embodiments of the present disclosure find application in item handling. For example, boxes, cases, packages, or other items may be manipulated by a gripper with an electroadhesive surface oriented along one or more sidewalls of the item. The gripper can then be urged in a direction substantially parallel (or at least partially parallel) to the plane of the sidewall the electroadhesive surface is attached to, to thereby pull or push the item via the shear force exerted by the electroadhesive surface. A load-bearing structure may be coupled to the electroadhesive surface to bear the strain created by such pushing/pulling. In some embodiments grippers with electroadhesive surfaces are configured to be oriented vertically (e.g., perpendicular to a ground surface) so as to electroadhesively attach to sidewalls of items being manipulated.

5a) Example Vertical Electroadhesive Blades

Figure 13A:
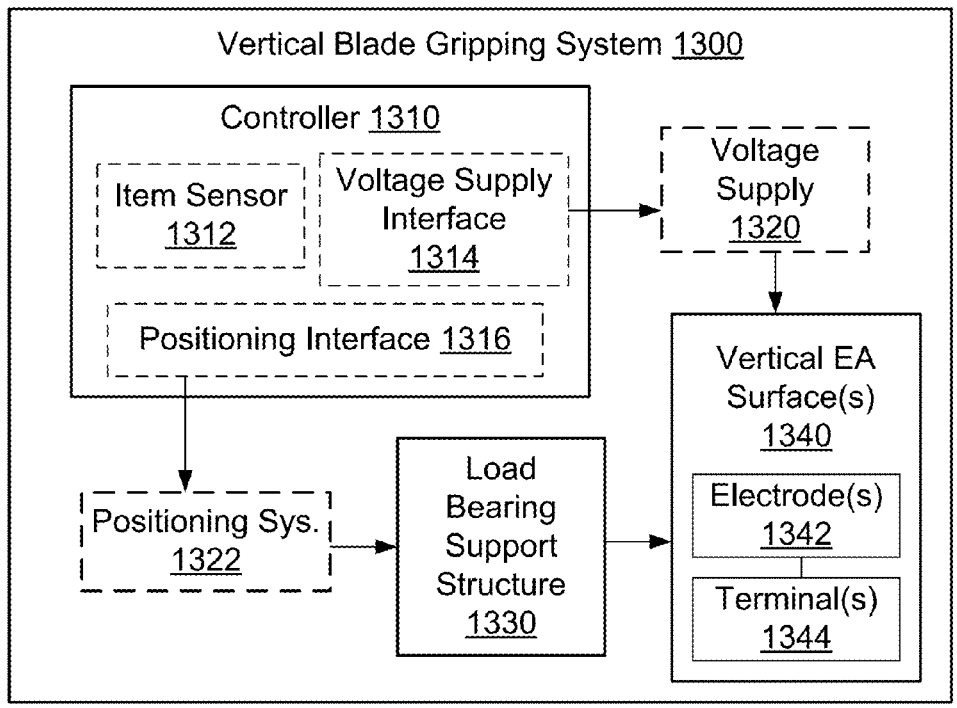
FIG. 13A is a functional block diagram of an example vertical blade gripping system.

FIG. 13A is a functional block diagram of an example vertical blade gripping system 1300. The platform gripping system includes a controller 1310, a voltage supply 1320, and at least one blade gripper, which can include a load-bearing support structure 1330 and a vertical electroadhesive surface 1340. The voltage supply 1320 can be configured to supply high DC voltages in a range of, for example, 0.5 kilovolt ("kV") to about 10 kV, similar to the electroadhesion voltages discussed above in connection with FIGS. 1-12. The blade gripper has a gripping surface 1340 with integrated electrodes 1342 connected to the voltage supply 1320 via respective terminals 1344. The electrodes 1342 can be patterned according to a variety of different geometries within the platform surface and are generally arranged such that opposing polarity electrodes are situated adjacent one another. The electrodes 1342 may be arranged with opposing polarity electrodes alternating one another (e.g., interdigitated electrodes), similar to the example electrode geometries described above in connection with FIGS. 1-4.

It is noted that the voltage supply 1320 may generally be a power supply configured to output AC or DC voltages or currents sufficient to apply a polarizing voltage to the electrodes 1342. For convenience in the description herein, the module 1320 is therefore referred to as "voltage supply," although some embodiments may employ current supplies and/or other electrical power supplies. For example, current supplies may be tuned to provide suitable currents for generate desired polarizing voltages at the electrodes.

The electroadhesive gripping surface 1340 can be coupled to a load-bearing support structure 1330 or other support structure, which can be a rigid or semi-rigid structure used to distribute forces exerted on the vertical electroadhesive surface 1340 caused by items adhered thereto. The support structure 1330 can include a backing, one or more support members, or other structural elements. The support structure 1330 can couple to a back side of the electroadhesive surface 1340, opposite the electroadhesive gripping surface thereof. The support structure 1330 can include compression-resistant and/or bend-resistant members, such as support rods, beams, polymeric structural members, etc. As discussed further below, the support structure 1330 can function to convey shear stress forces between the electroadhesive surface 1340 and an item adhered thereto to the structural members of the support structure 1330. The support structure 1330 can convey such shear forces to another load-bearing structure such as a positioning system 1322, a control arm, etc. In some examples, the vertical gripping surface 1340 may be connected to the support structure 1330 through a deformable layer (e.g., the deformable layer 1422 in FIG. 14B) to allow the gripping surface 1340 to conform to exterior surfaces of items being manipulated.

The controller 1310 can include electronics and/or logic implemented as hardware and/or software modules to control operation of the platform gripping system 1300. For example, the controller 1310 can include a power supply interface 1314 for controlling the voltage supply 1320 whether to apply voltage to the electrodes 1342 of the gripping surface 1340. The voltage supply interface 1314 may be configured to operate a switch (or switches) connecting the output of the voltage supply 1320 to the terminals 1344 of the gripping surface 1340 (or perhaps switches within the voltage supply 1320). Moreover, the voltage supply interface 1314 may specify a magnitude of voltage to be applied to the electrodes 1342. The voltage supply interface 1314 may send instructions to the voltage supply 1320 to cause the voltage supply 1320 to adjust the magnitude of voltage output to the terminals 1344.

Upon receiving instructions, the voltage supply 1320 can be configured to apply the specified voltage to conductive wires or lines connected to the terminals 1344. The applied voltage can be a DC or AC voltage, which can provide opposing polarity on the electrodes 1342 in the gripping surface 1340 and thereby cause the gripping surface 1340 to induce corresponding polarization in a foreign object loaded on the gripping surface 1340. In some cases, a current supply that determines the appropriate current and corresponding voltage that produces intimate contact with the box or case being handled may be used to replace or augment the voltage supply 1320. The polarized electrodes 1342 and corresponding induced polarization of the loaded object results in an electroadhesive attraction between the gripping surface 1340 and the foreign object. Using the voltage supply interface 1314 to cause the voltage supply 1320 to apply voltage to the terminals 1344 can thus be considered turning on the electroadhesive vertical blade gripping system 1300. Similarly, causing the voltage to cease being applied to the terminals 1344 (e.g., by turning off or disconnecting the voltage supply 1320, or reducing the magnitude of the applied voltage, etc.) can be considered turning off the electroadhesive vertical blade gripping system 1300.

The controller 1310 may also include a positioning interface 1316 configured to control the position of the vertical gripper via instructions to the positioning system 1322. For example, the controller 1310 can instruct one or more position motors (e.g., servo motors, hydraulically driven arms, or the like) in the positioning system 1322 to adjust the position of the load bearing support structure 1330. The support structure 1330 is coupled to the gripping surface 1340, so the positioning interface 1316 can be used to control the location and/or orientation of the gripping surface 1340 of the vertical blade gripper.

The controller 1310 may also include an item sensor 1312. The item sensor 1312 can include one or more sensors and/or detectors configured to output data indicative of a loading condition of the blade gripping system 1300. For example, the item sensor 1312 may detect whether any foreign objects are adhered to (or proximate) the vertical electroadhesive blade gripping surface 1340. The item sensor 1312 may include sensors to detect indications of surface capacitance, opacity, thermistor-bases slip sensors, etc. In some examples, the vertical blade gripping system 1300 includes two vertical gripping surfaces 1340 and the item sensor 1312 may function to detect indications of items situated between the two gripping surfaces (e.g., based on interruption of radiated signals passed between the two gripping surfaces 1340. The item sensor 1312 can output data indicating that an item is detected, and the data can be used by the controller 1310 to determine instructions to send to the voltage supply 1320 and/or positioning system 1322. For example, the controller 1310 can determine a voltage to be applied to the electrodes 1342 (and/or whether to apply such a voltage) based on indication(s) from the item sensor 1312.

Figure 13B:
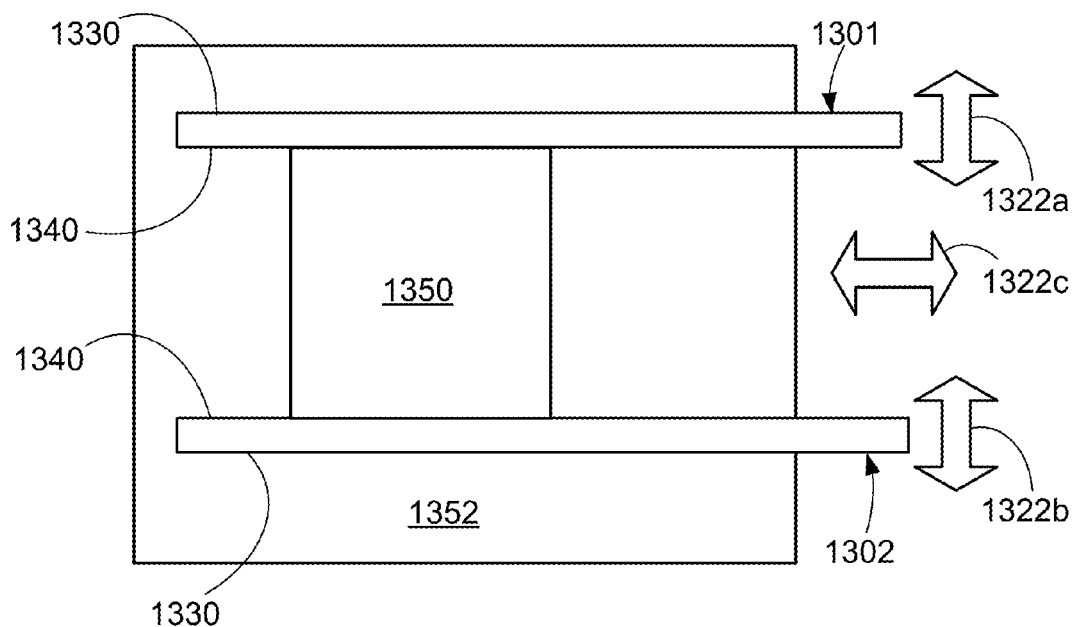
FIG. 13B illustrates a pair of vertical electroadhesive blades adhering to opposing sidewalls of an example item being manipulated.

FIG. 13B illustrates an example embodiment of the vertical blade gripping system 1300. FIG. 13B illustrates a top view of a pair of vertical electroadhesive blades 1301-1302 gripping an item 1350 resting on a shelf 1352 or another horizontal platform. Each of the blade grippers 1301, 1302 includes an electroadhesive gripping surface 1340 coupled to a support structure 1330. The blades can be mounted on a mobile robot, tracked vehicle, stacked crane, mobile cart, end of a forklift truck, mobile scissor lift or any other method that may allow them to be positioned relative to the shelf 1352 in 3 dimensions. This mounting structure (not shown in FIG. 13B) may house the mechanisms and actuators necessary to operate and move the vertical electroadhesive blades as described herein. The support structure 1330 can include a compression-resistant structural member coupled to the gripping surface 1340 along the length of the gripping surface 1340 and configured to convey shear forces imparted on the electroadhesive gripping surface 1340 by the electroadhesive attraction with the sidewalls of the item 1350. The positioning system 1322 can be configured to manipulate the vertical blade grippers 1301, 1302 toward and away from each other (1322a, 1322b) so as to position the gripping surfaces 1340 proximate the sidewalls of the item 1350. In many cases, only one of the two vertical blade grippers (either 1322a or 1322b) may be manipulated, with the other positioned by the overall position of the platform or mobile robot or cart to which they are attached, and with the result that the two move with respect to one another. When positioned proximate the item 1350 (e.g., via the positioning system 1322), opposing polarity voltages can be applied to the electrodes 1342 in the respective gripping surfaces 1340 sufficient to induce a complementary local electrical polarization in the sidewalls of the item. The resulting electroadhesive attraction between the sidewalls of the item 1350 and the gripping surfaces 1340 causes the item 1350 and the gripping surface 1340 to adhere to one another.

Once the grippers 1301, 1302 are adhered to the sidewalls, the positioning system 1322 can also urge the item 1350 to move along the surface of the shelf 1352 by pushing or pulling the blade grippers 1301, 1302 along their lengths (1322c). Urging the blade grippers 1301, 1302 acts on the item 1350 via shear forces between the gripping surfaces 1340 and the sidewalls of the item 1350, which shear forces are transmitted along the length of the support structure 1330 of the blade grippers 1301, 1302. In some examples, the blade grippers 1301, 1302 are attached to control arm(s) configured to urge the blades 1301, 1302 back and forth with respect to one another (1322a-b) and on and off of the shelf 1352 (1322c). While adhered to the item 1350, the motion of the blade grippers 1301, 1302, controlled by the positioning system 1322, can cause the blade gripping system 1300 to operate to retrieve the item 1350 from the shelf 1352 and/or stow the item 1350 on the shelf 1352 by dragging (sliding) the item 1350 onto (or off of) the shelf 1352.

FIG. 13C illustrates an end view of an example vertical electroadhesive blade 1360. The vertical electroadhesive blade 1360 includes the vertical electroadhesive gripping surface 1340 and the load-bearing structure 1330. The gripping surface 1340 can include a pattern of embedded electrodes configured to be charged with voltage of opposing polarity. The gripping surface 1340 can also include a protective coating or layer disposed to cover the electrodes and directly contact (interface) with items adhered to the gripping surface 1340. Such a protecting coating can prevent mechanical disruption/damage to the embedded electrodes as well as insulate the electrodes against discharge to any conductive materials in contact with the gripping surface 1340. The support structure 1330 can be a support rod or another elongated structural member. The support structure 1330 can be a member that is resistant to compressive forces as well as resistant to bending. The support structure 1330 can be used to receive and transmit stress imparted on the electroadhesive gripping surface 1340 via shear interactions with adhered objects. Such shear forces can be conveyed along the length of the support rod 1330 to another load-bearing structure (e.g., to a control arm or other structure in the positioning system 1322).

An electrical insulating layer 1362 can be situated between the gripping surface 1340 and the support structure 1330. The insulating layer 1362 can be a plastic backing or other insulating layer that electrically isolates the electrodes in the gripping surface 1340 from conductive materials in the support structure 1330 (e.g., metal support rods, etc.) and thereby prevent discharge of the electrodes via incidental contact with such conductors. Of course, the insulating layer 1362 also electrically isolates the gripping surface 1340 from other conductive materials. Moreover, the insulating layer 1342 can provide a semi-rigid backing on the gripping surface 1340 to distribute loads exerted on the gripping surface 1340 to the support structure 1330.

To facilitate transmission of the mechanical stresses, the gripping surface 1340, insulating layer 1362, and support structure 1330 can be mechanically coupled using a variety of different techniques. For example, a bead of adhesive material can be applied along the length of the blade gripper 1360 to thereby couple the supporting structure 1330 to the gripping surface via the insulating layer 1362. The mechanical connection between the gripping surface 1340, insulating layer 1362, and support structure 1330 may also use one or more connectors, ties, fasteners, etc. In some examples, the gripping surface 1340 is not connected continuously connected across the surface area of the gripping surface 1340 to allow at least a portion to move away from the insulating layer 1362 (e.g., so as to conform to an exterior surface of an object manipulated by the blade gripper 1360). In some examples, the gripping surface 1340 and the insulating layer 1362 can be bonded together along a substantially continuous strip extending along the length of the gripper 1360. Further, to facilitate mechanical stress transmission to the support structure 1330, the support structure 1330 and the insulating layer 1362 may be connected along a substantially continuous strip extending the length of the gripper 1360 and at a height on the vertical gripper corresponding to the strip connection between the insulating layer 1362 and the gripping surface 1340. In other words, in cases where the various layers 1340, 1362, 1330 are not connected across the entire areas that face one another, the connections on either side of the insulating layer 1362 can be placed relatively close to one another (e.g., at a common height). Such construction enhances mechanical stress transfer through the insulating layer 1362 because the effect of deformations in the insulating layer 1362 is reduced.

In some embodiments, the gripping surface 1340 can be removably coupled to the insulating layer 1362 and/or support structure 1330. For example, the gripping surface 1340 can be connected using hook and loop connectors, magnets, push fasteners, and other techniques for creating a removable mechanical connection. Allowing the gripping surface 1340 to be readily removed from the blade gripper 1360 can thus facilitate reloading the blade gripper 1360 with new gripping surfaces 1340 to account for degradation in the performance of a particular gripping surface (e.g., due to degradation of internal electrical connections, tears or other irregularities in the gripping surface 1340, etc.). In such an example, the blade gripper 1340 can be refilled with a suitable replacement gripping surface, which can then be removably attached.

FIG. 13D illustrates a top view of the example vertical electroadhesive blade gripper 1360 shown in FIG. 13C. FIG. 13D illustrates the connection of the blade gripper 1360 to another load-bearing structure 1370, such as a connection point for a control arm, etc. The blade gripper 1360 has a distal end 1364 that extends furthest from the load-bearing structure 1370. The proximate end 1366 of the blade gripper 1360 is connected to another load-bearing structure 1370. The load-bearing structure 1370 can be connected to the blade gripper 1360 via fasteners 1372a-b attached to anchors 1373a-b to clamp the blade gripper 1360 to the load-bearing structure 1370. For example, the fasteners 1372a-b may be bolts and the anchors 1373a-b may include nuts for tightening the bolts. The fasteners 1372a-b may pass through the gripping surface 1340, insulating layer 1362, support structure 1330, as well as respective portions of the load-bearing structure 1370 such that the blade gripper 1360 is held tight against the load-bearing structure 1370 when the bolts are tightened. High voltage contacts 1367a-b connect to opposing polarity voltage outputs of the voltage supply 1320. Leads 1365a-b, which may be flexible conductive wires, for example, electrically connect the contacts 1367a-b to terminals 1344a-b on the gripping surface 1340. The terminals 1344a-b are then electrically connected to a pattern of opposing polarity electrodes disposed within the griping surface 1340.

5b) Example Electrode Geometries

Figure 13E:
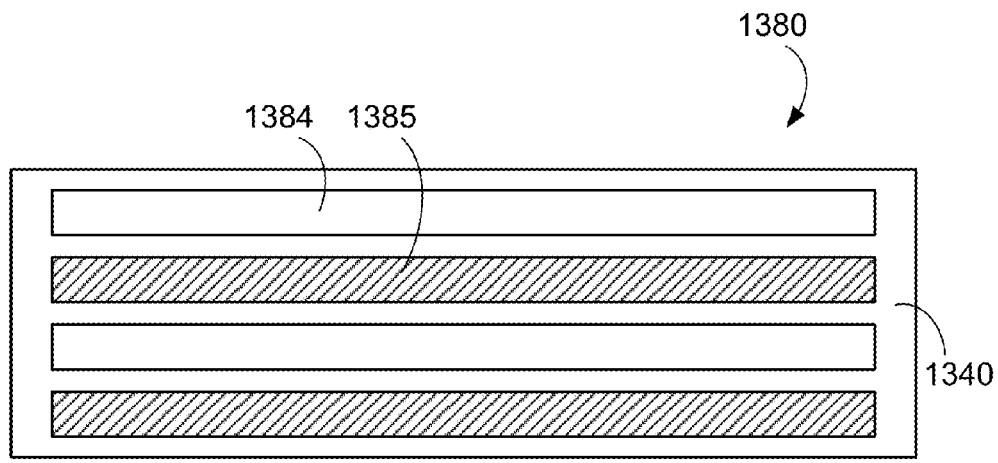
FIG. 13E illustrates one example electrode geometry for a vertical electroadhesive blade.

FIG. 13E illustrates one example electrode geometry 1380 for the vertical electroadhesive blade. For convenience in notation and explanation only, the first electrode 1384 is alternately described herein as a positive electrode, and is illustrated with a cross-hatching to allow the first electrode 1384 to be readily distinguished from the second electrode 1385, which is shown without cross-hatching. Similarly, the second electrode 1385 is alternately referred to as a negative electrode. In the geometry 1380, the electrodes are arranged as parallel bars that alternate between positive electrodes (e.g., 1385) and negative electrodes (e.g., 1384). Opposite polarity electrodes are therefore situated adjacent one another, which facilitates electroadhesion.

Figure 13F:
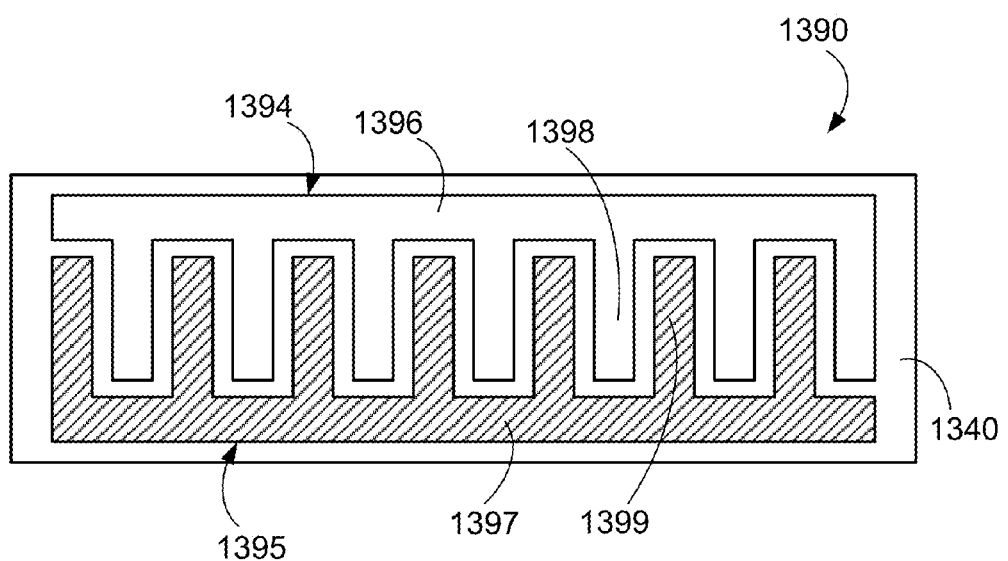
FIG. 13F illustrates another example electrode geometry for a vertical electroadhesive blade.

FIG. 13F illustrates another example electrode geometry 1390 for a vertical electroadhesive blade. As shown in FIG. 13F, the electrode geometry 1390 (i.e., electrode pattern) includes a first electrode 1394 and a second electrode 1395. Similar to FIG. 13E, the first electrode 1394 can be configured to receive a negative polarity voltage while the second electrode 1395 can be configured to receive a positive polarity voltage. Thus, the first electrode 1394 can be configured to be charged to a negative voltage relative to the second electrode 1395. The first electrode 1394 can include a lengthwise side rail 1396 that extends along the length of the blade gripping surface 1340. Similarly, the second electrode 1395 can include a lengthwise side rail 1397 that extends along the length of the blade gripping surface 1340.

The electrodes 1394, 1395 can also include an arrangement of interdigitated alternating electrodes 1398, 1399, which can extend from the respective side rails 1396, 1397. The interdigitated electrodes 1398, 1399 are situated such that opposite polarity electrodes are adjacent one another, in an alternating fashion. The interdigitated electrodes 1398, 1399 can extend within the gripping surface at least partially transverse to the respective side rails 1396, 1397 (e.g., along the height of the vertical blade gripper, rather than the length). In some examples, the interdigitated electrode geometry 1390 may be employed for connections with insulating and/or capacitive materials due to the tendency of the electrode geometry 1390 to avoid charge build up over time.

The electrodes of the geometries 1380, 1390 shown in FIGS. 13E-13F are disposed on or within a substrate that forms the gripping surface 1340. Additionally or alternatively, the electrodes can be patterned on the insulating layer 1362.

5c) Compliant Electroadhesive Surface

FIG. 14A illustrates an end view of an example blade gripper 1410 with a compliant electroadhesive surface 1412. The compliant electroadhesive surface 1412 includes a pattern of flexible electrodes situated on or within a flexible substrate to allow the electroadhesive surface 1412. The electroadhesive surface 1412 includes a lengthwise flap 1416 that is able to wrap (conform) around an item being manipulated. The lengthwise flap 1416 may be loosely coupled to the insulating layer 1362 and/or back-side support structure 1330, or it may lack any separate connection to the support structure 1330. A fixed portion 1414 of the compliant electroadhesive surface 1412 is coupled to the insulating layer 1362. When the blade gripper 1410 is adhered to an item, the bottom 1414 may abut (and adhered to) a bottom edge of the item, while the flap 1416 may conform to a tapered geometry of the item. For example, shrink wrap encased pallets commonly taper upward, such that they are widest at the base, but become narrower closer to the top. The compliant flap 1416 can conform to such surfaces to enhance the total adhered-to surface area and thereby increase the strength of the resulting connection. Further, the compliant electroadhesive surface 1412 can be used to adhere to irregularly-shaped objects. However, it is noted that the compliant flap 1416 may not convey stresses to the support structure 1330 as the fixed region 1414 of the electroadhesive surface 1412 that is more directly coupled to the insulating layer 1362 (and thus the support structure 1330).

FIG. 14B illustrates an end view of another example blade gripper 1420 having a deformable spacer layer 1424. A compliant electroadhesive surface 1422 can be disposed on the deformable layer 1424. The deformable layer 1424 can be formed of a polymeric material, foam, an enclosure filled with liquid, gel, and/or particles, or another deformable material. The deformable layer 1424 can provide a force-distributing coupling between the electroadhesive flexible electroadhesive surface 1422 and the insulating layer 1362 and/or support structure 1330, even while the electroadhesive surface 1422 conforms to items being manipulated. During adhesion with the blade gripper 1420, the deformable layer 1424 deforms to allow the conformable electroadhesive surface 1422 to at least partially wrap around (i.e., conform) to the exterior surface of items being manipulated. The deformable layer 1424 may be connected substantially continuously across the electroadhesive gripping surface 1422 and the insulating backing 1362.

5d) Compression-Resistant Load-Bearing Support Structure

FIG. 14C illustrates an end view of another blade gripper 1430. The blade gripper 1430 includes a curved backing 1432 coupled to the back side of a vertical electroadhesive surface 1434 to convey pushing and pulling shear forces acting on an item being manipulated by the electroadhesive surface 1434. The electroadhesive surface 1434 can be a flexible, conformable surface with a pattern of embedded flexible electrodes configured to conform to items being manipulated. The electroadhesive surface 1434 can be mechanically coupled to the curved backing 1432 along a strip extending along the length of the blade gripper 1430 near a centrally located connection point 1436. The coupling strip may be provided by a substantially continuous strip of adhesive, for example. The curved backing 1432 can be formed of a semi-rigid material, such as a plastic material. The curved backing 1432 includes an outward bow feature along its length. The bow feature can be relatively gradual and may have a radius of curvature greater than the height of the blade gripper 1430. The bow curvature provides the backing 1432 with a greater dimensional extent transverse to the plane of the electroadhesive surface 1434, which results in greater resistance to bending deformations in that direction. The backing 1432 can be sufficiently rigid to convey forces to/from the electroadhesive surface 1434 due to shear interaction with items adhered thereto. The curved backing 1432 can thus function as the load-bearing support structure for the blade gripper 1430.

FIG. 14D illustrates an end view of another blade gripper 1440. The blade gripper 1440 includes the curved backing 1432 and the electroadhesive surface 1434, similar to the blade gripper 1430. However, in the blade gripper 1440 of FIG. 14D, the top portion of the electroadhesive surface 1434 is allowed to conform to an exterior surface of a gripped object because it is connected along a connection point 1442 close to the bottom of the vertical gripper 1440. The curved backing 1432 distributes pushing and pulling shear forces on an item being manipulated by the electroadhesive surface 1434 via the connection point 1442. The curved backing 1432 can thus function as the load-bearing support structure for the blade gripper 1430.

FIG. 14E illustrates an end view of another blade gripper 1450. The blade gripper 1450 includes a curved backing 1452 that includes additional rigidity-enhancing edge curves 1454a-b. The edge curves 1454a-b can extend along the length of the backing 1452, similar to the bow curve in the backing 1432. However, the edge features 1454a-b can have a relatively small radius of curvature, compared to the height of the backing 1452, and can be located near top and bottom edges of the backing 1452. The edge features 1454a-b can be approximately semi-circular and can be curved in the same direction as the bow curve. For example, the outer curved surfaces of the edge features 1454a-b can be on the same side of the backing 1452 as the outer surface of the bow curve.

Some embodiments of the backing 1452 may include an edge feature along the top edge (e.g., the feature 1454a) or along the bottom edge (e.g., the feature 1454b), or both (as shown in FIG. 14E). The edge features 1454a-b provide structural reinforcement to the backing 1452 and increase the resistance of the backing 1452 to compressive forces and/or bending. The edge features 1454a-b further extend the dimensional extent of the backing 1452 transverse to the gripping surface 1434 and thereby enhance the bending resistance of the backing 1452. The blade gripper 1450 equipped with the backing 1452 resists deformation by bending and/or compression. The curved backing 1452 thus functions as the support structure to convey stress forces to/from the electroadhesive surface 1434 due to shear interactions with objects adhered thereto. Although the embodiments described here may use curved backing structures, similar effects can be implemented using straight edges with strategic attachment of the electroadhesive film 1436 to the load-bearing structure 1432.

5e) Adjustable Length Control Arms for Vertical Electroadhesive Grippers

Figure 15A:
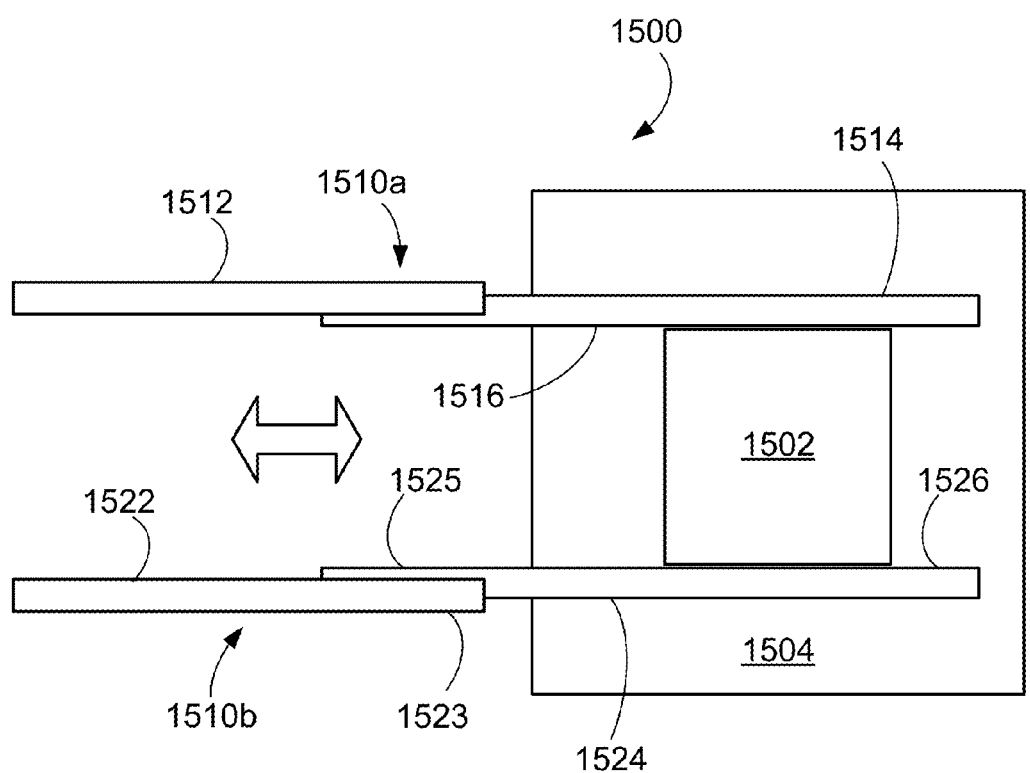
FIG. 15A is a functional block diagram that illustrates example telescoping arms that can be positioned to manipulate an item by a position controller.

FIG. 15A is a top view of an example blade gripping system 1500 with telescoping arms 1510a-b. The telescoping arm 1510a includes an electroadhesive blade gripper with a vertical gripping surface 1516 coupled to a support structure 1514. The telescoping arm 1510a also includes a base 1512 that receives the support structure 1514 of the blade gripper in a telescoping fashion to allow the telescoping arm 1510a to adjust its length. The base 1512 can overlap with the support structure via a sliding connection. In some cases, the base 1512 overlaps with the blade gripper only on the side nearest the support structure 1514 to avoid interference with the gripping surface 1516. The base 1512 can be connected to a load bearing structure of a positioning system to convey stress to/from the blade gripper. The telescoping arm 1510b similarly includes a base 1522 that overlaps with a blade gripper having an electroadhesive surface 1526 coupled to a support structure 1524. The overlapping region of the telescoping arm 1510b includes a portion 1523 of the base 1522 and a portion 1525 of the blade gripper. The overlapping region can include a track or other sliding connection where one of the portions 1523, 1525 is at least partially received into the other. In addition, a sliding and/or rolling electrical contact can be included in the interface between the overlapping regions 1523, 1525 to provide electrical connection to the electroadhesive gripping surface 1526. Additionally or alternatively, the telescoping system 1500 may include flexible electrical connectors (e.g., coiled wires, etc.) that connect to a non-overlapping region of the blade gripper to bypass the telescoping connection.

The pair of telescoping arms 1510a-b can be used to jointly manipulate an item 1502 resting on a shelf 1504 or another horizontal surface. Both telescoping arms 1510a-b can terminate with blade grippers, and the electroadhesive gripping surfaces 1516, 1526 can be arranged to face one another. In addition, the respective bases 1512, 1522 can overlap with the blade grippers such that the electroadhesive gripping surfaces 1516, 1526 are not blocked by the bases 1512, 1522. A positioning system can be used to extend the telescoping arms 1510a-b across the shelf 1504 such that the respective gripping surfaces 1516, 1526 are proximate opposing sidewalls of the item 1502. The electroadhesive gripping surfaces 1516, 1526 can then be turned on (e.g., via voltage applied via electrical connection integrated in the telescoping arms 1510a-b). The gripping surfaces 1516, 1526 can then adhere to the sidewalls of the item 1502 to allow the item 1502 to be manipulated. Adjusting the length of the telescoping arms 1510a-b can thus be used to urge the item 1502 on/off the shelf 1504. The telescoping arms 1510a-b can operate to adjust length using a variety of different techniques. For example, one or more stepper motors, hydraulic volumes/valves, etc. can be used to urge the telescoping arms 1510a-b to expand/contract in length.

Figure 15B:
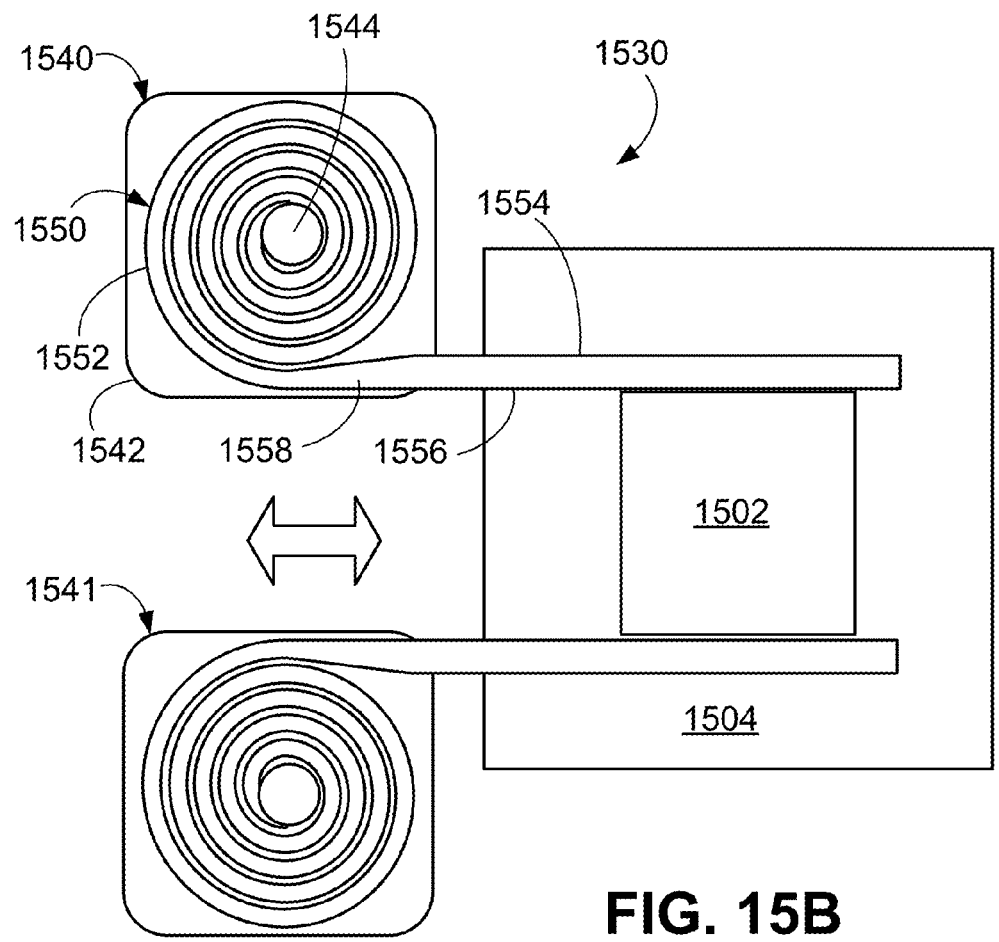
FIG. 15B is a functional block diagram that illustrates example retractable arms that can be positioned to manipulate an item by a position controller.

FIG. 15B is a top view of another blade gripping system 1530 with retractable electroadhesive blade grippers. The retractable blade gripper 1550 is coiled within a retractable module 1540. The module 1540 can include a housing 1542 and an axle 1544. The retractable gripper 1550 includes a coiled portion 1552 disposed within the module 1540 and a straight force-imparting portion that extends out of the module 1540. The straight force-imparting section of the blade gripper 1550 includes an electroadhesive gripping surface 1556 and a structural support 1554. To facilitate coiling, the structural support 1554 can be a semi-rigid material with a bow curvature extending along the length of the blade gripper 1550 to provide resistance to compression and/or bending. The bow curvature can be oriented with the outward curve facing the electroadhesive surface 1556, similar to the blade grippers described above in connection with FIGS. 14C-14E. As the blade gripper 1550 transitions to the coil portion 1552, the bow curvature may partially uncurl to allow the gripper 1550 to coil about the axle 1544. The transition section 1558 of the blade gripper 1550 can thus transition from a bow curvature along the length (along the straight force-imparting section) to a coiled curvature along the width (in the coiled section 1552).

The coiled portion 1552 can coil around the axle 1544 within the housing 1542. In some examples, the blade gripper 1552 can be anchored to the axle 1544 by a mechanical connection such that rotation of the axle 1544 causes the gripper 1550 to coil around the axle. The axle 1544 may be biased (e.g., by a torsion spring or the like) to urge the blade gripper 1550 to retract into the coiled portion 1552.

The module 1540 can also include components for adjusting the length of the exposed, force-imparting section of the blade gripper 1550. Such length-adjustable components can then be used to impart pushing and/or pulling forces on the item 1502 resting on the shelf 1504. The module 1540 may therefore include an arrangement of clamps or other connectors, (e.g., electroadhesive connectors) to mechanically couple the blade gripper 1550 to a load-exerting and/or load-receiving structure, such as the housing 1542 of the module 1540, or another load-receiving structure. For example, the blade gripper 1550 can be clamped in the transition section 1558 to fix the transition section 1558 with respect to the housing 1542, and thereby couple the support structure 1554 of the exposed force-imparting section to the housing 1542. The module 1540 may also include components for controllably adjusting the exposed length. For example, the gripper 1550 may be clamped by a set of rollers disposed on either side of the gripper 1550 such that rotating the rollers adjusts the exposed length. Such rollers can then be used to impart push/pull forces on the item 1502 via the electroadhesive surface 1556.

The system 1530 can also include a second retractable blade gripper within a second retractable module 1541. The second retractable blade gripper can be similar to the first retractable blade gripper 1550 and can be arranged as a mirror image thereof such that the electroadhesive surfaces of the two retractable grippers are faced toward one another.

Figure 15C:
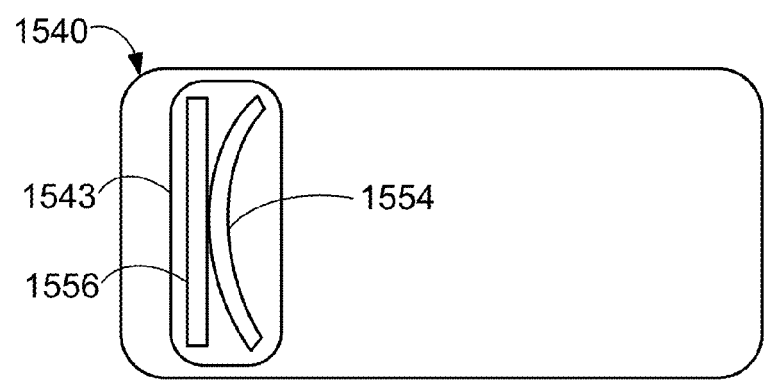
FIG. 15C is an end view of the example retractable blade gripping module.

FIG. 15C is an end view of the example retractable blade gripping module 1540. The retractable blade gripper 1550 emerges from the module 1540 via a portal 1543. The support structure 1554 can be a semi-rigid material with a bow curvature along its length to provide structural resistance to compressive and/or bending forces. The electroadhesive surface 1556 is coupled to the outward-curved side of the curved backing 1554.

The structure of the blade gripper 1550 and retractable module 1540 is similar in some respects to the retractable structure of a measuring tape, which is coiled within a housing, but is deployed as a rigid structure with a curvature along its length.

5f) Electroadhesive Gripper with Independently Addressable Subsections

Figure 16A:
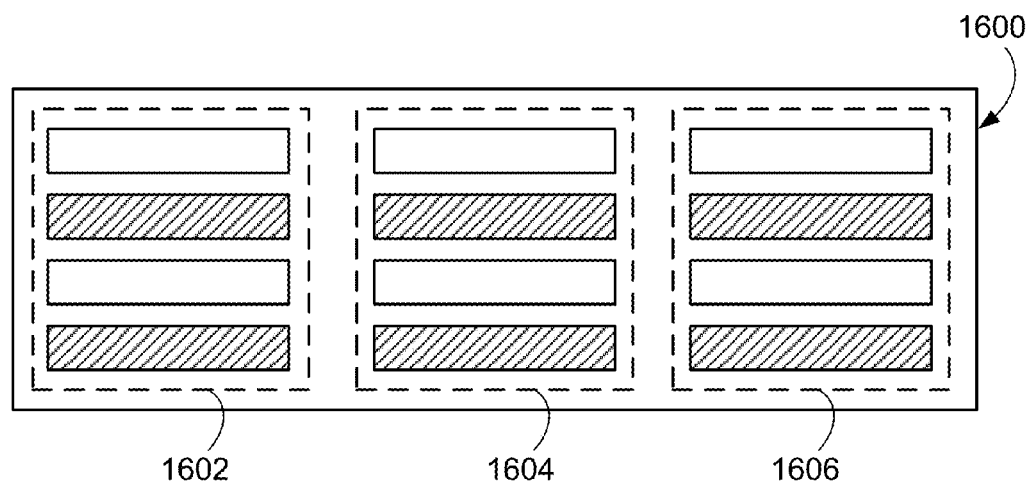
FIG. 16A illustrates an electroadhesive gripper with a plurality of independently addressable subsections.

FIG. 16A illustrates a functional block diagram of an electroadhesive gripper 1600 with a plurality of independently addressable subsections 1602-1606. The gripping surface of the electroadhesive gripper 1600, which may be a vertical blade gripper, is divided into distinct, non-overlapping areas or subsections. Each subsection includes a set of electrodes configured to be charged with opposite polarity voltages to induce an electroadhesive response in an object situated near the gripping surface 1600. The electrodes are illustrated for example purposes with electrodes configured to receive a positive voltage (i.e., positive polarity electrodes) rendered with a hatch pattern and electrodes configured to receive a negative voltage (i.e., negative polarity electrodes) are rendered without a hatch pattern to facilitate distinguishing between the two. As shown in FIG. 16A, each of the subsections 1602-1606 can include alternating opposite polarity electrodes. The alternating polarity electrodes in each subsection can optionally be interdigitated, although a variety of electrode geometries may be used.

Each of the subsections 1602-1606 can have a pair of separate terminals to connect the respect electrodes in the subsection to a voltage supply. The connection to each subsection-specific set of terminals can then be separately controlled (e.g., via a suitable controller) to allow the various subsections to be controlled separately.

Figure 16B:
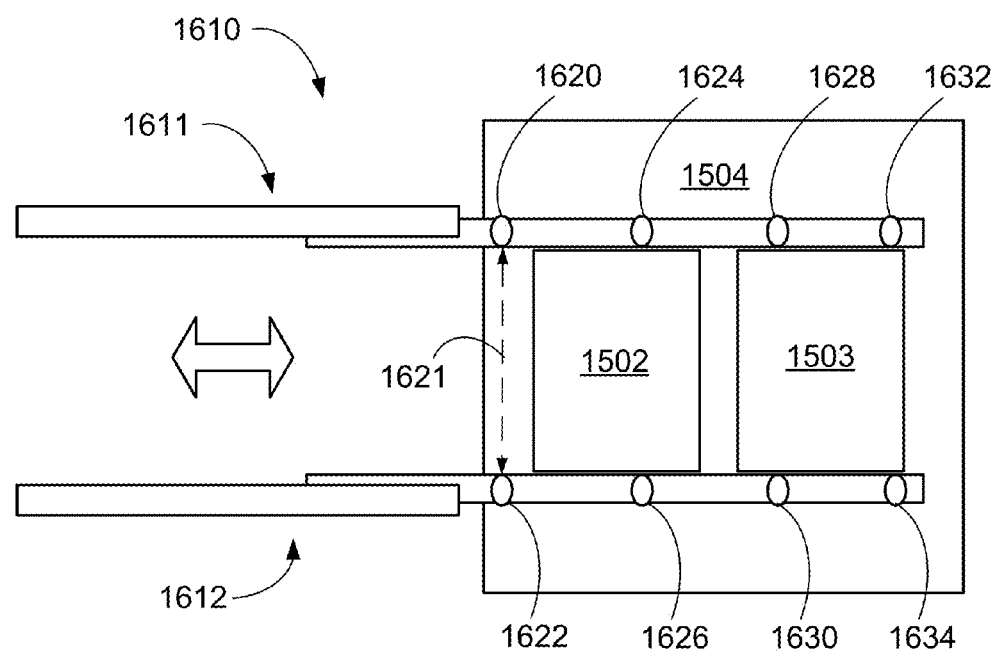
FIG. 16B illustrates a pair of telescoping electroadhesive grippers equipped with sensors to operate addressable regions of the grippers.

FIG. 16B illustrates a pair of telescoping electroadhesive grippers 1611, 1612 equipped with sensors to operate addressable regions of the grippers 1611, 1612. Sensors configured to detect the presence (or absence) of items between the grippers 1611, 1612 are disposed at multiple locations along the length of the respective gripping surfaces. For example, the telescoping gripper 1611 can include sensors 1620, 1624, 1628, and 1632. Similarly, the telescoping gripper 1612 can include sensors 1622, 1626, 1630, 1634. The sensors can operate to detect indications of items situated between the two grippers 1611, 1612 by detecting surface capacitance along the gripping surface, slippage indicated by thermistor-based slip sensors, etc. Additionally or alternatively, the sensors on the two grippers 1611, 1612 may operate cooperatively. For example, the sensors 1620, 1622 can detect whether radiation 1621 transmitted from one reaches the other. The sensors can therefore include radiation emitters and/or detectors. For example, the sensor 1620 can include an infrared emitter while the sensor 1622 can include an infrared detector. Failure to detect radiation emitted 1621 from sensor 1620 via sensor 1622 can thus indicate an object is present which is blocking the radiative path. On the other hand, successfully detecting such radiation can indicate that an object is not present between the two grippers 1611, 1612 along the line connecting the two sensors 1620, 1622.

The electroadhesive surfaces of the two grippers 1611, 1612 can be divided into separately addressable subsections and which subsection(s) to turn on, if any, and/or the magnitude of voltage(s) to apply can be determined dynamically based at least in part on sensor data (e.g., from the sensors 1620-1634). For example, voltage may be selectively applied to those subsection(s) proximate the items 1502, 1503.

By separately addressing different polarizing voltages to different subsections of the electroadhesive grippers 1611, 1612, the system 1610 can be operated with relatively greater energy efficiency than non-addressable gripping systems. In some examples, the separately addressable gripping system 1610 only applies voltage to those regions of the grippers 1611, 1612 adhered to the items 1502, 1503, and thereby conserves power with respect to the unpowered subsections. In other cases, the separate region may be used to dynamically determine whether to pick any combination of 1, 2 or more cases (1502, 1503) etc. that are disposed in front of each other as shown FIG. 16B.

5g) Example Alternative Vertical Gripper Configurations

FIG. 17A illustrates a front view of another example vertical electroadhesive gripper 1710 configured to urge an item in a direction transverse to the plane of its electroadhesive gripping surface. The gripper 1710 is applied to a front of a box 1702 on a shelf 1704 to pull the box outward, toward the gripper 1710. In contrast to the shear-stress mediated vertical grippers described above in connection with FIGS. 13-16, the gripper 1710 applies a normal stress on the electroadhesive gripping surface, produced in a direction perpendicular to the electroadhesive gripping surface. FIG. 17B illustrates a top view of the box on the shelf shown in FIG. 17A, and showing the gripper 1710 adhered to the front of the box 1702. The gripper 1710 includes an electroadhesive gripping surface 1712 and a force-distributing backing 1714. The electroadhesive surface 1712 can include a substrate with an integrated pattern of electrodes configured to induce an electroadhesive response in the box 1702. The electroadhesive surface 1712 can optionally include (or be coated with) an insulating and/or protective layer to protect the electrodes from mechanical disruption and electrically isolate the electrodes from discharging to a conductive material. The force-distributing backing 1714 can be a rigid or semi-rigid material configured to distribute the tensile stress across the gripping surface 1712 and convey such stress to a suitable positioning system. The backing 1714 may also include a deformable material to allow the electroadhesive surface 1712 to at least partially conform to the box 1702. In some embodiments, the gripper 1710 may be larger than a single case or box 1702, and may thus facilitate interaction with multiple boxes that have a substantially common plane with each other. Such an arrangement facilitates handling multiple boxes at one time, such as in the application of loading or unloading boxes from a truck or from a pallet. Further, in such cases, individually addressable subsections such as those described in Section 5f may be used to select which of these boxes to exert electroadhesive forces on.

FIG. 18A illustrates a front view of another vertical electroadhesive gripper 1810 configured to connect to a side corner of the item 1702. The gripper 1810 has a corner 1820 with a roughly 90° bend. The gripper 1810 can be simultaneously applied to both the front and sidewall of the box 1702 that is then urged on/off the shelf 1704. FIG. 18B illustrates a top view of the box 1702 on the shelf 1704 shown in FIG. 18A, and showing the gripper 1810 adhered to the side corner of the box 1702. The corner gripper 1810 is thus a combination of a shear gripping surface 1816 and a normal gripping surface 1812. Similar arrangements can be applied by rotating an electroadhesive gripper of similar geometry, but positioning it to attach to the front and top side of the box or case instead of the front and side. The electroadhesive surfaces 1812, 1816 can optionally include (or be coated with) an insulating and/or protective layer to protect the electrodes included therein from mechanical disruption and electrically isolate the electrodes from discharging to a conductive material.

Each of the gripping surfaces 1812, 1816 are coupled to suitable support structures to distribute and/or transfer the forces exerted on the gripping surfaces 1812, 1816. The shear gripping surface 1816, which is configured to adhere to a side wall of the box 1702 and exert a force substantially parallel to the plane of the gripping surface 1816, is coupled to a compression-resistant support structure 1818 that conveys the shear forces imparted on the gripping surface 1816. The tensile gripping surface 1812 is coupled to a backing 1814 that distributes the tensile forces (e.g., pulling force) across the gripping surface 1812 and conveys those forces to a suitable load-bearing structure. The backing 1814 and/or support structure 1818 may also include a deformable material to allow the electroadhesive surfaces 1812, 1816 to at least partially conform to the box 1702.

The shear-exerting and tensile-exerting portions of the gripper 1810 are joined by a corner joint 1820 which runs parallel to a side corner of the box 1702. The joint 1820 may be a rigid joint and/or may be adjustable. For example, the joint 1820 may be hinged to allow the relative angle between the gripping surfaces 1812, 1816 to be adjusted to angles other than 90. In some examples, the joint 1820 may be adjustable to allow the gripper 1810 to switch between a substantially flat gripper suitable for adhering to sidewalls of objects being manipulated and a corner gripper suitable for adhering to side corners of such objects. In other examples, the gripping surfaces 1812 and 1816 may be spring-loaded relative to each other.

VI. Example Electroadhesive Curtain Gripper

In addition, some embodiments of the present disclosure provide flexible electroadhesive grippers useful for adhering to individual items. Such flexible, conformable electroadhesive grippers can be applied in a broad range of automated handling contexts.

6a) Example Curtain Type Electroadhesive Gripper

Figure 19A:
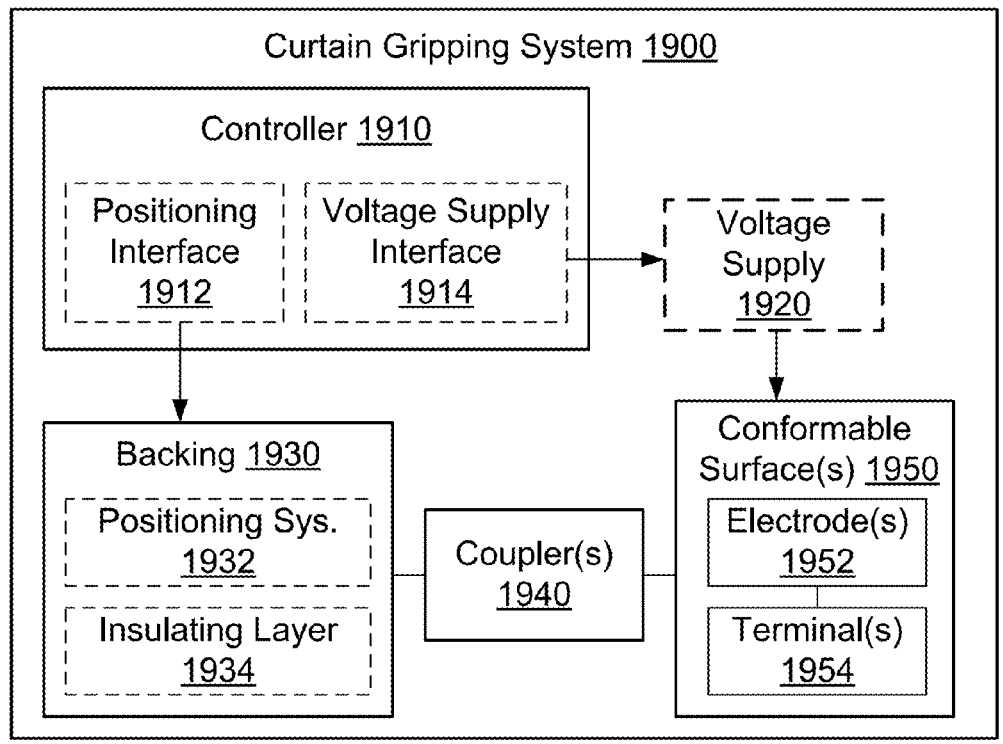
FIG. 19A is a functional block diagram of an example electroadhesive curtain gripping system.

FIG. 19A is a functional block diagram of an example electroadhesive curtain gripping system 1900. The curtain gripping system includes a controller 1910, a voltage supply 1920, and at least one curtain gripper having an electroadhesive conformable surface 1950 and a backing 1930 mechanically connected by coupler(s) 1940. The voltage supply 1920 can be configured to supply high DC voltages in a range of, for example, 0.5 kilovolt ("kV") to about 10 kV, similar to the electroadhesion voltages discussed above. In some cases, a current supply may be used instead of a voltage supply to achieve similar effects. The conformable surface 1950 includes integrated electrodes 1952 connected to the voltage supply 1920 via respective terminals 1954. The electrodes 1952 can optionally be flexible electrodes, such as formed by a pattern of conductive film on a flexible substrate. The electrodes 1952 can be patterned according to a variety of different geometries and are generally arranged such that opposing polarity electrodes are situated adjacent one another, and may be arranged with opposing polarity electrodes alternating one another, similar to the example electrode geometries described above in connection with FIGS. 1-18.

It is noted that the voltage supply 1920 may generally be a power supply configured to output AC or DC voltages or currents sufficient to apply a polarizing voltage to the electrodes 1952. For convenience in the description herein, the module 1920 is therefore referred to as "voltage supply," although some embodiments may employ current supplies and/or other electrical power supplies. For example, current supplies may be tuned to provide suitable currents for generate desired polarizing voltages at the electrodes.

The conformable surface 1950 of the curtain gripper can be coupled to a backing 1930, which can be a semi-rigid structure used to distribute stress on the conformable surface 1950 (e.g., due to a load exerted by an adhered foreign object). The backing 1930 can additionally or alternatively convey such stress forces away from the conformable surface, to a load-bearing structure such as a control arm. The couplers 1940 used to mechanically connect the backing 1930 to the conformable surface 1950 (and thereby convey stress from the conformable surface 1950 to the backing 1930) may include one or more mechanical connections between the conformable surface 1950 and the backing 1930. In some examples, the couplers 1940 allow the conformable surface 1950 to have sufficient flexibility to conform to an external surface of an object being manipulated, while providing sufficient points of connection to allow local stresses on the conformable surface 1950 to be transferred to the backing 1930. The couplers 1940 may additionally or alternatively include a deformable layer connected to both the backing 1930 and the conformable surface 1950. Such a deformable layer may be connected substantially continuously or at intermittent locations across the conformable surface 1950.

The backing 1930 can also include an electrical insulating layer 1934. The insulating layer 1934 can be situated between the electrodes 1952 in the conformable surface 1950 and any components in the backing 1930 that may be conductive. The insulating layer 1934 can thus provide an electrical buffer between the electrodes 1952 to prevent discharge of the electrodes 1952. The backing 1930 can also include (or be connected to) a positioning system 1932 for moving the conformable surface to a desired position, such as a position suited to adhere to a foreign object. The positioning system 1932 may include cables or other mechanical devices to apply tension to portions of the semi-rigid backing structure so as to adjust the positions thereof (e.g., FIG. 20C). In examples in which the curtain gripping system 1900 includes multiple curtain grippers (i.e., multiple conformable electroadhesive surfaces), the positioning system 1932 can be used to adjust between an open position, in which multiple conformable surfaces 1950 are urged apart (e.g., FIG. 20B), to a closed position, in which multiple conformable surfaces 1950 are urged together (e.g., FIG. 20A), so as to surround a foreign object being gripped.

The controller 1910 can include electronics and/or logic implemented as hardware and/or software modules to control operation of the curtain gripping system 1900. For example, the controller 1910 can include a voltage supply interface 1914 for controlling the voltage supply 1920 whether to apply voltage to the electrodes 1952 of the conformable surface 1950. The voltage supply interface 1914 may be configured to operate a switch (or switches) connecting the output of the voltage supply 1920 to the terminals 1954 of the conformable surface 1950 (or perhaps switches within the voltage supply 1920). Moreover, the voltage supply interface 1914 may specify a magnitude of voltage to be applied to the electrodes 1952. The controller 1910 may also be configured to receive inputs from sensors in order to control the voltage or current supplied to electrode 1952. Such sensors may embedded into the conformable surface 1950 and may utilize the electrodes 1952 themselves with capacitance based sensing, or other types of sensors such as RFID, vision, X-ray, ultrasound or barcode readers. The sensors may also be located external to the device 1900 and include any of the above aforementioned modalities. The voltage supply interface 1914 may provide instructions to adjust the magnitude of voltage output from the voltage supply 1920. Upon receiving instructions, the voltage supply 1920 is configured to apply the specified voltage to conductive wires or lines connected to the terminals 1954. The applied voltage can be an AC or DC voltage or an AC or DC current, which can provide opposing polarity on the electrodes 1952 in the conformable surface and thereby cause the conformable surface 1950 to induce corresponding polarization in a foreign object positioned proximate the conformable surface 1950, which results in an electroadhesive attraction between the conformable surface 1950 and the foreign object. Using the voltage supply interface 1914 to cause the voltage supply 1920 to apply voltage to the terminals 1954 can thus be considered turning on the electroadhesive curtain gripper 1900. Similarly, causing the voltage to cease being applied to the terminals 1954 (e.g., by turning off or disconnecting the voltage supply 1920, or reducing the magnitude of the applied voltage, etc.) can be considered turning off the electroadhesive curtain gripper 1900.

The controller 1910 may also include a positioning interface 1912 configured to control the position of the curtain gripper 1950. For example, the controller 1910 can instruct one or more position motors (e.g., servo motors or the like) in the positioning system 1932 to adjust the position of the backing, which thereby adjusts the position of the conformable surface 1950, via the couplers 1940.

Figure 19B:
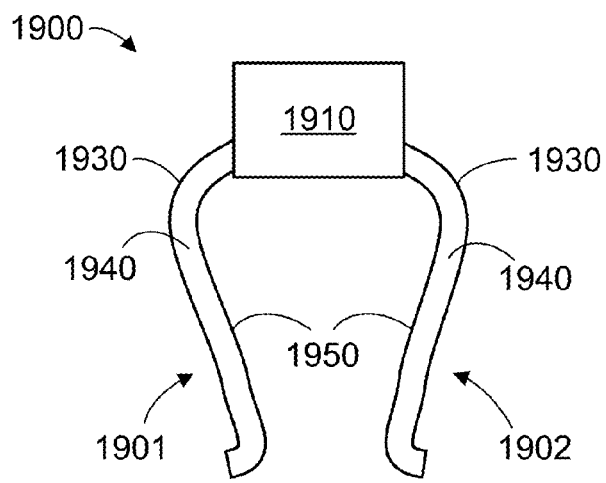
FIG. 19B is an illustration of a simplified curtain gripper.

FIG. 19B is a simplified diagram of an example embodiment of the curtain gripping system 1900. A first curtain gripper 1901 and a second curtain gripper 1902 are attached to a controller 1910. Each of the curtain grippers 1901, 1902 include a conformable electroadhesive surface 1950 connected to a backing 1930 by one or more couplers 1940. The curtain grippers 1901, 1902 are situated such that the respective electroadhesive surfaces 1950 face one another, such that the two conformable surfaces 1950 can simultaneously adhere to a foreign object situated between the two curtain grippers 1901, 1902. The controller 1910 may optionally include the voltage supply 1920, or otherwise communicate with a voltage supply that is connected to apply voltage to electrodes in the conformable surfaces 1950 of the curtain grippers 1901, 1902. This arrangement can be extended to more than two curtain grippers to any gripper that contains an arbitrary number of curtains.

When positioned proximate a foreign object (e.g., via the positioning system 1932), opposing polarity voltages can be applied to the electrodes 1952 sufficient to induce a complementary local electrical polarization in the foreign object. The resulting electroadhesive attraction between the foreign object and the conformable surface 1950 of the curtain gripper may cause the conformable surface 1950 to wrap around (i.e., conform to) the foreign object. While the voltage is applied to the electrodes 1952, the curtain gripper can then be used to lift, drag, move, position, place, or otherwise manipulate the foreign object. For example, the foreign object can be manipulated by pulling on the end of the conformable surface 1950 that is not adhered to the foreign object. In some examples, the curtain gripper system 1900 can be attached to a control arm, which can then be used to move the adhered foreign object to a desired position. Once moved/positioned to a desired location, the foreign object can then be released by reducing the voltage applied to the electrodes 1952 (e.g., turning the voltage off).

6b) Driven Support Structure for Curtain Type Electroadhesive Gripper

FIG. 20A is a simplified block diagram of an example electroadhesive system 2000 including a driven backbone system for positioning flexible electroadhesive grippers 2020, 2030. The grippers 2020, 2030 each include a compliant electroadhesive surface 2022, 2032 coupled to a backing 2024, 2034. The backing 2024, 2034 for each gripper 2020, 2030 can be manipulated via motor(s) 2012 within a control module 2010. Thus, the backing 2024, 2034 can be connected to mount the grippers 2020, 2030 to features on or within the control module 2010, such as a housing. The motor(s) 2012 (or another mechanical manipulation device) in the control module 2010 can be servo controlled, and are connected to the backing 2024, 2034 such that the position of the grippers 2020, 2030 is influenced by the motors 2012.

The electroadhesive gripping system 2000 can be used for single item handling. In operation, the conformable electroadhesive surfaces 2022, 2032 can be placed proximate an object 2001 (e.g., via manipulation of the backings 2024, 2034 via the motor(s) 2012). A voltage can then be applied to the electrodes within the electroadhesive surfaces 2022, 2032 appropriate to induce an electroadhesive response in the item 2001 due to local polarization on the surface thereof. The item 2001 can then be manipulated by a load-bearing and/or load-receiving structure connected to the control module 2010, for example.

FIG. 20B illustrates the example electroadhesive system of FIG. 20A while the individual grippers 2020, 2030 are set to an open position. As shown in FIG. 20B, the grippers 2020, 2030 can be moved apart from one another (and away from the item 2001) by manipulating the backings 2024, 2034 of each gripper 2020, 2030 using the motor(s) 2012 within the control module 2010. The open position of the single item gripping system 2000 shown in FIG. 20B may be used during release of the item 2001, and may be performed following deactivation of electroadhesion.

The item gripping system 2000 shown in FIGS. 20A-20B can be used to adhere to (and manipulate) individual items. The individual item gripping system 2000 may be used to adhere to grocery items, such as fruit and vegetable produce and/or food containers including bags, boxes, cans, bottles, etc. Example arrangements of the individual item gripping system may include multiple flexible curtain grippers mounted to a load-bearing structure. The curtain grippers can be distributed regularly around a central target position, such that the grippers come together to adhere to an individual item located at or near the target position (e.g., the position of the item 2001 in FIGS. 20A-20B). The individual grippers can be directed to drape across such a target item and each individual gripper can descend to conform to the top and/or side surface(s) of the target item. The gripping system 2000 shown and described in connection with FIGS. 20A-20B illustrates two flexible electroadhesive grippers, but some examples may include individual item grippers with more than 2 grippers, such as a gripping system with 3, 4, 5, or 6 separate flexible grippers mounted to hang from a load-bearing structure. The flexible electroadhesive grippers can be regularly distributed about a target location such that the flexible grippers approach the target location from different directions. In some examples, adjacent ones of such a group of flexible electroadhesive electrodes can have a substantially uniform interspacing. In some examples, the top ends of the flexible electroadhesive grippers are connected to points along a circumference (or tangential portions thereof) with dimensions corresponding to a size of an item to be manipulated.

Figure 20C:
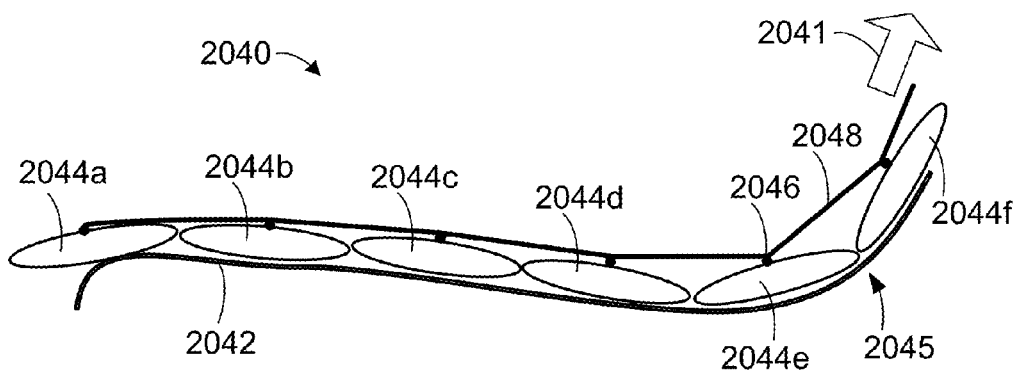
FIG. 20C illustrates an example backbone support structure formed of a segmented beam with joints to allow the curtain type gripper to flex.

FIG. 20C illustrates an example curtain gripper 2040 with a backbone support structure formed of a segmented beam. The support structure can include multiple parallel beams 2044a-2044f. The beams 2044a-2044f can be joined by a cable 2048 connected to the connection points 2046 along the back side of the gripper 2040. A flexible electroadhesive surface 2042 is connected to the segmented beams 2044a-f opposite the side connected to the cable 2048. The flexible electroadhesive surface 2042 may be connected to the beams 2044a-f at multiple, spatially separated anchor points, to allow the flexible electroadhesive surface 2042 freedom of movement to at least partially conform to an item being manipulated. Tension on the cable 2048 (indicated by the arrow 2041) urges the gripper 2040 toward an open position, by pulling the various connection points 2046 on the back sides of the beams 2044a-f closer together. Tension (2041) on the cable 2048 can thereby cause the backbone structure to bend at joints between the beams (e.g., the joint 2045 between the beams 2044e, 2044f). The beams can meet at rounded edges to facilitate such bending at the joints between adjacent ones of the beams. Depending on the configuration, the cable 2048 may be stiff enough (such as a thin steel rod) to both pull and push the overall finger 2050 so that it can control its shape in both opening and closing. In other cases, the anchor points for the cable 2048 can be locked at intermediate position using mechanical, electrostatic or other means to allow controlling the overall shape of the finger 2050 in complex ways.

Figure 20D:
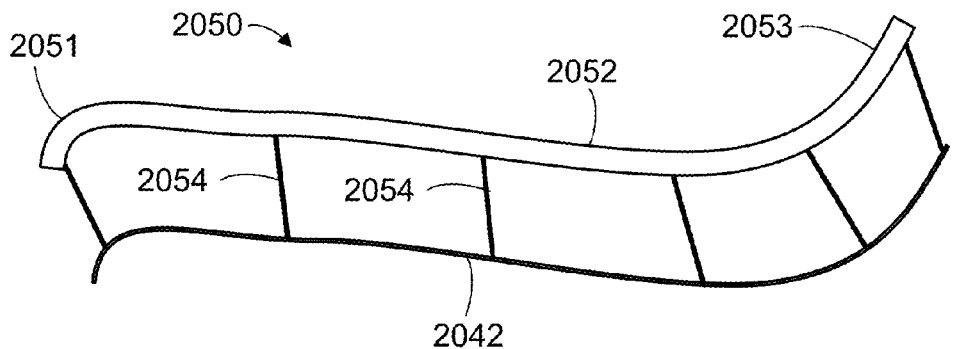
FIG. 20D illustrates an example arrangement for coupling the backbone to the curtain type gripper using multiple flexible tethers.

FIG. 20D illustrates an example arrangement curtain gripper 2050 with a backing 2052 coupled to the gripping surface 2042 using multiple flexible tethers 2054. The backing 2052 can be formed of a rigid or semi-rigid material suitable to allow the gripper 2050 to be manipulated via a connection near an end 2053, which can be connected in a control module with servo-controlled motors, for example. The backing 2052 is coupled to the flexible electroadhesive surface 2042 via multiple tethers 2054 connected to respective anchor points in the backing 2052 and the electroadhesive surface 2042.

The tethers 2054 can distribute and/or transmit forces on the electroadhesive surface 2042 to the backing 2052 while still allowing the flexible electroadhesive surface 2042 sufficient freedom to conform to exterior surfaces of objects the gripper 2050 is adhered to. The individual tethers 2054 may also be flexible, but have sufficient tensile strength to readily transmit tensile stress from the electroadhesive surface 2042 to the respective anchor points on the backing 2052. To facilitate such force distribution and/or transmission, the tethers 2054 can be distributed along the length of the curtain gripper 2054 (e.g., at a range of locations between the proximate end 2053 and the distal end 2051). As such, each of the tethers 2054 transmits force from a region of the electroadhesive surface 2042 nearest a respective tether anchor point. The spacing and/or distribution of the tethers 2054 can be selected by balancing sufficient flexibility to achieve surface conformance with the gripping surface 2042, against sufficient connections to effectively transmit stresses to the backing 2052. For example, the maximum spacing between adjacent ones of the tethers 2054 may be limited by the structural integrity of the flexible gripping surface 2042 to resist tearing, ripping, etc., when stressed by an expected loading condition.

The individual tethers 2054 can be formed of cables or strings, or another flexible tension transmitter. When pulled taught, each such flexible tether 2054 can then transmit local shear stresses on the conformable surface 2042, from a region nearest the point of connection, to a corresponding connection point on the backing 2052. The spatially separated arrangement of flexible, stress transmitting tethers 2054 can allow the flexible gripping surface 2042 to substantially conform to exposed surfaces of foreign objects being manipulated, because relatively few points of the flexible surface 2042 are restricted by the backing 2052.

Figure 20E:
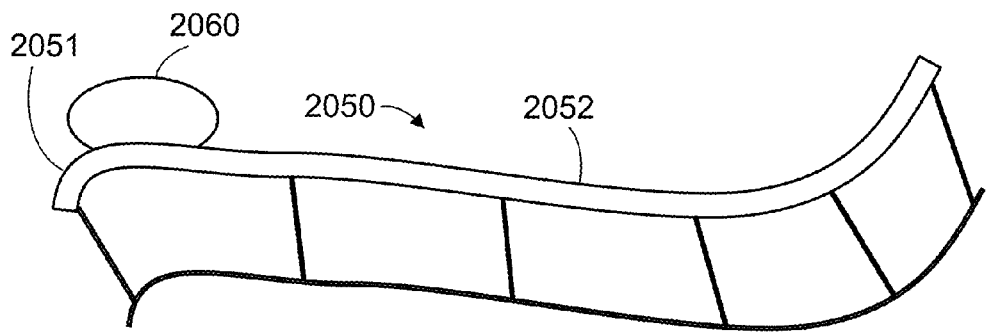
FIG. 20E illustrates an example weight placed near the end of the backbone to bias the curtain gripper to relax in a closed position.

FIG. 20E illustrates an example weight 2060 placed near the distal end 2051 of the backing 2052 to cause the curtain gripper 2050 to relax to a closed position (e.g., as in FIG. 20A). The weight 2060 biases the curtain gripper 2050 to its closed position in the absence of another force acting on the gripper 2050. The weight 2060 may be attached adhesively. Additionally or alternatively, the gripper 2050 may be biased using a variety of other techniques, such as by a spring or other flexible member (e.g., rubber band) that applies a downward biasing force near on the curtain gripper 2050 near the end 2053 proximate the control module, for example. In some cases, the springs may be implemented by using elastic members that span between the successive curtains of the gripper 2050. One embodiment of this arrangement is one or more rubber band(s) that encircles all the fingers so that opening of the fingers involves radially stretching out and opening the rubber band(s). In other cases, bias for closing the gripper may come from the tension imposed internal to the gripper.

6c) Case Loading and Unloading

Figure 20F:
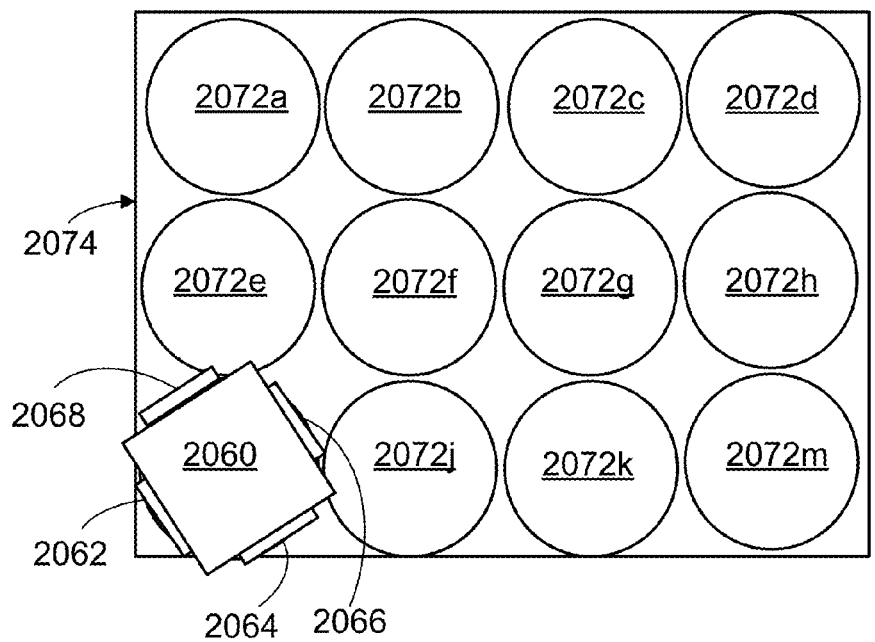
FIG. 20F illustrates a top view of a case of cans, with one can being gripped by an example individual item gripper.

The electroadhesive curtain grippers mentioned above can be used to grasp items from any surface (flat, moving on a conveyor belt), inside a bin or tote etc. However, one scenario of particular interest is grasping a single item from a case of substantially identical items. FIG. 20F illustrates a top view of a case 2074 loaded with cans 2072a-m, with one can (not visible) being gripped by an example individual item gripper 2060. The individual item gripper 2060 can be similar to the item gripping system 2000 described above in connection with FIGS. 20A-20B. The item gripper 2060 can include four or more flexible electroadhesive grippers 2062-2068, which can each be similar to the curtain grippers described above in connection with FIGS. 19-20. The curtain grippers 2062-2068 are mounted to a load-bearing structure of the item gripper 2060 to be suspended toward a target location, which is occupied by the can in the lower left corner of the case 2074. As shown in FIG. 20F, the individual curtain grippers 2062-2068 are narrow enough to be draped into the gaps between the cylindrical cans 2072 even while the case 2074 is fully loaded. Although, each curtain gripper 2062-2068 may be passively conveyed to the particular can being lifted, and thus the precise connection point may be determined by the draping of each of the curtain grippers around the sidewalls of the can (not visible). Moreover, in a given instance, some of the curtain grippers 2062-2068 may not convey to the target can at all (e.g., due to interference that prevents one of the grippers from draping as desired), but others of the curtain grippers 2062-2068 can provide sufficient adhesion with the target can to facilitate manipulation via the item gripper 2060.

The curtain grippers 2062-2068 may be symmetrically arranged and/or regularly spaced. For example, each of the curtain grippers 2062-2068 can be situated opposite an opposing curtain gripper (e.g., the gripper 2064 is across from the gripper 2068 and the gripper 2062 is across from the gripper 2066). In such a symmetric arrangement, an individual item being manipulated is generally lifted from both sides, rather than just from one side. Moreover, the curtain grippers 2062-2068 can be regularly spaced around the item being manipulated. For example, the spacing between adjacent ones of the curtain grippers 2112-2118 can be approximately constant.

Figure 20G:
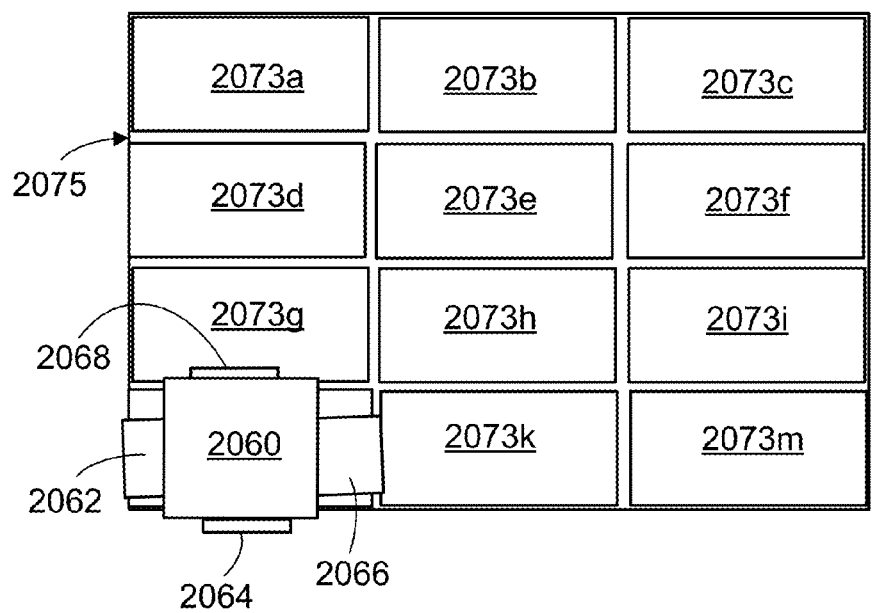
FIG. 20G illustrates a top view of a case of boxes, with one box being gripped by an example individual item gripper.

FIG. 20G illustrates a top view of a case 2075 of boxes 2073a-c, with one box being gripped by the example individual item gripper 2060. As shown in FIG. 20G, the individual curtain grippers 2062-2068 are narrow enough to be draped into the gaps between the adjacent boxes 2073 even while the case 2075 is fully loaded. Furthermore, the natural draping of the curtain grippers 2062-2068 results in some of the curtain grippers 2062-2068 at least partially adhering to a top surface of the box, rather than a sidewall thereof. In some cases, the curtain fingers may first attach themselves to the top of the box 2073 due to lack of space, but may then drape over the sidewalls after the box 2073 has been partially extracted from the case 2075, thus making the sidewalls now accessible to the curtain fingers.

Figure 20H:
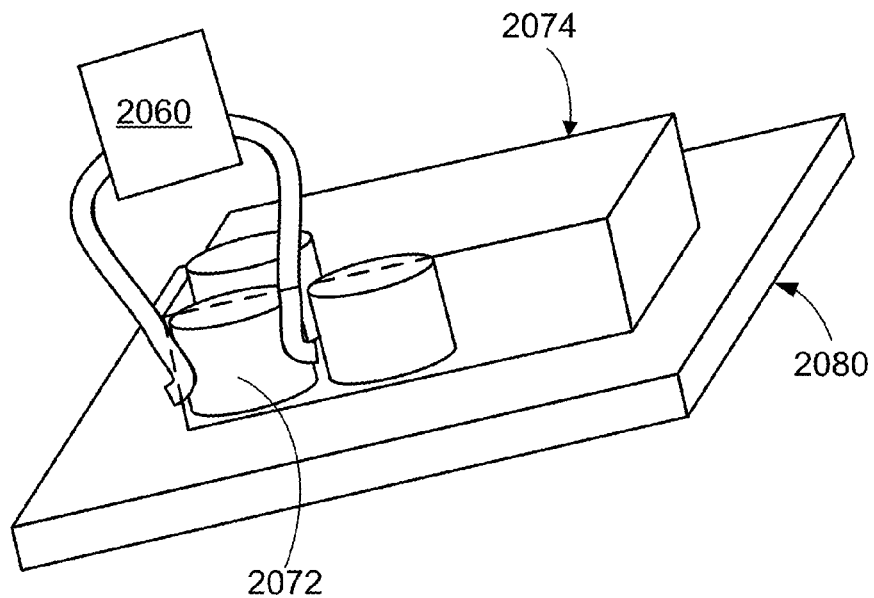
FIG. 20H illustrates an arrangement for unloading a case using a gripper by tilting the case toward one corner to force remaining items toward the corner.

FIG. 20H illustrates an arrangement for unloading a case 2074 using a gripper 2060 in a single position by tilting the case 2074 toward one corner to force remaining items 2072 to the corner to be unloaded. The case 2074 can be situated on a tilted surface 2080 such that one corner of the case 2074 is lower than the others. The item gripper 2060 can then repeatedly retrieve items 2072 from the lowest corner to unload the case 2074. As the items 2072 are removed, the tilt of the inclined surface 2080 causes another item nearby to slide down the gradient to shift into the lower corner position. As such, the tilted arrangement allows for unloading case 2074 while repeatedly retrieving items 2072 from a single location in the case 2074.

Figure 20I:
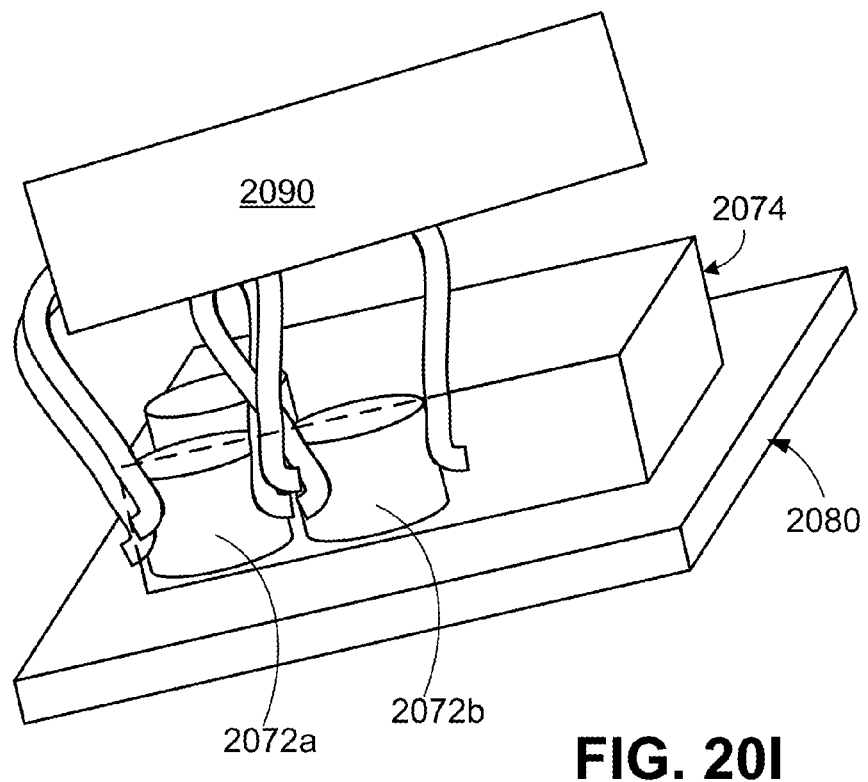
FIG. 20I illustrates a gripper equipped with multiple curtain grippers to adhere to multiple items simultaneously.

FIG. 20I illustrates a gripper 2090 equipped with multiple grippers to individual adhere to multiple items 2072a-b simultaneously. The gripper 2090 can be used to unload the case 2074 by grasping multiple ones of the items 2072 simultaneously. The gripper 2090 can retrieve multiple adjacent items that include the item in the lowest corner position of the case 2074, for example.

Similarly, the case 2074 may be loaded by repeatedly placing individual items (or groups of items) in a highest corner of the case 2074 while the case is inclined. Each item placed in the follows the gradient of the inclined surface 2080 to move away from highest corner to a respective location within the case. Repeatedly placing items 2072 in the highest corner position can thereby load a case in an automated manner.

VII. Example Electroadhesive Platform Gripper

Figure 21A:
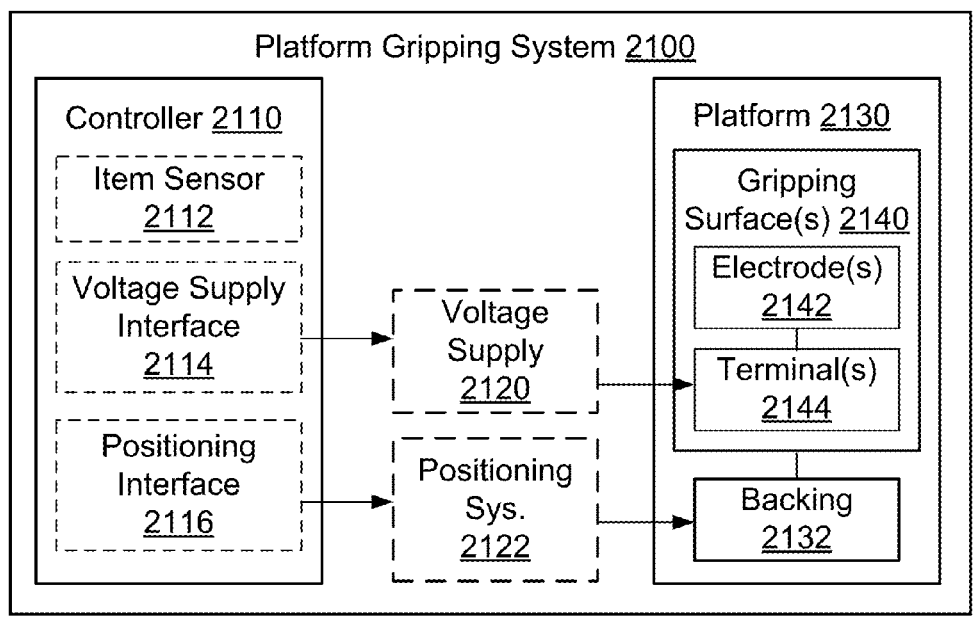
FIG. 21A is a functional block diagram of an example electroadhesive platform gripping system.

FIG. 21A is a functional block diagram of an example electroadhesive platform gripping system 2100. The platform gripping system includes a controller 2110, a voltage supply 2120, and at least one platform gripper 2130. The voltage supply 2120 can be configured to supply high DC voltages in a range of, for example, 0.5 kilovolt ("kV") to about 10 kV, similar to the electroadhesion voltages discussed above in connection with FIGS. 1-20. The platform gripper 2130 has a gripping surface 2140 with integrated electrodes 2142 connected to the voltage supply 2120 via respective terminals 2144. The electrodes 2142 can be patterned according to a variety of different geometries within the platform surface and are generally arranged such that opposing polarity electrodes are situated adjacent one another. The electrodes 2142 may be arranged with opposing polarity electrodes alternating one another (e.g., interdigitated electrodes), similar to the example electrode geometries described above in connection with FIGS. 1-20.

It is noted that the voltage supply 2120 may generally be a power supply configured to output AC or DC voltages or currents sufficient to apply a polarizing voltage to the electrodes 2142. For convenience in the description herein, the module 2120 is therefore referred to as "voltage supply," although some embodiments may employ current supplies and/or other electrical power supplies. For example, current supplies may be tuned to provide suitable currents for generate desired polarizing voltages at the electrodes.

The gripping surface 2140 of the platform gripper 2130 can be coupled to a backing 2132 or other support structure, which can be a rigid or semi-rigid structure used to distribute loads on the platform 2130 caused by items loaded thereon. The backing 2132 or other support structure can additionally or alternatively convey stress forces from such loads to a load-bearing structure such as a control arm, a lifting arm of a hoist, a track of a conveyor system, etc. The platform gripping surface 2140 may be connected to both the backing 2132 through a deformable layer (e.g., the deformable layer 2133 in FIG. 21D). For example, a deformable layer may be included in the backing 2132 or situated between the backing 2132 and the gripping surface 2140 to provide sufficient flexibility between the backing 2132 and the gripping surface 2140 to allow the gripping surface 2140 to at least partially wrap around (i.e., conform) to the exterior surface of items loaded on the surface 2140. Such a deformable layer may optionally be connected substantially continuously across the electroadhesive gripping surface 2140 and the backing 2132. In such an example, the platform surface 2140 can therefore be a conformable surface and the electrodes 2142 can be configured to provide sufficient flexibility to allow for the gripping surface 2130 to conform to exterior surfaces of any loaded items. In addition to facilitating conformal electroadhesion of the gripping surface 2140, the deformable layer can also distribute compressive forces caused by items loaded on the gripping surface 2140 to the backing 2132.

The backing 2132 can also optionally include an electrical insulating layer situated between the electrodes 2142 in the platform gripping surface 2140 and any conductive components in the backing 2132 (or related support structure), such as support members, etc. Such an insulating layer can thus provide an electrical buffer to prevent discharge of the electrodes 2142. The backing 2132 or support structure can also include (or be connected to) a positioning system 2122 configured to move the platform 2130 to a desired location. For example, the platform 2130 can be connected to, or be included in, a lifting arm of a mobile hoist (e.g., a forklift or pallet handler) or a horizontal platform attached to such a hoist. Such a positioning system 2122 can be used to transport ("convey") the platform 2130 from one place to another while the platform 2130 is loaded with one or more foreign objects, which may be electroadhesively attracted to the platform 2130 via the gripping surface 2140. The positioning system 2122 can thus be used to manipulate the platform 2130 in a variety of different ways so as to move items loaded on the manipulated platform 2130 to a desired location. In some examples, the positioning system 2122 may include one or more positioning motors (e.g., servo motors, stepper motors, and the like) for controlling the three-dimensional location of the platform 2130 (e.g., position in xyz coordinate space) and/or orientation (e.g., rotation angle and/or tilt angle).

The controller 2110 can include electronics and/or logic implemented as hardware and/or software modules to control operation of the platform gripping system 2100. For example, the controller 2110 can include a voltage supply interface 2114 for controlling the voltage supply 2120 whether to apply voltage to the electrodes 2142 of the gripping surface 2140. The voltage supply interface 2114 may be configured to operate a switch (or switches) connecting the output of the voltage supply 2120 to the terminals 2144 of the gripping surface 2140 (or perhaps switches within the voltage supply 2120). Moreover, the voltage supply interface 2114 may specify a magnitude of voltage to be applied to the electrodes 2142. The voltage supply interface 2114 may send instructions to the voltage supply 2120 to cause the voltage supply 2120 to adjust the magnitude of voltage output to the terminals 2144. Upon receiving instructions, the voltage supply 2120 can be configured to apply the specified voltage to conductive wires or lines connected to the terminals 2144. The applied voltage can be a DC voltage, which can provide opposing polarity on the electrodes 2142 in the gripping surface 2140 and thereby cause the gripping surface 2140 to induce corresponding polarization in a foreign object loaded on the gripping surface 2140. The polarized electrodes 2142 and corresponding induced polarization of the loaded object results in an electroadhesive attraction between the gripping surface 2140 and the foreign object. Using the voltage supply interface 2114 to cause the voltage supply 2120 to apply voltage to the terminals 2144 can thus be considered turning on the electroadhesive platform gripping system 2100. Similarly, causing the voltage to cease being applied to the terminals 2144 (e.g., by turning off or disconnecting the voltage supply 2120, or reducing the magnitude of the applied voltage, etc.) can be considered turning off the electroadhesive platform gripping system 2100.

The controller 2110 may also include a positioning interface 2116 configured to control the position of the platform 2130 via instructions to the positioning system 2122. For example, the controller 2110 can instruct one or more position motors (e.g., servo motors or the like) in the positioning system 2122 to adjust the position of the backing 2132 and/or related support structure. The backing 2132 is coupled to the gripping surface 2140, so the positioning interface 2116 can be used to control the location and/or orientation of the platform 2130.

The controller 2110 may also include an item sensor 2112. The item sensor 2112 can include one or more sensors and/or detectors configured to output data indicative of a loading condition of the platform 2130. For example, the item sensor 2112 may detect whether any foreign objects are loaded on the platform 2130 by detecting changes in weight, capacitance, opacity, thermal strain, etc. The item sensor 2112 can then output data indicating that an item is detected, and the receive indication can be used by the controller 2110 to determine instructions to send to the voltage supply 2120 and/or positioning system 2122. For example, the controller 2110 can determine a voltage to be applied to the electrodes 2142 (and/or whether to apply such a voltage) based on indication(s) from the item sensor 2112.

The item sensor 2112 may additionally or alternatively recognize an identifying and/or characterizing feature of any items loaded on the platform 2130, and output information indicative of the identifying feature. For example, the item sensor 2112 may include a scanner for recognizing images and/or characters appearing on particular items, such as barcode patterns, serial numbers, etc. The item sensor 2112 may also include a scanner for recognizing characteristic radiation signatures, such as a characteristic response signal from a radio frequency identification chip (RFID). Moreover, the item sensor 2112 may include an image capture and recognition system configured to recognize and/or characterize items on the basis of pattern recognition using one or more images of such items. Additionally or alternatively, identifying systems may include (or communicate with), for example, vision systems configured to capture images of items and recognize symbols, characters, patterns (e.g., barcodes, QR codes, and the like) on such items, shape, reflectivity, dimensions, and/or color of the items; receiver systems configured to receive wireless signatures of such items (e.g., RFID signals and the like); infrared imaging systems, ultrasound scanning systems, and other systems configured to detect identifying information about items to be sorted and characterize the items accordingly. Electroadhesion can then be selectively applied to such items on the basis of such identification/characterization to effect sorting on the basis of the item-identifying information.

Upon identifying and/or characterizing a particular item loaded on the platform 2130 using data output from the item sensor 2112, the controller 2110 can then use such item-information to determine instructions to send to one or both of the voltage supply 2120 and/or positioning system 2122. For example, the controller 2110 may tune the voltage applied by the voltage supply 2120 to a magnitude suitable for a material property of a loaded item (e.g., composition, etc.). Furthermore, the controller 2110 may instruct the positioning system 2122 to convey the platform 2130 (and thus the item adhered thereto) to a particular delivery location based on item-identifying information (e.g., for a package sorting process, etc.).

Figure 21B:
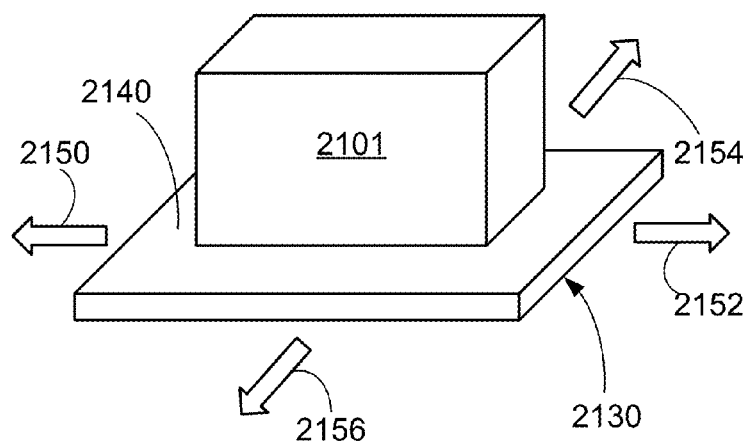
FIG. 21B is a simplified diagram of an example embodiment of the platform gripping system.

FIG. 21B is a simplified diagram of an example embodiment of the platform gripping system 2100. The platform 2130 is loaded with a box-shaped item 2101 resting on its gripping surface 2140. The platform 2130 can be oriented substantially horizontally such that the item 2101 is urged toward the platform 2130 by gravity. During translation of the platform 2130, however, the platform 2130 can be accelerated in one or more directions along the plane of the gripping surface 2140, as indicated by the motion indicator arrows 2150-2156. During acceleration along the plane of the gripping surface 2140, the item 2101 may slide along the gripping surface, in a direction opposite the direction of acceleration of the platform 2130. Absent any electroadhesive attraction, the extent of such slippage (or other relative motion), if any, depends on the friction force between the bottom surface of the item 2101 and the gripping surface 2140. When the platform 2130 is turned on, the resulting electroadhesive attraction between the item 2101 and the gripping surface 2130 supplements the friction force to resist slippage. The electroadhesive platform 2130 can be used to electroadhesively attract the item 2101 to the gripping surface 2140 during acceleration of the platform 2130. The local attraction between the bottom of the item 2101 and the gripping surface 2140 can thus supplement the force of friction to urge the item to resist sliding (or otherwise being displaced from it starting position) during acceleration of the platform 2130. Moreover, the electroadhesive attraction between the item 2101 and the platform 2130 can be used to urge the item 2101 to resist slipping and/or lifting away from the gripping surface 2140 during vertical acceleration of the platform 2130 (e.g., accelerating along a normal direction of the gripping surface 2140). In some embodiments, the platform gripping surface 2140 may not be a continuous surface, but may have cutouts in it, similar to the prongs of a forklift commonly used in material handling or another mobile hoist with one or more prongs or lifting arms. Some examples may include mobile hoists with two lifting arms (as on a forklift) although some examples may include more than two lifting arms.

The controller 2110 (not visible in FIG. 21B) causes the electrodes 2142 in the gripping surface 2140 to be polarized by the power supply 2120. Opposing polarity voltages can be applied to the electrodes 2142 sufficient to induce a complementary local electrical polarization on the bottom surface of the box-shaped item 2101. While the voltage is applied to the electrodes 2142, the platform gripper 2130 can then be used to lift, move, position, place, or otherwise manipulate the item 2101. Once moved/positioned to a desired location, the item 2101 can then be released from the gripping surface 2140 by reducing the voltage applied to the electrodes 2142 (e.g., turning the voltage off). For example, the controller 2110 can turn electroadhesion on during acceleration of the platform 2130 such that the item 2101 is attracted to the gripping surface 2140 while the platform 2130 accelerates (e.g., via manipulation by the positioning system 2122). Similarly, the controller 2110 may turn electroadhesion off such that the item 2101 slides (or otherwise moves) from the gripping surface 2140 to land at a predetermined delivery location.

As a result of the attraction, the item 2101 resists moving (e.g., sliding, tumbling, rolling, etc.) with respect to the platform 2130. Thus, while the platform 2130 is in motion, the item 2101 can substantially track a path of motion of the platform 2130. Moreover, even while the platform 2130 is not moving (i.e., static), the electroadhesive attraction can cause the item 2101 to resist moving relative to the platform 2130. In some examples, the platform 2130 may be inclined such that gravitational forces on the item 2101 urge the item to slide, tumble, or otherwise move with respect to the surface of the platform 2130. The electroadhesive attraction may therefore overcome inertial, centrifugal, and/or gravitational forces (or torques) on the item 2101 to cause the item to remain substantially secured to the platform 2130 even in the presence of external forces. Further still, the platform 2130 may operate to slow and substantially secure the item 2101 after the item 2101 is received with some inertia, relative to the inertial reference frame of the platform 2130. In general then, the platform 2130 can operate to electroadhesively adhere to the item 2101 such that the item 2101 substantially tracks ("follows") the inertial reference frame of the platform 2130, which may be in motion or not. The electroadhesive attraction may thus cause the item 2101 to depart from an initial inertial path and/or overcome one or more forces (including torques) acting on the item 2101 to urge the item 2101 to slide, tumble, roll, or otherwise move with respect to the platform 2130.

The platform 2130 can additionally or alternatively operate to allow the item 2101 to detach from the platform 2130 by reducing the electroadhesive attraction (e.g., turning off the electroadhesion). Upon deactivation of the electroadhesive attraction, the item 2101 may move in accordance with such other forces acting on it to, for example, move relative to the platform 2130 (e.g., by sliding, tumbling, rolling, etc.). For example, upon deactivation (or reduction) of the electroadhesive attraction, the item 2101 may move along a path defined by gravity, inertia, and/or other external forces. In the absence of the electroadhesive attraction (e.g., in response to a reduction of such attraction), the item 2101 can detach from the platform 2130 so as to move along a trajectory defined in part the item's inertia and/or external forces such as gravity, etc. The item 2101 can thus depart from the platform 2130 and be delivered to a designated delivery area.

Figure 21C:
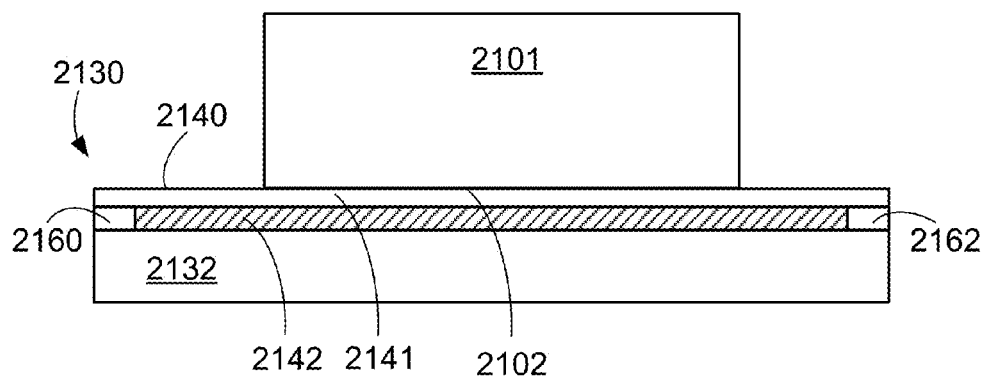
FIG. 21C is a side cross-section view of the example electroadhesive platform.

FIG. 21C is a side cross-section view of the example electroadhesive platform 2130. The backing 2132 can be a rigid or semi-rigid structure that receives the load of the item 2101 loaded on the gripping surface 2140. The backing 2132 can convey and/or distribute the force of such load to a related support structure, such as a control arm, a lifting arm of a mobile hoist, a surface of a conveyor system, etc. The backing 2132 may include non-conductive materials in order to prevent electrical discharge of the electrodes 2142. Additionally or alternatively any conductive materials in the backing 2132 and/or related support structure, such as metallic support members, etc., can be separated from the electrodes 2142 with an insulating layer disposed between the two. Furthermore, the electrodes 2142 can be covered by a coating layer 2141 that forms the outer surface of the gripping surface 2140. The coating layer can be an insulating material that both protects the electrodes 2142 from mechanical disruption and prevents incidental discharge of the electrodes 2142 (e.g., due to conductive materials placed on the gripping surface 2140). Similarly, the outer side edges of the platform 2130 can include insulating materials 2160, 2162 to electrically insulate the conductive electrodes 2142 from incidental discharge and/or damage. When the item 2101 is loaded on the platform 2130 its bottom surface 2102 contacts the coating layer 2141 defining the gripping surface 2140. Polarization of the embedded electrodes 2142 induces a corresponding local polarization of the box-shaped item 2101 along its bottom surface 2102, and the item 2101 is thereby attracted to the platform 2130.

Figure 21D:
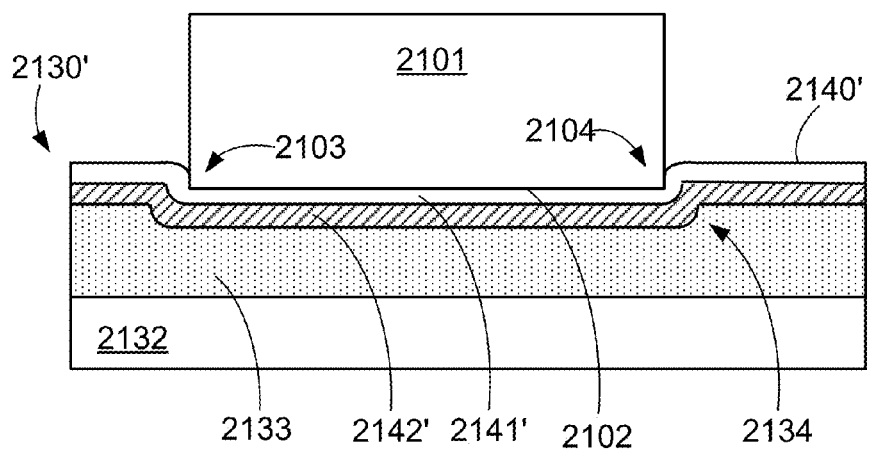
FIG. 21D is a side cross-section view of another electroadhesive platform gripper that includes a conformable electroadhesive surface.

FIG. 21D is a side cross-section view of another electroadhesive platform gripper 2130' that includes a conformable electroadhesive surface 2140'. The platform gripper 2130' includes a deformable layer 2133 disposed between the backing 2132 (or related support structure) and the conformable electroadhesive surface 2140'. The deformable layer 2133 can be formed of an encapsulated gel material, a deformable polymeric material, or another material deformable material. Flexible electrodes 2142' and a flexible outer coating 2141' can then be coupled to the deformable layer to create the flexible gripping surface 2140'. The flexible electrodes 2142' may be formed of a flexible conductive material disposed on or within a suitable substrate, for example. The deformable layer 2133 is configured to at least partially deform upon the item 2101 being loaded on the conformable platform 2130', such that the conformable gripping surface 2140' at least partially wraps around (i.e., conforms) to the exterior surface 2102 of item 2101. For example, as shown in FIG. 21B, the deformable layer 2133 can indent (2134) to absorb corresponding ridges, corners, etc. (e.g., the corners 2103, 2104) in the bottom surface 2102 of the item 2101. The deformation of the deformable layer 2133 allow the flexible gripping surface 2140' disposed thereon to conform to the surface features of the bottom surface 2102 (e.g., to at least partially wrap around the corners 2103, 2104). The conformable gripping surface 2140' can thus provide a greater amount of surface area contact with the bottom surface 2102 than can be achieved by a rigid planar electroadhesive gripping surface (e.g., the gripping surface 2140 in FIG. 21C). Additionally or alternatively, the deformable layer 2133 can also distribute compressive forces from the gripping surface 2140' to the backing 2132. For example, the deformable layer 2133 can distribute the downward force of items resting on a particular location of the gripping surface 2140' to a relatively greater area of the backing 2132.

Figure 21E:
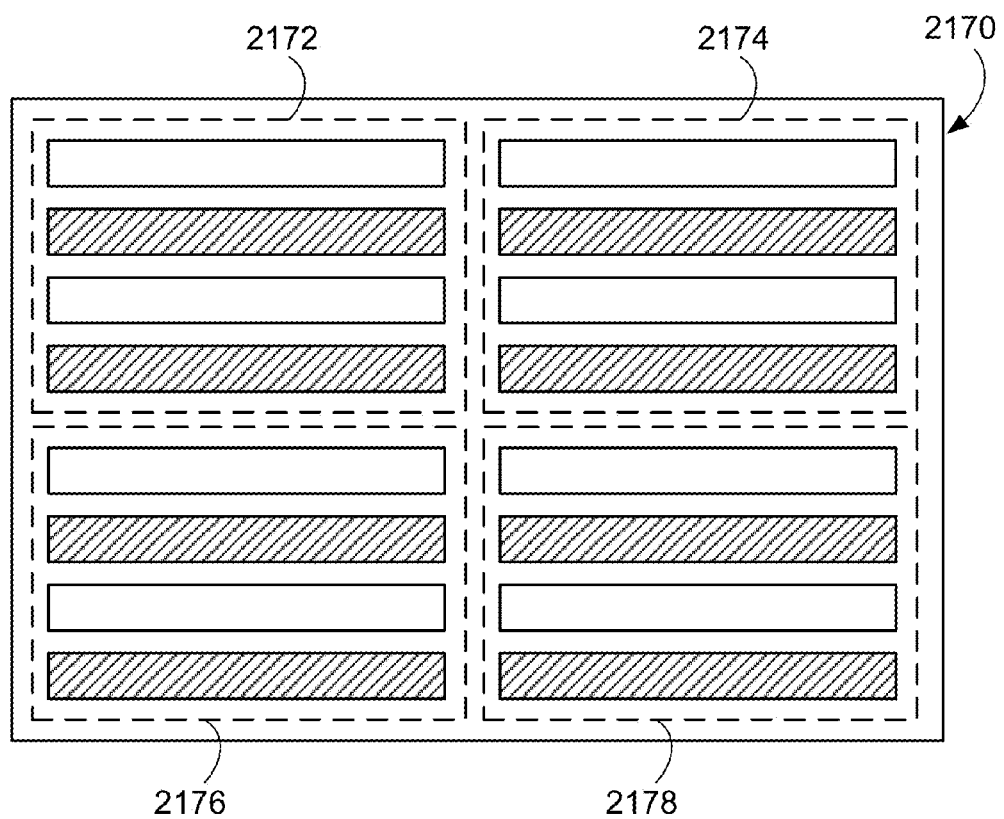
FIG. 21E is a top view of an electroadhesive platform gripper with separately addressable regions.

FIG. 21E is a top view of an electroadhesive platform gripper 2170 with separately addressable subsections 2172-2178. The gripping surface of the platform gripper 2170 is divided into distinct, non-overlapping areas or subsections. Each subsection includes a set of electrodes configured to be charged with opposite polarity voltages to induce an electroadhesive response in an object loaded on the platform 2170. For convenience in the description and illustration of the opposite polarity electrodes in FIG. 21E, electrodes configured to receive a positive voltage from the voltage supply (e.g., positive polarity electrodes) are illustrated with a hatch pattern. Electrodes configured to receive a corresponding negative voltage from the voltage supply (e.g., negative polarity electrodes) are illustrated without a hatch pattern to make the pattern of alternating polarity electrodes readily apparent. As shown in FIG. 21E, each of the subsection can include alternating opposite polarity electrodes. The alternating polarity electrodes in each subsection can optionally be interdigitated, although a variety of electrode geometries may be used.

Each of the subsections 2172-2178 can have a pair of separate terminals to connect the respect electrodes in the subsection to the voltage supply. The connection to each subsection-specific set of terminals can then be separately controlled to allow the various subsections to be controlled separately. For example, the two subsections shown on the left-hand side of the platform 2170 (e.g., the subsections 2172, 2176) can be turned on while the remaining subsections 2174, 2178 can be turned off. Moreover, the controller and/or voltage supply can provide apply different polarizing voltages to different subsections. For example, subsection 2172 may receive a 6 kV voltage while subsection 2174 may receive a 2 kV voltage. Moreover, which subsection(s) to turn on, if any, and/or the magnitude of voltage(s) to apply can be determined dynamically based at least in part on sensor data (e.g., from the item sensor 2112). For example, voltage may be selectively applied to those subsection(s) loaded with items as indicated by weight measurements, opacity measurements, surface capacitance, thermistor-based strain slip sensor, etc. Further still, the amount of voltage to apply to each subsection can be determined in part based on an indication of the type of objects loaded on the platform 2170. For example, one voltage may be applied for an object with a cardboard exterior, while another is applied for a shrink wrap encased object.

By separately addressing different polarizing voltages to different subsections of the electroadhesive platform 2170, the platform 2170 can be operated with relatively greater energy efficiency than non-addressable platforms. In some examples, the separately addressable platform 2170 only applies voltage to those regions of the platform 2170 loaded with items, and thereby conserves power with respect to the unpowered subsections.

In an example, the platform 2130 may be segmented into multiple lifting arms used by a mobile robot for handling packages, such as cardboard boxes, pallets, etc. in a warehouse environment. In such an example, the multiple lifting arms can be inserted into corresponding channels in warehouse shelving. As such, the dimensions and/or spacing between adjacent ones of the lifting arms may be selected to accommodate particular shelving configurations.

VIII. Manipulating Items on Warehouse Shelving

Some embodiments of the present disclosure provide for systems that combine vertical grippers to manipulate cases on/off of warehouse shelving with individual item grippers to load/unload individual items from such cases. An integrated system may allow mobile robots operating in warehouse environments to programmatically retrieve individual items from cases loaded on shelves, such as may be done to fulfill orders in warehouse retail environments, for example.

8a) Example Loader

Figure 22:
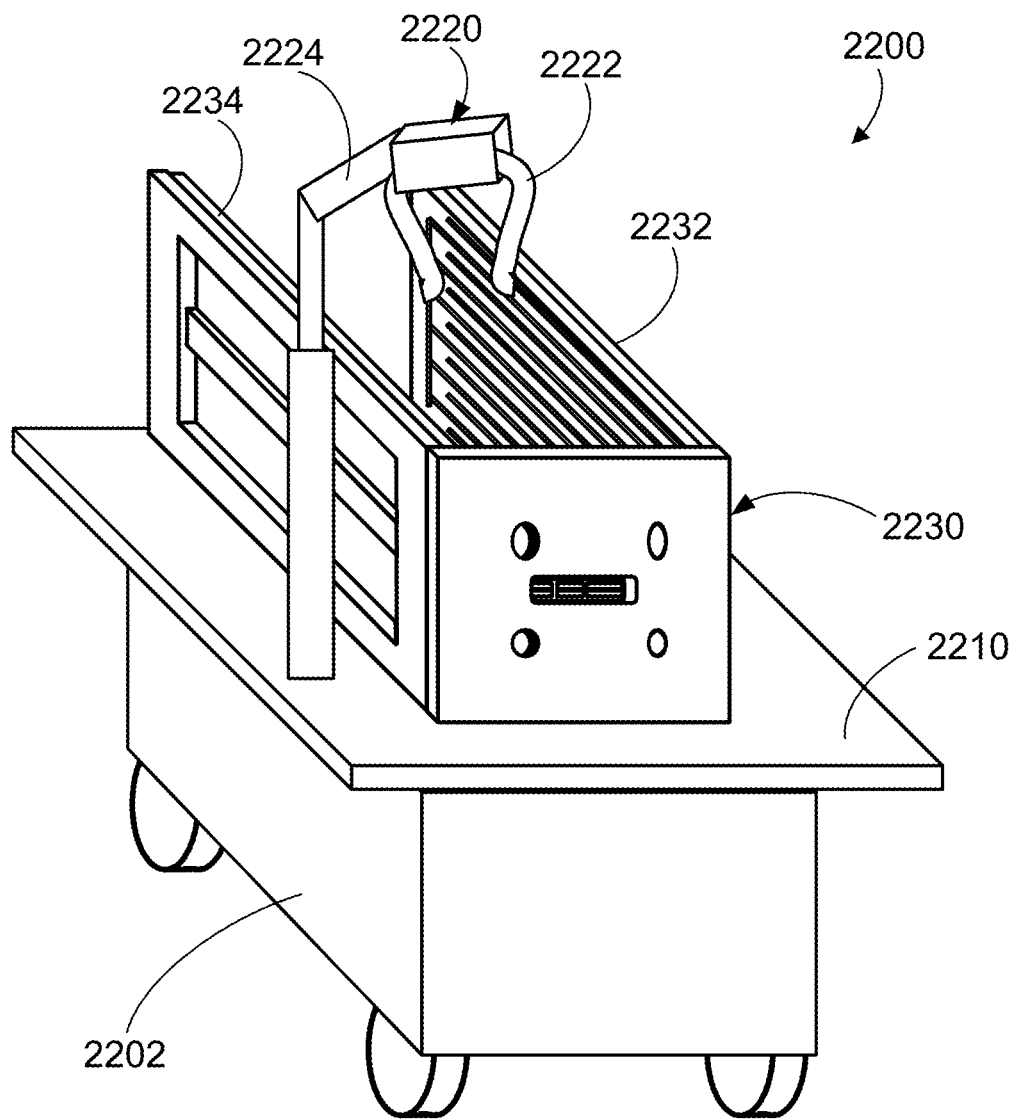
FIG. 22 illustrates an example loader configured to manipulate a case or a box of items off and on of warehouse shelving and pick individual items from that case or box to and from a horizontal platform.

FIG. 22 illustrates an example loader 2200 configured to manipulate items off and on of warehouse shelving to and from a horizontal platform 2210. The loader 2200 can include a shear gripping system 2230 with a pair of electroadhesive vertical blades 2232, 2234 situated on the platform 2210. The vertical blade grippers 2232, 2234 can each include electroadhesive surfaces with embedded electrodes configured to induce an electroadhesive attraction with a foreign object, and, opposite the electroadhesive surfaces, a load-bearing structure or backing configured to distribute and/or convey shear forces imparted by the electroadhesive gripping surfaces to load bearing components in the loader 2200. The shear gripping system 2230 can be similar to the shear gripping systems described above in connection with FIGS. 13-16, for example. The electroadhesive gripping surfaces of the vertical blade grippers 2232, 2234 are arranged to face toward one another such that items disposed between the two are attracted to both while the electrodes in each are polarized with an appropriate voltage. The vertical blades 2232, 2234 can be configured to move back and forth on and off the horizontal platform 2210 to retrieve/place items on horizontal shelving, as discussed further below in connection with FIGS. 23A-23C.

The loader 2200 can also include an individual item gripper 2220 mounted to a control arm 2224. The control arm 2224 may include one or more adjustable axes and/or telescoping components configure to move the item gripper 2220 around the horizontal platform 2210 to selectively grasp and manipulate particular objects located thereon. One or more flexible electroadhesive grippers 2222 are mounted to suspend from the individual item gripper 2220. The individual item gripper 2220 can be similar to the individual item grippers described above in connection with FIG. 20, for example.

In some examples, the platform 2210 may be an electroadhesive platform. When so equipped, the electroadhesive platform 2210 can be used to secure items disposed on the horizontal platform 2210 of the loader 2200. For example, the electroadhesive platform 2210 can be activated to electroadhesively secure items disposed thereon during transport of such items via movement of the loader 2200. The platform gripper 2210 can be similar to the platform gripping systems described above in connection with FIG. 21, for example. The electroadhesive platform 2210 can be configured to cause items disposed thereon to track a path of motion of the loader 2200 (e.g., by causing the items to resist moving with respect to the platform 2210) while electroadhesion is activated. Additionally or alternatively, the platform can be configured to cause items to move with respect to the platform 2210 by deactivating (or reducing) the electroadhesive attraction.

The loader 2200 may include any combination of one or more electroadhesive shear grippers, electroadhesive platform grippers, and/or electroadhesive individual item grippers. For example, the loader 2200 may be implemented with a shear gripping system and an individual item gripper, but without a horizontal gripping platform (i.e., a non-electroadhesive loading surface may be used). In another example, the loader 2200 may be implemented with a shear gripping system and a horizontal platform, but without an individual item gripper. Other variations and/or combinations are also possible.

The loader 2200 can be a mobile platform, such as may be employed in a warehouse environment to programmatically retrieve items from warehouse shelving. For example, the horizontal platform 2210 can be mounted to a chassis 2202, and the chassis 2202 may be configured to move about a warehouse environment (e.g., via wheels or another transport system). In addition, the chassis 2202 may include telescoping and/or extending components, such as scissor jacks, hydraulically or electrically operated lifts, forklifts, etc., to cause the horizontal platform 2210 to elevate to a desired height (e.g., to retrieve objects from elevated shelves).

8b) Example Loading/Unloading Operation

Figure 23A:
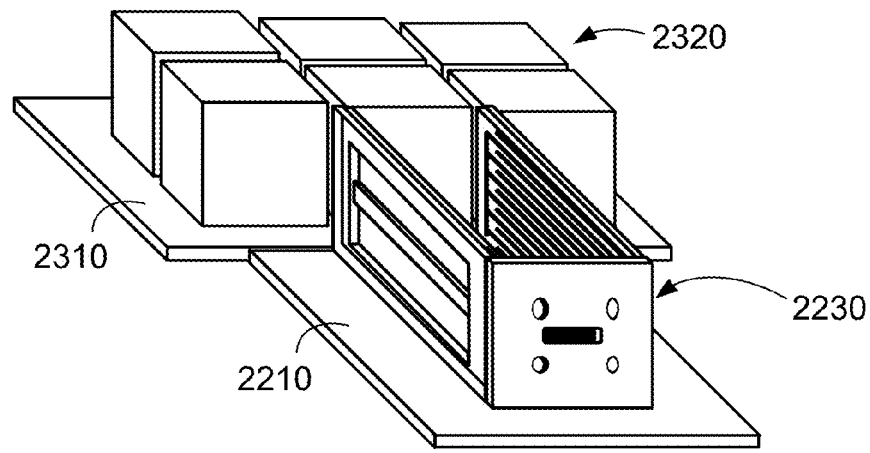
FIG. 23A illustrates the example loader of FIG. 22 in position with the horizontal platform approximately coplanar with the shelf.

FIG. 23A illustrates the example loader 2200 of FIG. 22 in position with the horizontal platform 2210 approximately coplanar with a shelf 2310. The shelf 2310 is loaded with a plurality of items 2320, which may be boxes or other objects. The items 2320 can be stacked two deep, as shown in FIG. 23. In other arrangements, it can be stacked only one deep of 3 deep or 4 deep or in any other configurations. The loader 2200 aligns the shear gripping system 2230 with the two blade grippers 2232, 2234 positioned on either side of one of the columns of boxes. That is, the blade grippers 2232, 2234 can each be aligned to be approximately co-planar with the sidewalls of the two boxes in the middle column of the group 2320.

Figure 23B:
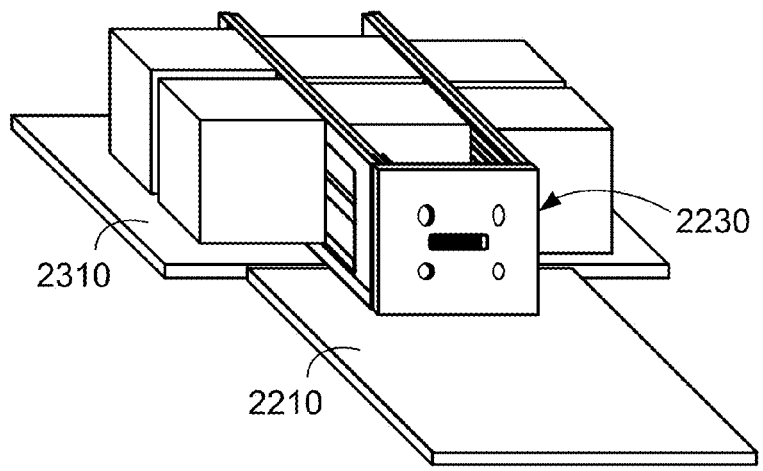
FIG. 23B illustrates the example loader of FIG. 22 with the pair of vertical blade grippers extended to each be proximate the sidewalls of the items being manipulated.

FIG. 23B illustrates the example loader 2200 of FIG. 22 with the pair of vertical blade grippers 2232, 2234 extended to each be proximate the sidewalls of the items being manipulated. The blade grippers 2232, 2234 are moved forward to extend off of the platform 2210 and onto the shelf 2310. In some examples, the platform 2210 may include a track integrated therein to move the shear gripping system 2320 across the platform 2210. In some examples, the gripping system 2320 can include telescoping and/or retractable components to allow the length of the blade grippers 2232, 2234 to extend on and off of the shelf 2310 from the platform 2210.

Figure 23C:
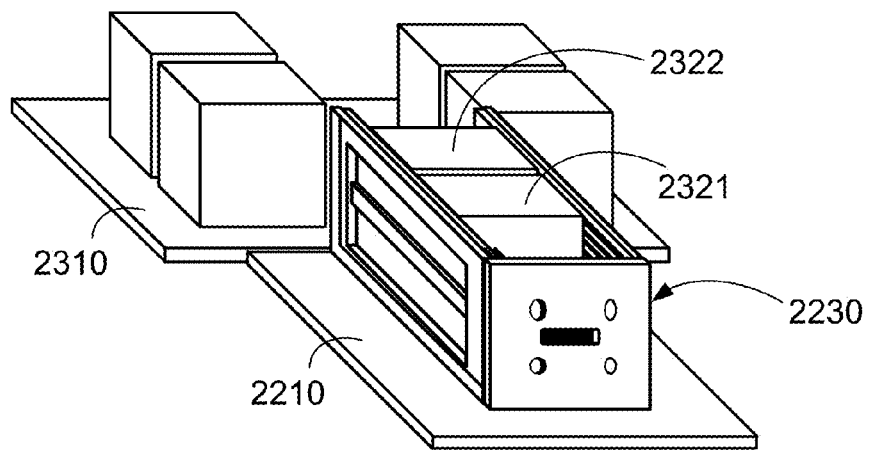
FIG. 23C illustrates the example loader of FIG. 22 retracting to convey the items previously on the shelf back to the horizontal platform if both items are commanded to be grasped.

FIG. 23C illustrates the example loader 2200 of FIG. 22 retracting back to the horizontal platform 2210 to thereby convey the items 2321, 2322 previously on the shelf 2310 to the horizontal platform 2210. In this case, the vertical grippers may have addressable electrode regions, which may be all engaged to grasp both boxes together, but in other case only one of the 2 boxes can be selectively grasped.

It is noted that the vertical blade gripping system 2230 on the loader 2200 can operate to retrieve cases from the shelf 2310 entirely by imparting shear forces on the sidewalls of the cases 2321, 2322 to slide on/off the shelf 2310. In particular, the cases 2321-2322 may be urged on/off the shelf 2310 without making any contact with the bottoms of the respective cases 2321-2322. As a result, the vertical blade gripping system 2230 can operate to retrieve and replace cases to/from flat horizontal surfaces, including standard flat shelves. This is contrast to fork-type or rake-type conveyor systems that insert lifting arms into channels in shelving in order to lift items from underneath and then pull them outward. The vertical blade gripping system 2230 can therefore operate to automatically retrieve/replace cases to/from shelves in a warehouse environment without demanding special shelving requirements.

Furthermore, because the system 2230 can manipulate cases on the shelves by dragging/sliding the cases along the shelf surface, the blade gripping system 2230 requires relatively little vertical headroom required above the cases 2320 (e.g., between the next highest shelf) for the cases 2321, 2322 to be successfully retrieved/replaced. By contrast, systems using lifting arms to lift and then move items on shelves typically require a minimum space between the tallest item on a given shelf and the next highest shelf. The vertical blade gripping system therefore provides great shelf density, greater versatility, and greater efficiency than retrieval systems employing lifting arms inserted into channels integrated in the shelving.

8c) Warehouse Handling

Figure 24B:
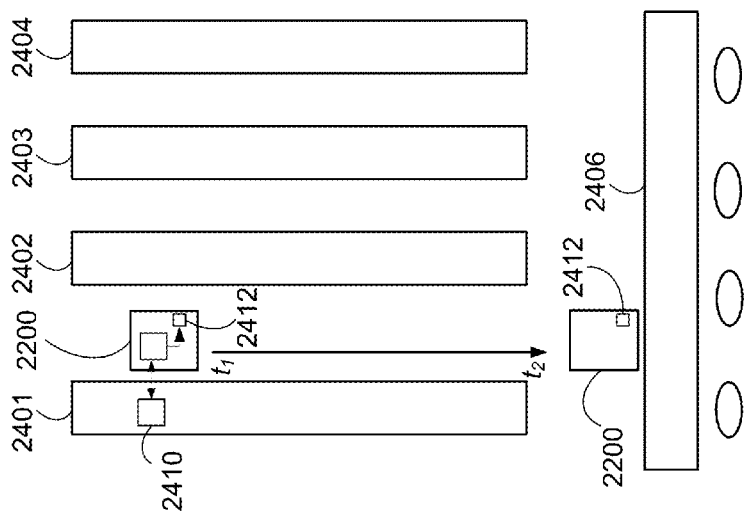
FIG. 24B is a plan of a warehouse environment that operates by a loader retrieving individual items from cases and providing the particular item to a shipping station without making a return trip to return the case to the shelf.
Figure 24A:
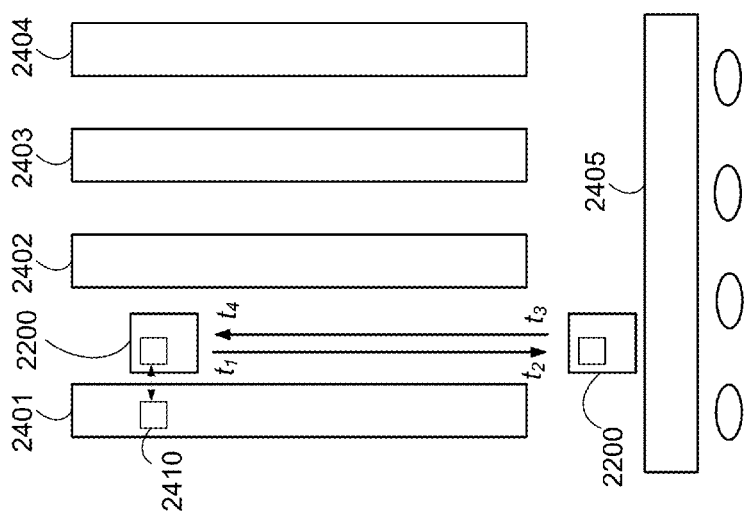
FIG. 24A is a plan of a warehouse environment that operates by a loader retrieving cases from shelving and providing retrieved cases at a pick station where individual items are retrieved from the cases, then the cases are returned to the shelving.

FIG. 24A is a plan of a warehouse environment that operates by a loader 2200 retrieving cases 2410 from shelving and providing retrieved cases at a pick station 2405 where individual items are retrieved from the cases, then the cases are returned to the shelving. The warehouse environment includes multiple rows of parallel shelves 2401, 2402, 2403, 2404 separated by aisles to allow passage of the loader 2200. The loader 2200 can operate automatically to retrieve items in the warehouse. For example, the loader 2200 can move to a location within a warehouse associated with a particular item, such as a location specified by aisle number, shelf number, lot number, etc. Once in position, the loader can deploy its vertical blade grippers to retrieve a specified case 2410 from the shelf 2401 and transfer the case 2410 to the horizontal platform of the loader 2200.

In a retail fulfillment warehouse, boxes/cases on the shelves may hold a predetermined number of individually sold items (e.g., depending on the manufacturer, shipper, and/or packager of particular items). To retrieve individual items from the cases, the warehouse can first send the loader 2200 to automatically retrieve the particular case 2410 holding the order-specified item, at time $t_1$. The case 2410 is then conveyed by the loader 2200 to the pick station 2405, at time $t_2$. The individual order-specified item is then retrieved at the pick station (e.g., by a human operator) and the case 2410 is sent back to the shelving, at time $t_3$. The case 2410 is then conveyed back to its location on the shelf 2401 and loaded thereon by the loader 2200, at time $t_4$.

FIG. 24B is a plan of a warehouse environment that operates by the loader 2200 retrieving individual items from cases and providing the particular item to a shipping station 2406 without making a return trip to return the case 2410. In contrast the environment depicted in FIG. 24A, the loader 2200 only makes one trip to a particular shelf 2401 in connection with fulfilling a particular order's requirements. As in FIG. 22, the loader 2200 employed in FIG. 24B can be equipped with an individual item gripper 2220 mounted on a control arm 2224. The loader 2200 can be configured to automatically retrieve a particular item from the case 2410 and place such item in a hopper or bin for the loader 2200 associated with a particular order. Thus, upon receiving a request for a particular item, the loader 2200 can move to a predetermined location within the warehouse associated with the item, retrieve the case 2410 from the shelf (e.g., using the extendable blade gripping system 2230 to drag the case 2410 onto a platform 2210 of the loader 2200). Upon retrieval of the case 2410, a single item 2412 can be removed from the case 2410 (e.g., using the item gripping system 2220 mounted on a control arm). To facilitate access to the item(s) 2412 within the case 2410, the warehouse environment shown in FIG. 24B may open each case received at the warehouse before loading the cases on the shelves 2401-2404. The individual item 2412 can then be situated in a designated area for the particular order. For example, the item gripper 2220 can move the item 2412 to a hopper, basket, etc., and release the item 2412 such that it lands in the designated area. The case 2410 can then be replaced on the shelf 2401 by the loader 2200. The retrieval of the case 2410, removal of the individual item 2412, and replacement of the case 2410 can all be carried out by the loader 2200 automatically and within the aisle of the warehouse, at time $t_1$. The loader 2200 can then transport the order-specified item 2412 to the order fulfillment station 2406, at time $t_2$.

The operation scheme shown in FIG. 24B is more efficient than the operation scheme provided by FIG. 24A both because it is less labor intensive for the case picking step, and because less trips are made by the loader 2200 back and forth throughout the warehouse. Moreover, because the loader 2200 does not transport full cases it operates more efficiently. Further still, because the loader 2200 only returns the particular items to full a particular order, it may have enough capacity to retrieve items for multiple orders and return a batch of such items to the order fulfillment station 2406 all at once.

IX. Item Sorting Applications

Example systems include systems and methods of operation therefore for sorting items secured within containers by electroadhesion. Reducing (or turning off) the electroadhesion causes the items to drop out of the containers. Some systems disclosed herein may provide for identifying or characterizing items loaded in electroadhesively secured containers. Based on the identification and/or characterization, a delivery area associated with the identifying information can be determined. The containers can then be moved with respect to a set of delivery areas and the items can be selectively released from the electroadhesively secured containers so as to drop into the item-specific delivery areas determined for each item. For example, electroadhesion can be reduced (or even turned off) for particular containers as they pass over particular delivery areas to allow the contents within to drop out and land within the delivery area. The system can thus be used to sort a set of packages or other items into a series of delivery areas based on identifying information associated with each item. Such systems may find application in handling and sorting luggage, parcels, mail, and other items.

9a) Open Bottom Containers with Electroadhesive Closures

Figure 25A:
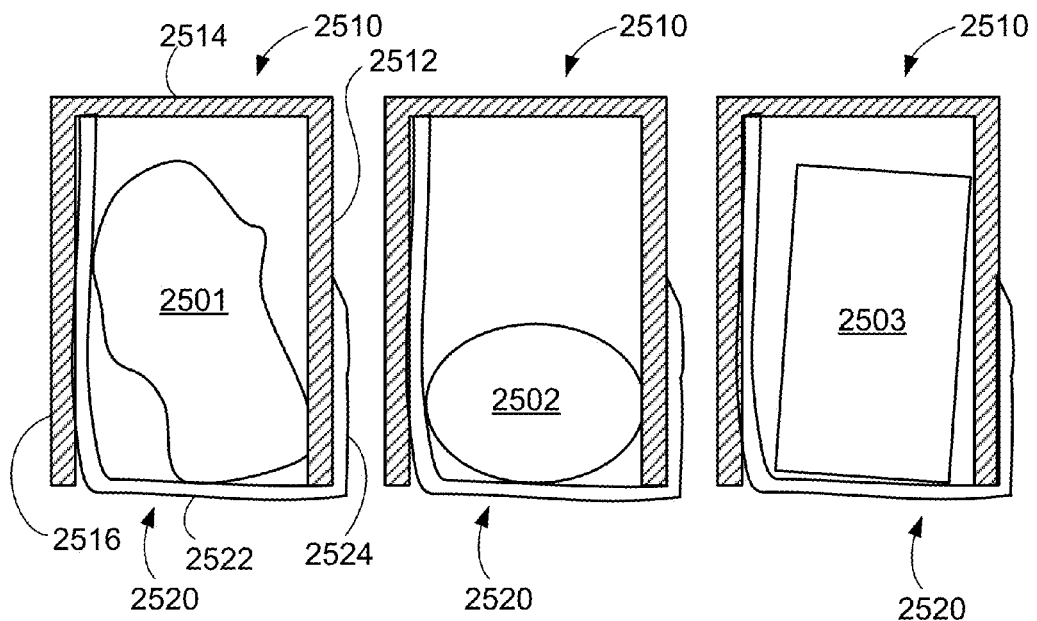
FIG. 25A is a side view of a set of open bottom containers each holding an individual item with an electroadhesive membrane adhered to an outer side of the respective containers.

FIG. 25A is a side view of a set of open bottom containers 2510 each holding an individual item 2501-2503 with an electroadhesive membrane 2520 adhered to an outer side of the respective containers. The container 2510 can include a top 2514 and side walls 2512, 2516. The container 2510 can be open on the bottom except for the membrane 2520. The membrane 2520 can be connected, on one side, to the top 2514 or sidewall 2516 of the container 2510. The membrane 2520 includes enough material to cover the bottom 2522 of the container 2510 and a flap 2524 that overlaps the sidewall 2512 to thereby enclose the item 2501 in the container 2510. The membrane 2520 can include an electroadhesive gripping surface at least in the overlapping flap 2524 that interfaces with the sidewall 2524. Applying an appropriate polarizing voltage to a pattern of electrodes embedded in the overlapping portion 2524 causes the flap 2524 to be attracted to the sidewall 2512. The attraction between the flap 2524 and the sidewall 2512 can thus secure the membrane 2520 with sufficient force that the bottom portion 2522 is able to bear the weight of the item 2501. Thus, while electroadhesion is activated, the item 2501 (and the items 2502, 2503) is electroadhesively secured within the open bottom containers 2510.

Alternatively, the membrane 2520 may not be electroadhesive. Instead, the sidewall 2512 can include an electroadhesive gripping surface that adheres to the overlapping portion 2524 of the membrane 2520. In such an example, the overlapping flap 2524 of the membrane 2520 can include (or be coated with) a conductive material to facilitate electroadhesion and enhance the gripping force of such electroadhesion.

Figure 25B:
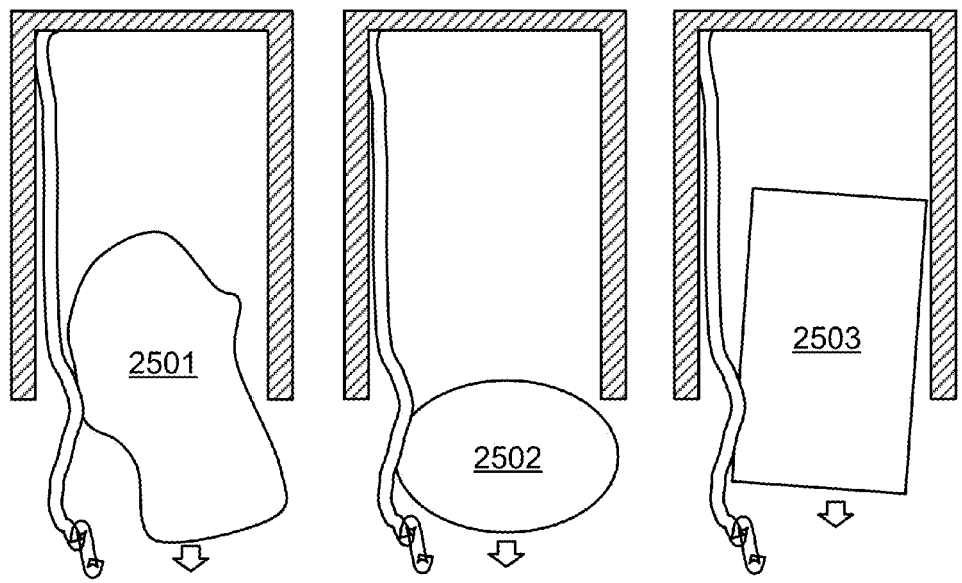
FIG. 25B is a side view of the open bottom containers shown in FIG. 25A, with the electroadhesive closures in a released position.

FIG. 25B is a side view of the open bottom containers 2510 shown in FIG. 25A, with the electroadhesive membranes 2520 in a released position. For example, the electroadhesive attraction between the sidewall of the container 2510 and the overlapping flap of the membrane 2520 can be deactivated by reducing (or turning off) the voltage applied to the electroadhesive gripping surface. Upon deactivating the electroadhesive attraction between the sidewall of the container 2510 and the overlapping flap of the membrane 2520, the weight of the item 2501 on the bottom portion 2522 of the membrane overcomes the attraction (if any) between the overlapping flap 2524 and the sidewall 2512 and the membrane 2520 slides away from the sidewall 2512 to allow the item 2501 to fall downward. Similarly, the items 2502, 2503 fall downward upon deactivation of the electroadhesive attraction.

Figure 26A:
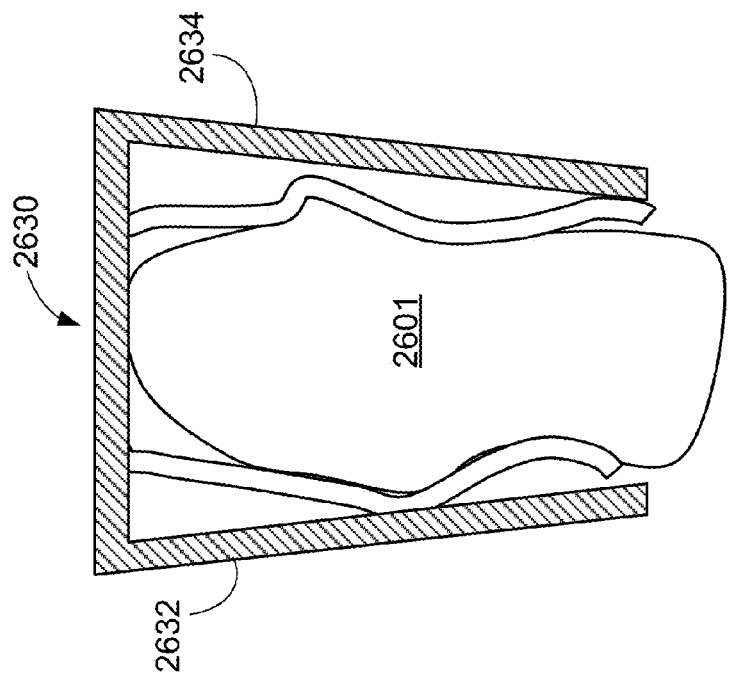
FIG. 26A is a side view of an open bottom container with compliant electroadhesive grippers along inner sidewalls.

FIG. 26A is a side view of an open bottom container 2610 with compliant electroadhesive grippers 2620, 2622 along inner sidewalls 2612, 2614. The two compliant grippers 2620, 2622 can be similar to the electroadhesive curtain grippers disclosed herein in connection with FIGS. 19-20 for example. The compliant grippers 2620, 2622 each include an integrated pattern of flexible electrodes configured to be polarized by an applied voltage. Upon polarization of the electrodes therein, the compliant grippers 2620, 2622 conform to the exterior surface of the item 2601 loaded in the open bottom container 2610. The grippers 2620, 2622 are attracted to the item 2601 and impart a shear stress on the sides of the item 2601 to secure the item 2601 in the container 2610. The grippers 2620, 2622 can optionally include a load-bearing backing coupled to the conformable surface to transfer locally experienced shear stresses to the container 2610 or another load-bearing structure (e.g., where the compliant grippers 2620, 2622 attach to the top 2616 of the container 2610).

Figure 26B:
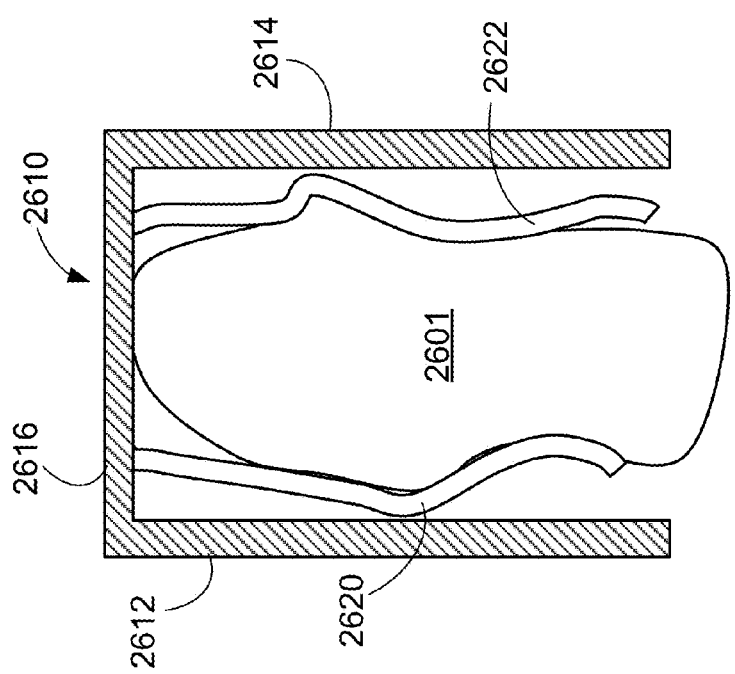
FIG. 26B is a side view of another open bottom container with compliant electroadhesive grippers in which the container sides are biased inward to promote contact between items placed in the container and the electroadhesive grippers.

FIG. 26B is a side view of another open bottom container 2630 with compliant electroadhesive grippers 2620, 2622 in which the container sides 2632, 2634 are biased inward to promote contact between the item 2601 placed in the container 2630 and the electroadhesive grippers 2620, 2622. Similar to the open bottom container arrangements in FIG. 25, while electroadhesion is activated, the item 2601 is electroadhesively secured within the open bottom containers 2610 or 2630 of FIGS. 26A-26B.

9b) Sorting By Selectively Releasing Items from Open Bottom Containers

Given the ability to selectively retain items in the open bottom containers by selectively applying voltage to activate the electroadhesive membranes retaining the items, sorting systems may be created that use one or more electroadhesive membranes to sort a group of packages loaded in an arrangement of open bottom containers. For example, packages in a sorting facility can be recognized/characterized using identifying information on such packages. Packages can be loaded into open bottom containers and electroadhesively secured therein by activating electroadhesive membranes that attach to sidewalls of the open bottom containers (e.g., as in FIG. 25) or to electroadhesive curtain grippers that attach to the loaded items themselves (e.g., as in FIG. 26). The arrangement of open bottom containers can then be guided over a series of delivery locations. Particular packages can then be released into a desired delivery location for the particular packages. In some examples, while a package is conveyed over a particular delivery location, electroadhesion can be deactivated to allow the package to fall from the open bottom container and into the delivery location to thereby deliver the package.

Figure 27A:
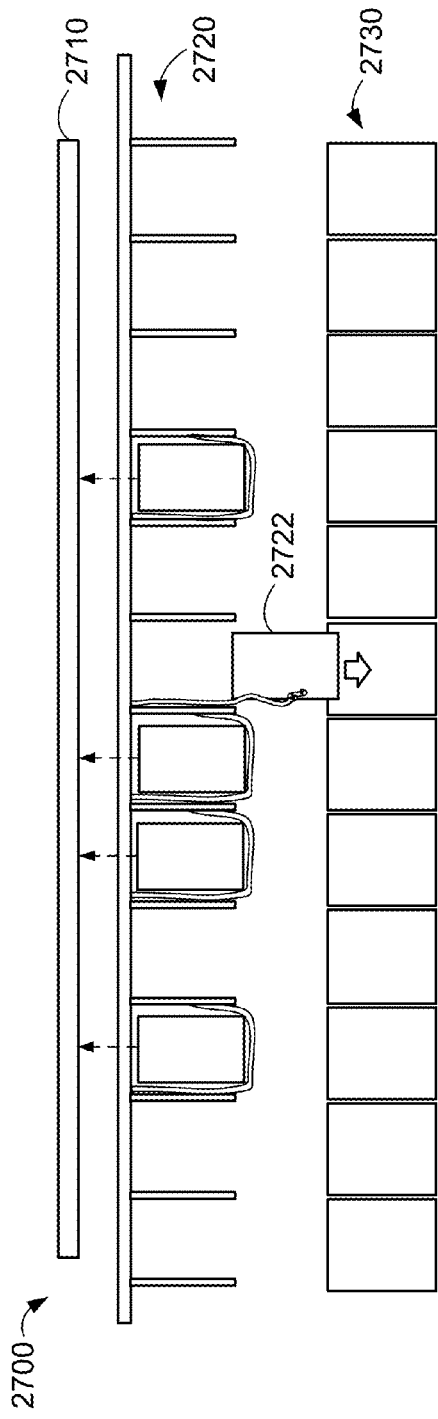
FIG. 27A is a side view of a rack sorting system with multiple open bottom containers each holding items configured to be dropped into one of a plurality of delivery locations.
Figure 27B:
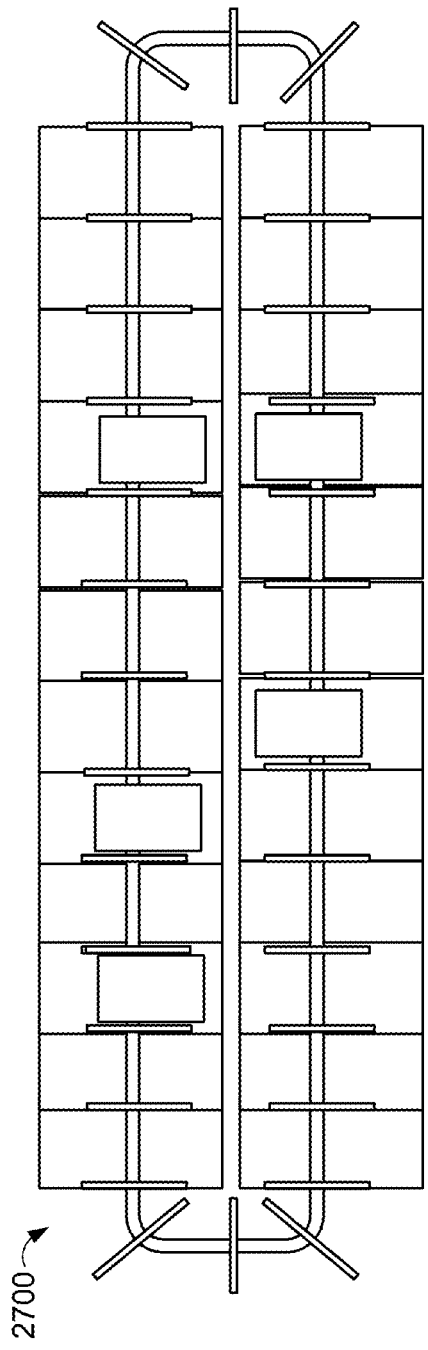
FIG. 27B is a top view of the rack sorting system shown in FIG. 27A.

FIG. 27A is a side view of a rack sorting system 2700 with multiple open bottom containers 2720 holding items configured to be dropped into one of a plurality of delivery 2730 locations (e.g., bins). The open bottom containers 2720 can be conveyed along an elevated track to pass over the delivery locations 2730. FIG. 27B is a top view of the rack sorting system 2700 shown in FIG. 27A. The arrangement of open bottom containers 2720 can circulate around a track over the delivery locations 2730 (e.g., bins). The open bottom containers 2720 can also have transparent tops to allow for detecting identifying information to identify and/or characterize the packages loaded in the rack 2720 using one or more sensors 2710.

The sensors 2710 may include detectors configured to detect reflected and/or emitted radiation from the packages in the open bottom container rack 2720. Such radiation may include, for example, radiation indicative of images, patterns, and/or characters appearing on the packages (e.g., barcode patterns, serial numbers, other recognizable identifying feature(s) such as images and/or characters, etc.). Moreover, the sensors 2710 may include a camera equipped to capture images of the packages and identify and/or characterize such packages based on shape, color, reflectivity, images on the package, etc. and may employ pattern recognition techniques. The sensors 2710 may additionally or alternatively be configured to detect radio frequency identification signals from RFID tags embedded or adhered to the packages. Other techniques may be used to identify and/or characterize the packages loaded in the open bottom container rack.

Upon identifying and/or characterizing the packages in the rack 2720, a controller (not shown) determines which delivery location 2730 to direct a particular package to, and controls the rack 2720 to turn off electroadhesion for the particular container while the package moves over its designated delivery area. As shown in FIG. 27A, electroadhesion is deactivated to allow the package 2722 to drop from the open bottom container rack 2720 to a designated bin among the delivery locations 2730. Thus, the controller can function to identify (or otherwise characterize) the packages (e.g., using the sensor 2710), associate one of the delivery locations 2730 with the identified package, and operate the electroadhesive open bottom containers 2720 to release the identified package into the delivery location. Particular packages can be identified based on analysis of item-identifying data detected via the sensors 2710.

It is noted that the sorting system 2700 in FIG. 27 may be particularly well suited to item sorting applications where floor space is limited, but overhead room is abundant. Because the system 2700 utilizes the elevated conveyor rack 2720 to drop articles into the delivery areas, the floor space consumed is limited to the floor space of the delivery areas themselves. In a warehouse setting, for example, where overhead room is typically abundant, but floor space may be limited, the elevated sorting system can offer advantages over sorting systems employing systems of ramps and/or conveyors to direct parcels to particular delivery locations.

X. Example Operations

Figure 28A:
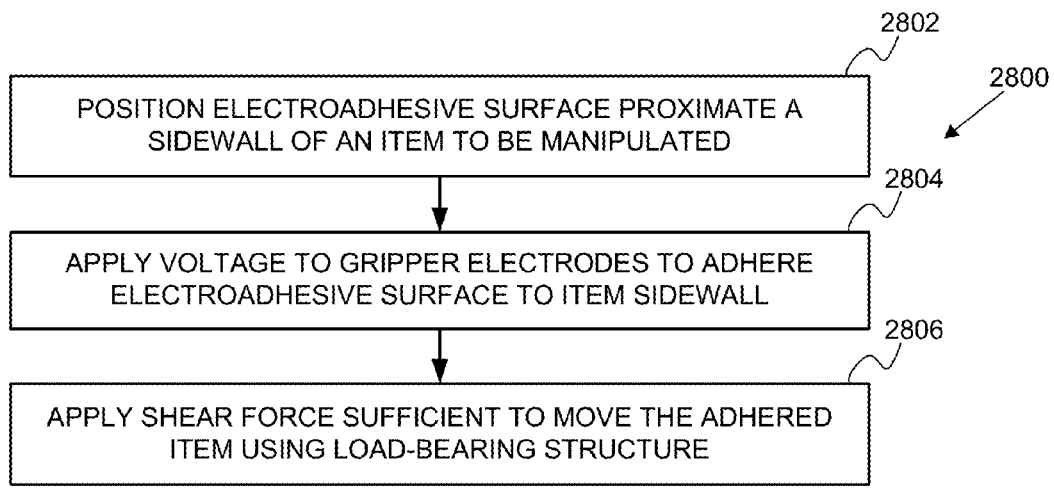
FIG. 28A is a flowchart of an example process for operating a shear electroadhesive gripper to manipulate an item.

FIG. 28A is a flowchart of an example process 2800 for operating a shear electroadhesive gripper to manipulate an item. The process 2800 may be carried out by one or more of the systems and/or devices discussed above in connection with the shear gripping systems in FIGS. 13-16. An electroadhesive surface of a shear gripping system can be positioned proximate a sidewall of an item to be manipulated (2802). For example, the gripping surface 1340 of the blade gripping system 1300 can be situated near a sidewall of an item, such as a box or case. Voltage can be applied to electrodes in the electroadhesive surface to adhere the electroadhesive surface to the sidewall of the item to be manipulated (2804). The item can be moved by a shear force applied to the adhered item using a load-bearing structure coupled to the gripping surface (2806). For example, the load-bearing structure coupled to the gripping surface can be urged, along its length, and the resulting force on the load-bearing structure can be conveyed to the adhered item.

Figure 28B:
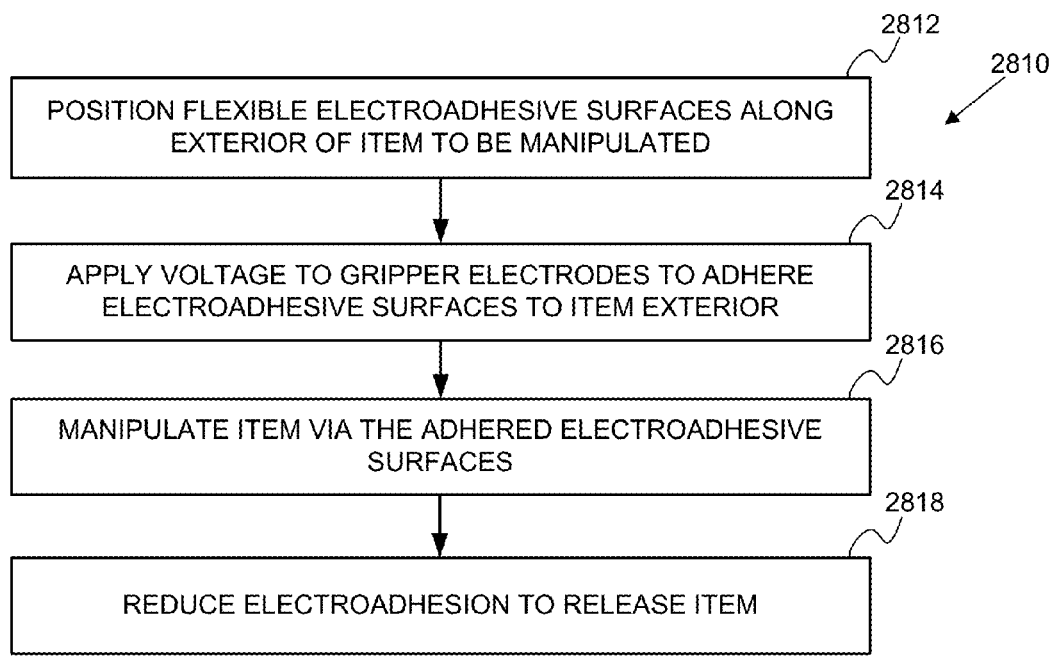
FIG. 28B is a flowchart of an example process for operating an individual item gripper to manipulate an item.

FIG. 28B is a flowchart of an example process 2810 for operating an individual item gripper to manipulate an item. The process 2810 may be carried out by one or more of the systems and/or devices discussed above in connection with the item gripping systems in FIGS. 19-20. Flexible electroadhesive surfaces can be positioned along an exterior of an item to be manipulated (2812). For example, a plurality of electroadhesive gripping surfaces can be draped around the sides of an item by positioning a load-bearing structure to which the flexible electroadhesive surfaces are mounted to directly above a particular item. Voltage can be applied to electrodes in the electroadhesive surface to adhere the electroadhesive surface to the exterior surface of the item (2814). The item can then be manipulated via the adhered electroadhesive surfaces (2816). For example, while the polarizing voltage is applied to the flexible electroadhesive surfaces, a module to which the electroadhesive surfaces are mounted can be moved or otherwise manipulated (e.g., via a control arm or another positioning system). The item can be released by reducing the electroadhesion (2818). For example, the applied voltage can be reduced or turned off.

Figure 28C:
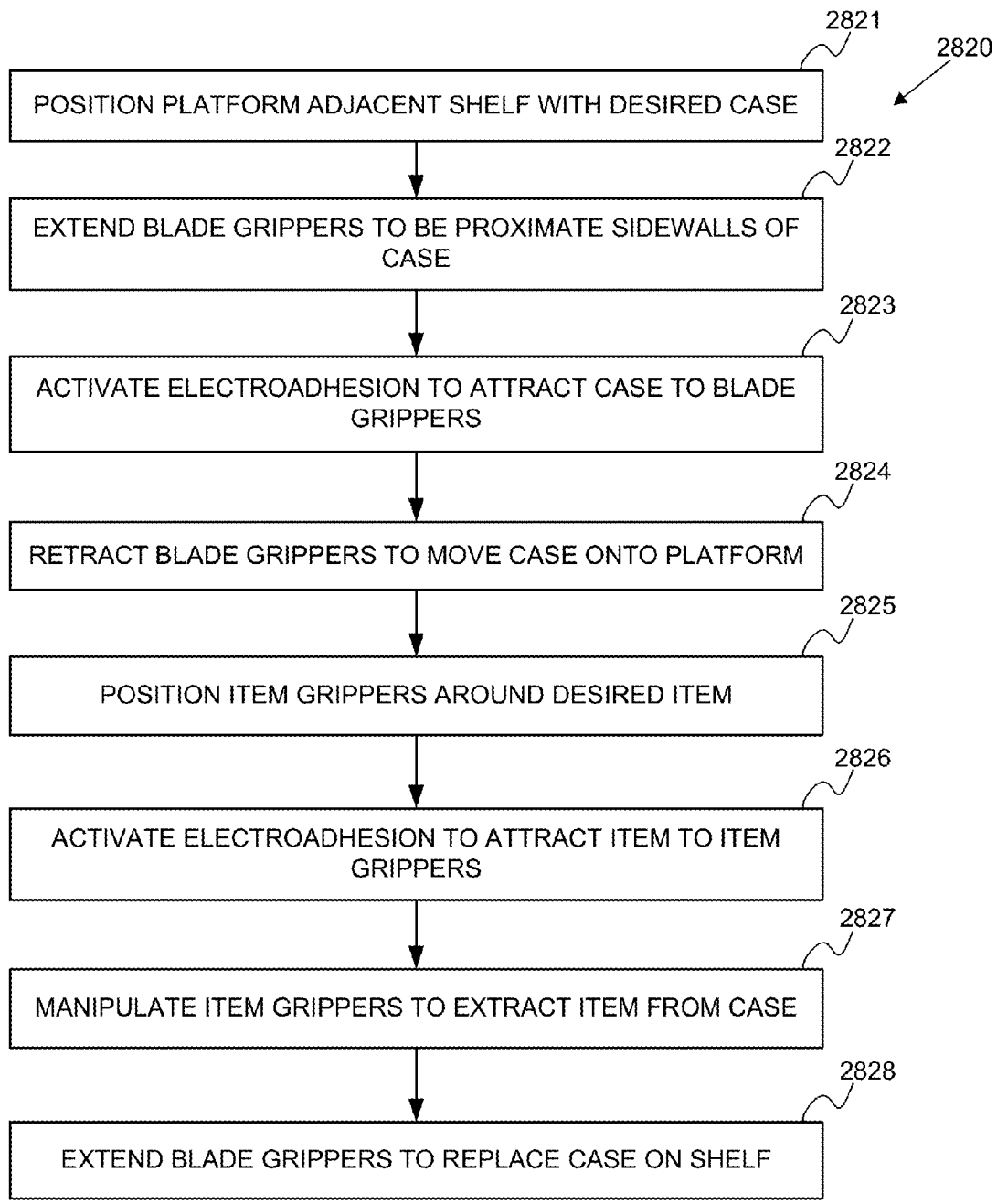
FIG. 28C is a flowchart of an example process for operating a loader to retrieve an individual item from a case on a warehouse shelf.

FIG. 28C is a flowchart of an example process 2820 for operating a loader to retrieve an individual item from a case on a warehouse shelf. The process 2820 may be carried out by one or more of the systems and/or devices discussed above in connection with the loader and warehouse environments in FIGS. 22-24. The loader is maneuvered such that its horizontal platform is adjacent a shelf loaded with the desired case (2821) (e.g., FIG. 23A). The platform can be positioned so as to be at least approximately co-planar, for example. Blade grippers are extended from the loader to be proximate sidewalls of the desired case (2822) (e.g., FIG. 23B). Voltage can be applied to the electroadhesive blade grippers to activate electroadhesive attraction between the sidewalls of the case and the blade grippers (2823). The blade grippers are retracted, back toward the loading platform, to move the adhered case onto the platform (2824) (e.g., FIG. 23C). Once on the platform of the loader, an item gripper system can be positioned with one or more flexible electroadhesive item grippers proximate the desired item (2825). For example, the flexible electroadhesive surfaces of the item grippers can be positioned to drape around the desired item on multiple sides, similar to the item gripper 2100 described above in connection with FIG. 21. Voltage can be applied to the electroadhesive flexible gripping surfaces to activate electroadhesive attraction between the exterior surface of the particular item and at least some of the flexible gripping surfaces (2826). Once adhered, the item can be manipulated to move, or otherwise maneuver the adhered item using the grippers (2827). For example, the individual item can be removed from the case retrieved from the shelf in block 2824. The item may be moved to a new position using a control arm to which the item gripper is mounted. In some examples, the item can then be released from the item gripper by reducing (or turning off) the voltage applied to the electrodes in the flexible electroadhesive surfaces. For example, the item can be dropped in a designated area, bin, basket, etc. on the loader 2200 associated with a particular order. The vertical blade grippers can then be extended to move the case back onto the shelf (2828).

Figure 28D:
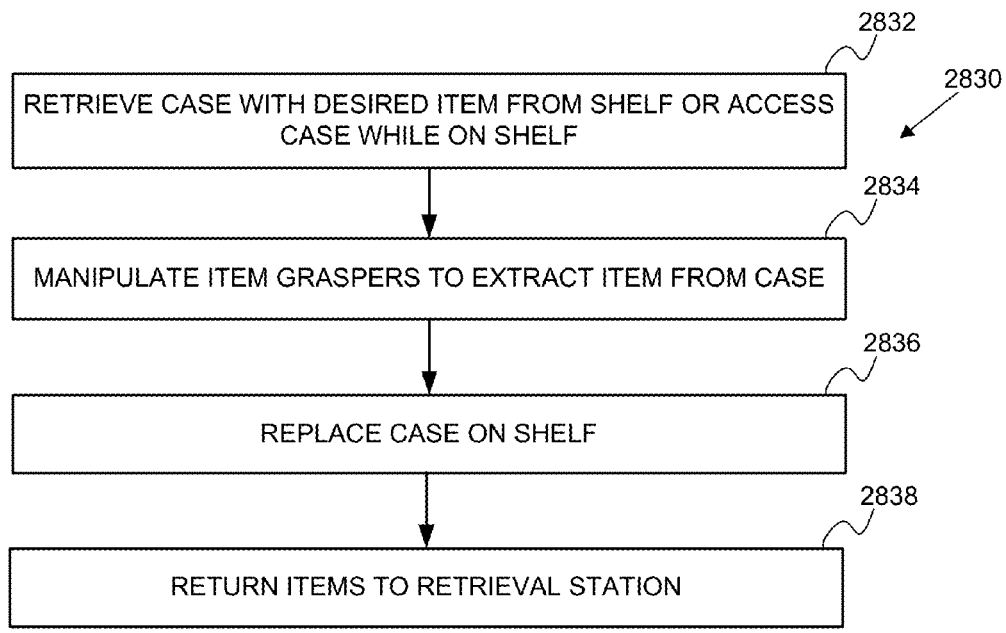
FIG. 28D is a flowchart of an example process for retrieving an individual item from a case on a warehouse shelf while in the aisle of the warehouse.

FIG. 28D is a flowchart of an example process 2830 for retrieving an individual item from a case on a warehouse shelf while in the aisle of the warehouse. The process 2820 may be carried, for example, out by one or more of the systems and/or devices discussed above in connection with the loader and warehouse environments in FIGS. 22-24. However, the process 2830 may be also be carried out by automated handling systems other than electroadhesive systems. For example automated handling/manipulation systems may employ mechanical grasping devices, magnetic grasping/adhesion devices, vacuum suction devices, and/or other technologies suited to automatically adhering to and/or grasping items. Such an article grasping/handling system can navigate the warehouse to a particular shelf and then retrieve a case with a desired item from a shelf, or to navigate to the shelf and access the case as it rests on the shelf (2832). The system can then manipulate item graspers to extract a particular item from the case (2834). For example, the system may retrieve an individual item from the case while in the aisle of the warehouse, and without transporting the case to a predetermined picking station. The system can then replace the case on the shelf (2836). Alternatively, if the case is accessed while the case rests on the shelf (e.g., by a robotic control arm equipped with a suitable item grasper), then block 2836 may be omitted. The retrieved items can then be stowed by the system and transported to a retrieval station (2838). For example, the article handling/manipulation system can convey the retrieved item(s) to an order fulfillment station. The process 2830 may involve any of the functionality and/or features described above in connection with FIGS. 28C and 22-24, but the process 2830 may generally be carried out via grasping technologies other than electroadhesive grasping technologies (although electroadhesive grasping may be employed).

Figure 28E:
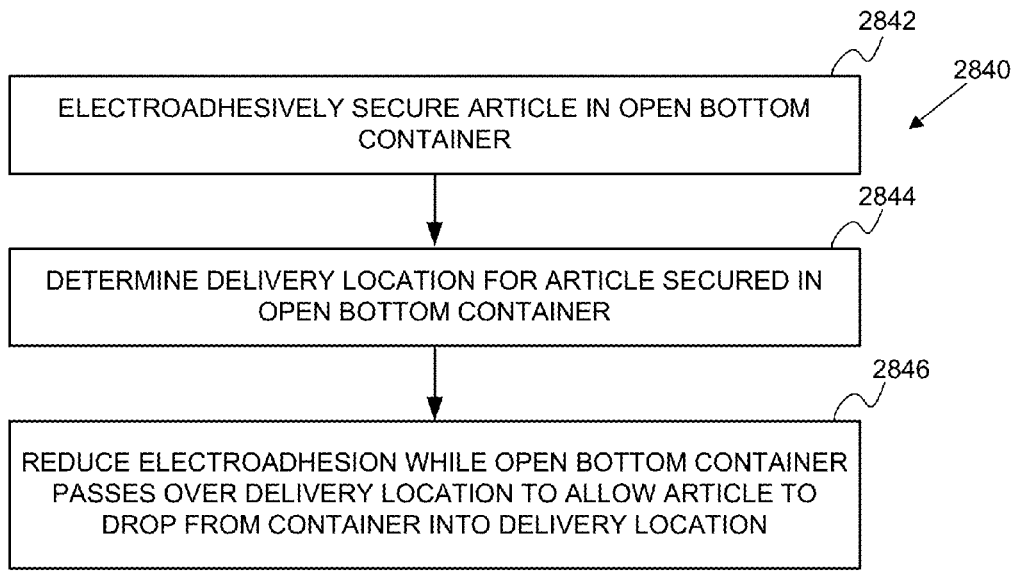
FIG. 28E is a flowchart of an example process for operating a sorting system to selectively release electroadhered items in desired locations.

FIG. 28E is a flowchart of an example process 2840 for operating a sorting system to selectively release electroadhered items in desired locations. The process 2840 may be carried out by one or more of the systems and/or devices discussed above in connection with the open bottom container sorting systems in FIGS. 25-27. An article is loaded within an open bottom container and electroadhesively secured therein (2842). The open bottom container can include a membrane that encloses the bottom of the container to allow objects in the container to rest on the portion of the membrane covering the bottom. Such a membrane can then be electroadhesively secured to a sidewall of the open bottom container, as in FIG. 25. The open bottom container can additionally or alternatively include flexible curtain grippers along the internal sidewalls of the container that conforms to the exterior surface of items loaded in the container to electroadhesively secure such items within the container, as in FIG. 26. A delivery location for an article electroadhesively secured in the open bottom container is determined (2844). For example, the article can be identified/characterized using item-identifying information obtained by an item identifying system and/or sensor (e.g., the item identifying sensor system 2710 in FIG. 27A). A delivery location can then be selected based on the identifying information (e.g., based on shipping instructions, information in a look up table, etc.). The open bottom container can then be used to transport the articles toward the determined delivery location. For example, an overhead conveyor rack can be used to move the open bottom container along a path over one or more delivery areas. The electroadhesion securing the article in the container can be reduced as the article passes over the desired delivery location to allow the article to drop from the container into the delivery location (2846). Upon reduction of the electroadhesive force, the article can exit the container by falling along a path determined by one or more of an inertial path traversed by the item and/or a path defined, at least in part, by gravity.

FIG. 29 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture. FIG. 29 is a schematic illustrating a conceptual partial view of an example computer program product that includes a computer program for executing a computer process on a computing device, arranged according to at least some embodiments presented herein, including the processes shown and described in connection with FIGS. 11 and 28.

In one embodiment, the example computer program product 2900 is provided using a signal bearing medium 2902. The signal bearing medium 2902 may include one or more programming instructions 2904 that, when executed by one or more processors may provide functionality or portions of the functionality described above with respect to FIGS. 1-28. In some examples, the signal bearing medium 2902 can include a non-transitory computer-readable medium 2906, such as, but not limited to, a hard disk drive, a Compact Disc (CD), a Digital Video Disk (DVD), a digital tape, memory, etc. In some implementations, the signal bearing medium 2902 can be a computer recordable medium 2908, such as, but not limited to, memory, read/write (R/W) CDs, R/W DVDs, etc. In some implementations, the signal bearing medium 2902 can be a communications medium 2910, such as, but not limited to, a digital and/or an analog communication medium (e.g., a fiber optic cable, a waveguide, a wired communications link, a wireless communication link, etc.). Thus, for example, the signal bearing medium 2902 can be conveyed by a wireless form of the communications medium 2910.

The one or more programming instructions 2904 can be, for example, computer executable and/or logic implemented instructions. In some examples, a computing device is configured to provide various operations, functions, or actions in response to the programming instructions 2904 conveyed to the computing device by one or more of the computer readable medium 2906, the computer recordable medium 2908, and/or the communications medium 2910.

The non-transitory computer readable medium 2906 can also be distributed among multiple data storage elements, which could be remotely located from each other. The computing device that executes some or all of the stored instructions can be a microfabrication controller, or another computing platform. Alternatively, the computing device that executes some or all of the stored instructions could be remotely located computer system, such as a server.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
   a first shear gripper including an electroadhesive surface associated with one or more electrodes and a load-bearing structure coupled to the electroadhesive surface;
   a power supply configured to electrically connect to the one or more electrodes associated with the electroadhesive surface; and
   a controller configured to (i) cause a voltage to be applied, via the power supply, to the one or more electrodes associated with the electroadhesive surface to thereby cause the first shear gripper to adhere to an item situated proximate the electroadhesive surface and (ii) cause a shear force to be applied to the adhered item, via the load-bearing structure, wherein the shear force is sufficient to move the adhered item.

2. The system according to claim 1, wherein the first shear gripper is configured to adhere to a sidewall of the item and to move the item in a direction substantially parallel to the sidewall via shear interaction between the electroadhesive surface and the sidewall.

3. The system according to claim 1, further comprising:
   a second shear gripper including an electroadhesive surface associated with one or more electrodes and a load-bearing structure coupled to the electroadhesive surface.

4. The system according to claim 3, wherein the electroadhesive surfaces of the first and second shear grippers are configured to adhere to opposite sidewalls of the adhered item.

5. The system according to claim 1, further comprising:
   a telescoping arm connected to the first shear gripper and configured to extend and retract along a direction parallel to a length of the electroadhesive surface, and
   wherein the controller is configured to use the telescoping arm to (i) position the electroadhesive surface proximate the item and (ii) apply the shear force to the adhered item by extending the telescoping arm.

6. The system according to claim 1, further comprising:
   a retractable arm connected to the first shear gripper and configured to extend and retract along a direction parallel to the length of the electroadhesive surface, and
   wherein the controller is configured to use the retractable arm to (i) position the electroadhesive surface proximate the item and (ii) apply the shear force to the adhered item by retracting the retractable arm.

7. The system according to claim 1, wherein the load-bearing structure is curled to have an outward-curved surface and an inward-curved surface, and wherein the electroadhesive surface is coupled to the outward-curved surface.

8. The system according to claim 7, wherein the first shear gripper includes a force-imparting section and a coiled portion from which the force-imparting section extends, and wherein the coiled portion is wrapped around an axis that is substantially transverse to an axis of curvature of the outward-curved surface.

9. The system according to claim 1, wherein the load-bearing structure includes a support rod coupled to the electroadhesive surface at multiple points.

10. The system according to claim 1, wherein the electroadhesive surface includes a flexible flap configured to at least partially conform to an exterior surface of the adhered item.

11. The system according to claim 1, wherein the first shear gripper includes a deformable layer coupled between the electroadhesive surface and the load-bearing structure.

12. The system according to claim 1, wherein the electroadhesive surface and the load-bearing structure are coupled together by a substantially continuous strip that extends in a direction along which the shear force is applied.

13. The system according to claim 1, wherein the electroadhesive surface is configured to be removably coupled to the load-bearing structure.

14. The system according to claim 1, further comprising:
a sensor configured to detect that an item is proximate the first shear gripper, and
wherein the controller is further configured to receive data from the sensor and control the voltage supply based on the received data, such that the voltage is applied responsive to the sensor indicating that the item is proximate the electroadhesive surface.

15. The system according to claim 1, wherein the controller is further configured to receive an indication to release the item from the first shear gripper, and reduce the voltage applied to the one or more electrodes in response to receiving the indication.

16. The system according to claim 1, wherein the power supply includes one or more power supplies, the system further comprising:
an item gripper including a plurality of flexible electroadhesive surfaces each associated with one or more electrodes; and
a control arm configured to manipulate the item gripper, and
wherein the controller is configured to (i) cause the control arm to position the item gripper such that at least some of the plurality of flexible electroadhesive surfaces drape around a region including an individual object, (ii) cause a voltage to be applied, via the one or more power supplies, to the one or more electrodes associated with the plurality of flexible electroadhesive surfaces to thereby cause the at least some of the plurality of flexible electroadhesive surfaces to adhere to the individual object.

17. The system according to claim 1, wherein the power supply includes one or more power supplies, the system further comprising:
an electroadhesive platform including one or more electrodes; and
wherein the controller is configured to (i) cause the item adhered to the first shear gripper to move onto the electroadhesive platform, (ii) cause a voltage to be applied, via the one or more power supplies, to the one or more electrodes associated with the electroadhesive platform to thereby secure the item to the electroadhesively platform.

18. A system comprising:
an item gripper including a plurality of flexible electroadhesive surfaces each associated with one or more electrodes;
a power supply configured to electrically connect to the one or more electrodes associated with each of the plurality of flexible electroadhesive surfaces; and
a control arm configured to manipulate the item gripper, and
a controller configured to (i) cause the control arm to position the item gripper such that at least some of the plurality of flexible electroadhesive surfaces drape around a region including an individual object, (ii) cause a voltage to be applied, via the power supply, to the one or more electrodes associated with the plurality of flexible electroadhesive surfaces to thereby cause the at least some of the plurality of flexible electroadhesive surfaces to adhere to the individual object.

19. The system according to claim 18, wherein at least one of the plurality of flexible electroadhesive surfaces is coupled to a semi-rigid backing configured to distribute stress on the at least one flexible electroadhesive surface via multiple mechanical connections with the flexible electroadhesive surface.

20. The system according to claim 19, wherein the mechanical connections include multiple flexible tethers anchored in respective anchor points in the semi-rigid backing and the at least one flexible electroadhesive surface.

21. A method comprising:
applying a voltage to one or more electrodes associated with an electroadhesive surface of a first shear gripper to thereby cause the electroadhesive surface to adhere to an item proximate the first shear gripper;
applying a shear force to the adhered item, via a load-bearing structure coupled to the electroadhesive surface, wherein the shear force is sufficient to move the adhered item; and
reducing the voltage applied to the one or more electrodes such that the item is released from the first shear gripper.

* * * * *